(12) United States Patent
Greystoke et al.

(10) Patent No.: US 10,185,917 B2
(45) Date of Patent: Jan. 22, 2019

(54) COMPUTER-AIDED DECISION SYSTEMS

(71) Applicant: LF Technology Development Corporation Limited, London (GB)

(72) Inventors: Alex Greystoke, Lakeway, TX (US); Shy Blick, Austin, TX (US)

(73) Assignee: LF Technology Development Corporation Limited, London (GB)

( * ) Notice: Subject to any disclaimer, the term of this patent is extended or adjusted under 35 U.S.C. 154(b) by 1142 days.

(21) Appl. No.: 14/327,543

(22) Filed: Jul. 9, 2014

(65) Prior Publication Data

US 2015/0012467 A1 Jan. 8, 2015

Related U.S. Application Data

(63) Continuation-in-part of application No. 14/169,058, filed on Jan. 30, 2014, now Pat. No. 9,767,498, and a continuation-in-part of application No. 14/169,060, filed on Jan. 30, 2014.

(60) Provisional application No. 61/844,353, filed on Jul. 9, 2013, provisional application No. 61/844,350, filed on Jul. 9, 2013, provisional application No. 61/844,355, filed on Jul. 9, 2013, provisional application No. 61/759,314, filed on Jan. 31, 2013, provisional application No. 61/759,317, filed on Jan. 31, 2013.

(51) Int. Cl.
*G06Q 30/00* (2012.01)
*G06N 99/00* (2010.01)
*G06Q 30/06* (2012.01)

(52) U.S. Cl.
CPC ....... *G06N 99/005* (2013.01); *G06Q 30/0619* (2013.01)

(58) Field of Classification Search
CPC ...................................................... G06Q 30/02
USPC ...................................................... 705/14.54
See application file for complete search history.

(56) References Cited

U.S. PATENT DOCUMENTS 5,097,407 A 3/1992 Hino
5,412,756 A 5/1995 Bauman
(Continued)

FOREIGN PATENT DOCUMENTS

RU 2254611 6/2005

OTHER PUBLICATIONS

Le, Building High-level Features Using Large Scale Unsupervised Learning, Proceedings of the 29 th International Conference on Machine Learning, 11 pages, 2012, Edinburgh, Scotland, UK.
(Continued)

*Primary Examiner* — Mila Airapetian
(74) *Attorney, Agent, or Firm* — Cesari & Reed LLP

(57) ABSTRACT

Decision systems and processes implementing digital personas are presented. A digital persona is a digital representation of an entity in accordance with a specific set of rules, preferences, or priorities with respect to a defined situation or opportunity. A digital persona may interact with a universe, which can be a set of conditions and information that an artificial intelligence engine implementing the digital personas can perceive. The digital personas can learn, via the artificial intelligence engine, from actions of a user, events in the universe, other personas, or a multitude of other factors. In some examples discussed, the artificial intelligence engine may include a persona artificial intelligence engine and an evolutionary artificial intelligence engine.

20 Claims, 43 Drawing Sheets

(56) References Cited

U.S. PATENT DOCUMENTS

| | | |
|---|---|---|
| 5,537,618 A | 7/1996 | Boulton et al. |
| 5,566,291 A | 10/1996 | Boulton et al. |
| 5,680,305 A | 10/1997 | Apgar |
| 5,732,398 A | 3/1998 | Tagawa |
| 5,948,040 A | 9/1999 | DeLorme et al. |
| 6,023,687 A | 2/2000 | Weatherly et al. |
| 6,049,784 A | 4/2000 | Weatherly et al. |
| 6,088,686 A | 7/2000 | Walker et al. |
| 6,119,101 A | 9/2000 | Peckover |
| 6,169,981 B1 | 1/2001 | Werbos |
| 6,512,525 B1 | 1/2003 | Capps |
| 6,738,753 B1 | 5/2004 | Hogan |
| 7,072,847 B2 | 7/2006 | Ulenas et al. |
| 7,096,193 B1 | 8/2006 | Beaudoin et al. |
| 7,107,239 B2 | 9/2006 | Graff |
| 7,152,037 B2 | 12/2006 | Smith |
| 7,162,494 B2 | 1/2007 | Arellano |
| 7,203,662 B2 | 4/2007 | Das et al. |
| 7,254,559 B2 | 8/2007 | Florance et al. |
| 7,287,008 B1 | 10/2007 | Mahoney et al. |
| 7,302,406 B2 | 11/2007 | Mallo et al. |
| 7,319,976 B1 | 1/2008 | Peckover |
| 7,376,613 B1 | 5/2008 | Cofino |
| 7,386,620 B2 | 6/2008 | Lei et al. |
| 7,464,109 B2 | 12/2008 | Modi |
| 7,533,046 B2 | 5/2009 | Blanz et al. |
| 7,580,855 B2 | 8/2009 | Fernandes |
| 7,613,692 B2 | 11/2009 | Hamilton |
| 7,739,408 B2 | 6/2010 | Fish et al. |
| 7,769,705 B1 | 8/2010 | Leuchtefeld |
| 7,809,601 B2 | 10/2010 | Shaya et al. |
| 7,865,404 B2 | 2/2011 | Peckover |
| 7,904,366 B2 | 3/2011 | Pogust |
| 7,921,068 B2 | 4/2011 | Guyon et al. |
| 7,933,399 B2 | 4/2011 | Knott |
| 7,962,578 B2 | 6/2011 | Makar |
| 7,979,314 B2 | 7/2011 | Ulenas |
| 7,984,005 B2 | 7/2011 | Bridges |
| 8,145,536 B1 | 3/2012 | Goel |
| 8,190,568 B2 | 5/2012 | Caballero-McCann |
| 8,204,790 B1 | 6/2012 | Rogers |
| 8,234,375 B2 | 7/2012 | Ghadialy et al. |
| 8,257,173 B2 | 9/2012 | Bergelt |
| 8,306,874 B2 | 11/2012 | Morgenstern et al. |
| 8,326,890 B2 | 12/2012 | Desbarats |
| 8,346,624 B2 | 1/2013 | Goad et al. |
| 8,364,520 B1 | 1/2013 | Eichorn et al. |
| 8,364,559 B1 | 1/2013 | Bhosle et al. |
| 8,478,660 B2 | 7/2013 | Toro et al. |
| 8,494,936 B2 | 7/2013 | Brenner |
| 8,521,677 B2 | 8/2013 | Spring |
| 8,560,396 B2 | 10/2013 | Peckover |
| 8,589,529 B2 | 11/2013 | Siegel |
| 8,606,636 B1 | 12/2013 | Keoshkerian |
| 8,660,670 B2 | 2/2014 | Freed |
| 8,666,844 B2 | 3/2014 | Shaya et al. |
| 8,693,751 B2 | 4/2014 | Osborne |
| 8,700,620 B1 | 4/2014 | Lieberman |
| 2002/0046147 A1 | 8/2002 | Livesay |
| 2002/0107764 A1 | 8/2002 | McCoy |
| 2003/0004859 A1 | 1/2003 | Shaw et al. |
| 2003/0093289 A1 | 5/2003 | Thornley et al. |
| 2003/0144945 A1 | 7/2003 | Opsahl-Ong et al. |
| 2003/0208362 A1 | 11/2003 | Enthoven et al. |
| 2004/0039679 A1 | 2/2004 | Norton |
| 2004/0107173 A1 | 6/2004 | Cheng |
| 2004/0128230 A1 | 7/2004 | Oppenheimer et al. |
| 2005/0055298 A1 | 3/2005 | Czora |
| 2005/0177448 A1 | 8/2005 | Fu et al. |
| 2005/0177488 A1 | 8/2005 | Rexrode |
| 2005/0222861 A1 | 10/2005 | Silverman et al. |
| 2006/0161482 A1 | 7/2006 | Jacobson et al. |
| 2006/0184440 A1 | 8/2006 | Britti et al. |
| 2006/0190279 A1 | 8/2006 | Heflin |
| 2006/0212386 A1 | 9/2006 | Willey et al. |
| 2006/0277077 A1 | 12/2006 | Coleman |
| 2007/0016488 A1 | 1/2007 | Ulenas |
| 2007/0043654 A1 | 2/2007 | Libman |
| 2007/0106563 A1 | 5/2007 | Okada et al. |
| 2007/0106656 A1 | 5/2007 | Gutta |
| 2007/0130059 A1 | 6/2007 | Lee et al. |
| 2007/0162301 A1 | 7/2007 | Sussman |
| 2007/0162332 A1 | 7/2007 | Helm |
| 2008/0040141 A1 | 2/2008 | Torrenegra et al. |
| 2008/0065429 A1 | 3/2008 | Galloway |
| 2008/0120244 A1 | 5/2008 | Mello |
| 2008/0243637 A1 | 10/2008 | Chan |
| 2008/0270163 A1 | 10/2008 | Green |
| 2008/0320040 A1 | 12/2008 | Zhurakhinskaya |
| 2009/0076926 A1 | 3/2009 | Zinberg |
| 2009/0138342 A1 | 5/2009 | Otto |
| 2009/0254360 A1 | 8/2009 | Chouby |
| 2010/0010872 A1 | 1/2010 | Drummond |
| 2010/0121808 A1 | 5/2010 | Kuhn |
| 2010/0241595 A1* | 9/2010 | Felsher ................ G06F 19/322 705/400 |
| 2010/0312464 A1* | 12/2010 | Fitzgerald ............ G01C 21/343 701/532 |
| 2011/0015954 A1 | 1/2011 | Ward |
| 2011/0112869 A1 | 5/2011 | Greak |
| 2011/0137776 A1 | 6/2011 | Goad et al. |
| 2011/0212428 A1 | 9/2011 | Baker |
| 2011/0289076 A1 | 11/2011 | Boyle et al. |
| 2011/0307478 A1 | 12/2011 | Pinkney et al. |
| 2011/0320395 A1 | 12/2011 | Dada |
| 2012/0010922 A1 | 1/2012 | Smith |
| 2012/0084129 A1 | 4/2012 | Golden et al. |
| 2012/0143712 A1 | 6/2012 | Echavarria |
| 2012/0158500 A1 | 6/2012 | Hochstatter et al. |
| 2012/0221393 A1 | 8/2012 | Ouimet et al. |
| 2012/0239523 A1 | 9/2012 | Ouimet et al. |
| 2012/0239524 A1 | 9/2012 | Ouimet et al. |
| 2012/0253517 A1 | 10/2012 | Motupalli |
| 2012/0253907 A1 | 10/2012 | Ouimet |
| 2012/0265646 A1 | 10/2012 | Ghadialy et al. |
| 2012/0284138 A1 | 11/2012 | Shave |
| 2012/0330774 A1 | 12/2012 | Sadot et al. |
| 2013/0066697 A1 | 3/2013 | Morganstern et al. |
| 2013/0151368 A1 | 6/2013 | Goad et al. |
| 2013/0151369 A1 | 6/2013 | Goad et al. |
| 2013/0173335 A1 | 7/2013 | Evans et al. |
| 2013/0173336 A1 | 7/2013 | Evans et al. |
| 2013/0173418 A1 | 7/2013 | Goad et al. |
| 2013/0231824 A1 | 9/2013 | Wilson |
| 2013/0287270 A1 | 10/2013 | Harper |
| 2013/0316834 A1 | 11/2013 | Vogel |
| 2013/0325652 A1 | 12/2013 | Ouimet |
| 2014/0032467 A1 | 1/2014 | Reddy |
| 2014/0044364 A1 | 2/2014 | Abdulhayoglu et al. |
| 2014/0046891 A1 | 2/2014 | Banas |
| 2014/0074617 A1 | 3/2014 | Mukherji et al. |
| 2014/0081684 A1 | 3/2014 | Hadar |
| 2014/0108189 A1 | 4/2014 | Schumann |
| 2014/0114705 A1 | 4/2014 | Olset |
| 2014/0214486 A1 | 7/2014 | Greystoke |
| 2014/0214615 A1 | 7/2014 | Greystoke |

OTHER PUBLICATIONS

Dean, Using Large Scale Brain Simulations for Machine Learning and A.I., Google Blog, Jun. 26, 2012.
Mnih, Playing Atari with Deep Reinforcement Learning, Deep Mind Technologies, pp. 1-9, Dec. 19, 2013.
Tat Y. Chan, Vrinda Kadiyali, and Young-Hoon Park "Willingness to Pay and Competition in Online Auctions", 32 pages, 2006 downloaded on May 9, 2017 from http://apps.olin.wustl.edu/faculty/chan/files/WTP%26Competition.pdf.
PCT/US2014/046059, International Search Report, dated Apr. 2, 2015.
PCT/US2014/046059, Written Opinion, dated Apr. 2, 2015.
Richard Magnone, The Art of Finding the Right Tenant, Jul. 19, 2009.

(56) References Cited

OTHER PUBLICATIONS

Preliminary Report and Written Opinion, PCT/US2014/013948, dated Aug. 13, 2015, 4 pages.
Preliminary Report and Written Opinion, PCT/US2014/013952, dated Aug. 13, 2015, 5 pages.
International Search Report and Written Opinion, PCT/US2014/013948, dated May 15, 2014, 7 pages.
International Search Report and Written Opinion, PCT/US2014/013952, dated May 7, 2014, 7 pages.
Dyshlevoj, English Abstract, RU 2254611, Jun. 20, 2005, 2 pages.

* cited by examiner

COMPUTER-AIDED DECISION SYSTEMS

CROSS-REFERENCE TO RELATED APPLICATIONS

The present application is a continuation-in-part of and claims priority to U.S. patent application Ser. No. 14/169,058, filed on Jan. 30, 2014, entitled "VIRTUAL PURCHASING ASSISTANT", which claimed priority to U.S. Provisional Patent Application Ser. No. 61/759,314, filed on Jan. 31, 2013, and entitled "VIRTUAL PURCHASING ASSISTANT"; and is also a continuation-in-part of and claims priority to U.S. patent application Ser. No. 14/169,060 filed on Jan. 30, 2014, entitled "DUAL PUSH SALES OF TIME SENSITIVE INVENTORY", which claimed priority to U.S. Provisional Patent Application Ser. No. 61/759,317, filed on Jan. 31, 2013, and entitled "DUAL PUSH SALES OF TIME SENSITIVE INVENTORY"; and is also a non-provisional of and claims priority to U.S. Provisional Patent Application Ser. No. 61/844,355, filed on Jul. 9, 2013, entitled "INVENTORY SEARCHING WITH AN INTELLIGENT RECOMMENDATION ENGINE"; is also a non-provisional of and claims priority to U.S. Provisional Patent Application Ser. No. 61/844,353, filed on Jul. 9, 2013, entitled "SINGLE PAGE TRAVEL SEARCH AND RESULTS MODIFICATION"; and is also a non-provisional of and claims priority to U.S. Provisional Patent Application Ser. No. 61/844,350, filed on Jul. 9, 2013, entitled "SEARCHING FOR INVENTORY USING AN ARTIFICIAL INTELLIGENCE PRIORITIZATION ENGINE"; the contents of all of which are hereby incorporated by reference in their entireties.

FIELD

The present disclosure is related to artificial intelligence based decision systems, which can be implemented by a computing device, such as a desktop, laptop, tablet computer, smart phone, or any other data processing device or combinations thereof.

BACKGROUND

Computers are complex machines that allow individuals to receive the benefit of significant computational processing power. However, even with sophisticated software, computers merely perform the functions they are specifically programmed to do and generally do not account for differences in users when performing such functions. The computer is generally ignorant of the user's needs. For example, when a user performs a search for information via a computer, the quality of search and thus the quality of the search result will be confined explicitly to what the search system is programmed to return and to the terms provided by the user.

While past computers merely provide pre-programmed results, much work has been done in the area of artificial intelligence ("AI"), which can be defined as any attempt to allow human thinking characteristics (or the artificial representation of such human thinking characteristics). Generally, intelligence is the ability to adapt one's behavior to fit new circumstances. Thus, the goals of AI are to do things with a computer that require intelligence when done by humans. However, some of the difficulties in building an intelligent machine include deduction and learning. Deduction systems have been designed but they can require enormous computational resources once the problem goes beyond a certain size. Rote learning is relatively easy to implement on a computer; however, learning that allows the learner to perform better in situations not previously encountered is much more difficult.

SUMMARY

The systems and processes described herein can provide continuous, intelligent, personally targeted, real-time decision-making tailored specifically to user preferences, behaviors, and locations and in multiple dimensions (reactively and proactively and across various sources of information or products). Such systems can transform the entire decision-making experience by allowing users to initiate a decision process, then lean back, relax, and get on with their lives. In certain embodiments, users can identify exactly what they want, and then the systems and processes described herein can select and present the best results based on real-time prioritization. Further, the systems and processes described herein may actively continue to analyze and provide even better options for each user from which he/she may make decisions.

The systems and processes described herein may find the "best" options not just based on what users tell us they want, but what they actually want. This may be done by integrating a number of factors including: what users tell us they want; what they subconsciously want; what their decisions demonstrate they want; what their activities using the platform demonstrate they want; what people they trust want and recommend; what experts recommend; other factors; or any combination thereof. The systems and processes described herein may weigh these and other factors (both structured and unstructured) across an entire range of actors and behaviors, and then the systems and processes described herein can prioritize the factors to provide results that are precise and comprehensive.

The systems and processes described herein can operate on a full understanding of users' changing needs at different times, different places, based on different personas. The systems and processes described herein address frustrations with traditional search and facilitate delivery of both the "best" results for users at that point in time and "better" results through continuous individualized and contextual search. Also, rather than focus solely on the initial search, the systems and processes described herein can provide a truly personalized experience with results to help users at times of search, selecting results, and later after a result has been selected.

As applied to retail suppliers, the systems and processes described herein can reduce the cost and time involved in locating customers. The systems may alleviate inefficiencies of traditional "pull-based" systems and can enhance customer loyalty. Suppliers may also be able to sell inventory, up-sells, and cross-sells, using dynamic pricing, while minimizing public price degradation or cannibalization.

The systems and processes described herein can provide ground-breaking simplicity (e.g. can locate, book, and modify air, hotel, car, villa, cruise, and tour services personally tailored with extreme precision at every phase of travel: pre-departure, en route, and post-arrival), a continuous search (e.g. to provide cheaper or better up-to-the-minute results, as defined by each user, past the point of selecting a result), and advanced intelligence engines (e.g. the systems and processes described herein can track and learn the preferences, behaviors, locations, requirements, and requests of each user and alert them to ever-more-accurate results, such as timely and appropriate up-sells and cross-sells).

These functions and systems can be accomplished by the decision systems and processes implementing digital personas as described herein. A digital persona is a digital representation of an entity in accordance with a specific set of rules, preferences, or priorities with respect to a defined situation or opportunity. A digital persona may interact with a universe, which can be a set of conditions and information that an artificial intelligence engine implementing the digital personas can perceive. The digital personas can learn, via the artificial intelligence engine, from actions of a user, events in the universe, other personas, a multitude of other factors, or any combination thereof. In some examples discussed, the artificial intelligence engine may include a persona artificial intelligence engine and an evolutionary artificial intelligence engine.

Such decision systems and processes may be implemented via a computing device having a processor and accessible memory. The computing device may execute software to implement an artificial intelligence engine and the personas. The personas may be a string of stored data. The software may include a selector module and one or more artificial intelligence engines. The software may also include a persona manager.

Processes are described providing examples of how to create a persona, modify a persona, select an expert persona, implement a baseline persona, process data, apply the processed data to a persona and vice versa, generate queries via a persona, and others. Various examples of how to apply such systems and processes to different industries are also provided, although the examples herein can be applied to almost any industry sector, such as travel, financial, healthcare, real estate, entertainment, education, military, retail, grocery and produce, employment, education, etc., or to family or personal decisions. Additionally, the systems and processes may be applied to personal decision-making, such as when is the best time for the user to eat his/her lunch, when should I get my hair cut, etc. Further, the systems and processes may be applied to information retrieval in general; corporate decision-making, such as when should I hire another employee; group decision making; and so on.

Additionally, the personas may operate to proactively make recommendations, problem solve, and otherwise assist a user in almost any capacity. The systems described herein can be anticipatory and predictive to understand and know what a user may need or want, and may do so better than the user can themselves. The systems and processes described herein can combine data from magnitudes of users to provide tremendously valuable data and calculations regarding relationships between users' behavior, suppliers' behavior, and market trends.

The systems and methods described herein utilize personas to provide a personalized experience for almost any sector. The personas operate to provide a reactive system that reacts to user queries and requests; and a proactive system that anticipates problems, needs, issues, etc. and that may take steps (without user input) to mitigate or solve those problems, needs, and issues, etc. The combination of reactive and proactive aspects provides a dynamic, constantly learning and evolving system that can always operate (e.g. twenty-four hours a day, seven days a week) that does not need to rest, and that can assist the user in a myriad of ways (sometimes without the user being aware). Some examples provided herein reference the travel industry sector, which is a good example of how the systems herein can provide valuable decision-making capabilities; however, the travel sector is only one of many different sectors in which the systems and processes herein can be implemented. Many other examples, details, variations, and implementations are provided herein.

BRIEF DESCRIPTION OF THE DRAWINGS

In the following discussion, the same reference numbers are used in the various embodiments to indicate the same or similar elements.

DETAILED DESCRIPTION OF EMBODIMENTS

Figure 1:
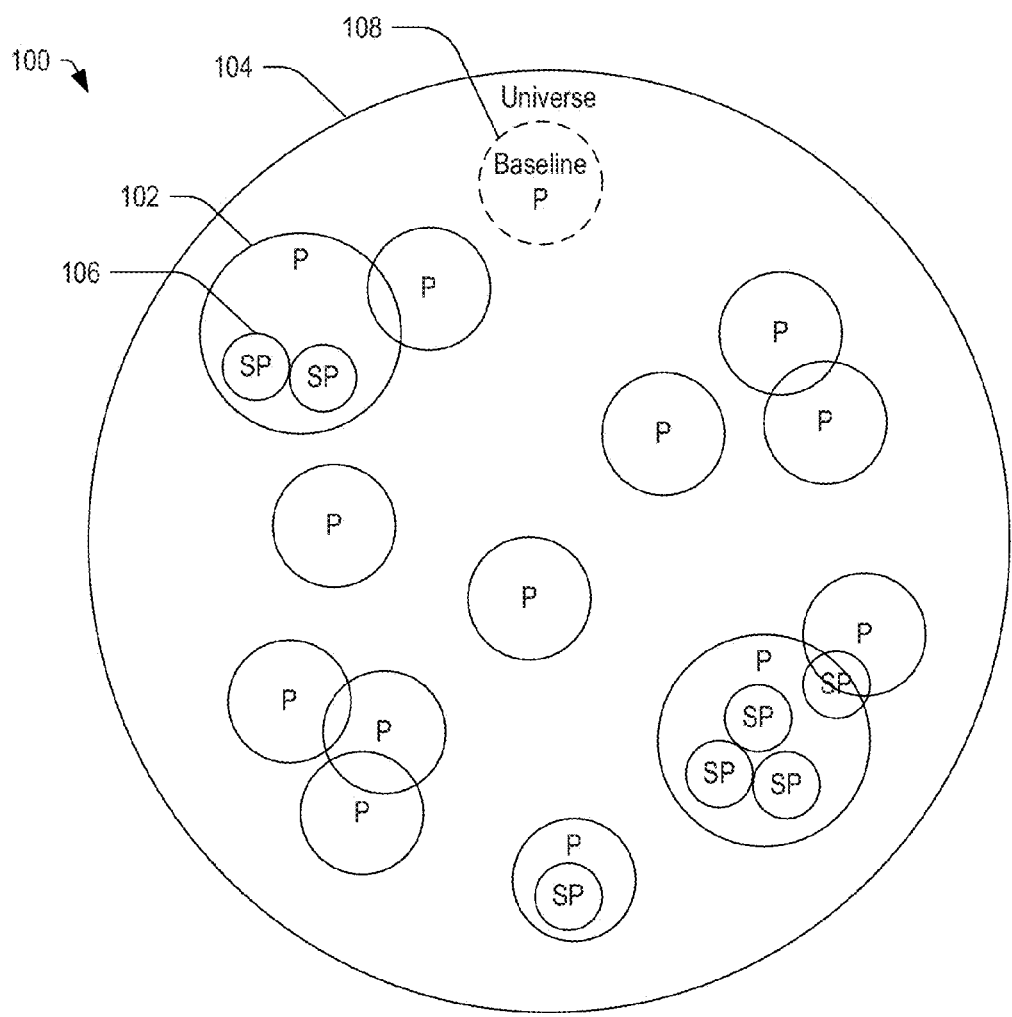
FIG. 1 is a diagram representing systems implementing digital personas, in accordance with certain embodiments.

In the following detailed description of embodiments, reference is made to the accompanying drawings which form a part hereof, and which are shown by way of illustrations. It is to be understood that features of various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with various embodiments, the methods and functions described herein may be implemented as one or more software programs running on a computing device, such as a tablet computer, smartphone, personal computer, server, or any other computing device. Dedicated hardware implementations including, but not limited to, application specific integrated circuits, programmable logic arrays, and other hardware devices can likewise be constructed to implement the methods and functions described herein. Further, the methods described herein may be implemented as a device, such as a computer readable storage medium or memory device, including instructions that when executed cause a processor to perform the methods.

As used herein, a digital persona is a digital representation of an entity (a human, corporation, group, etc.). A digital persona is a digital representation of a virtual being or a real being that has a set of preferences or rules in relation to a certain problem. An entity is a depiction of a virtual or real being that has a set of preferences, weights or tendencies in relation to a certain problem. A potential solution is a solution to a problem that may or may not relate to the priorities of a corresponding digital persona. In certain embodiments, a potential solution may represent a potential option that may be selected to satisfy one or more of the digital persona's needs or solve their problem. A chosen or selected solution is at least one of the potential solutions that, by way of weighing, was chosen to be appropriate (or most appropriate) to solve the problem or that was determined, based on scoring, to be the most satisfactory to the digital persona. An engine is a software mechanism that can process several tasks: such as reads digital persona preferences; obtains a list of potential solutions; combines competing personas into a unified persona; selects between competing personas to identify a subset of possible solutions; and determines optimal solutions with respect to specific situations. Priority is a way to show a preference in relation to other preferences so as to allow the engine to weigh an impact of a preference on the overall score. An entity may be a human, corporation, or group that may have preferences with respect to a certain problem, a set of products, a scenario, a situation, or any combination thereof. An entity may either be virtual or real. The entity may represent a virtual entity, a person, a certain facet of a person (e.g., the user as a business person vs. the user as a family person), or a surrogate (e.g. an entity acting on behalf of an employer, a parent for a child, a guardian in a custodial relationship, a trustee on behalf of a beneficiary). A parameter is a specific set of rules, preferences, and priorities established by a user of a digital persona with respect to a defined situation or opportunity to decide among varied options.

A digital persona refers to a snapshot of information created by an artificial intelligence of any sort, e.g., machine learning, neural networks, evolutionary/genetic algorithms or other sorts, or a combination of some or all of these, to represent the preference and decision-making process of a represented entity. The digital persona can be used to mimic, replace, supplement or otherwise enhance human or other entity behavior.

Embodiments of systems, methods, devices and logical elements are described herein that utilize digital personas in conjunction with artificial intelligence (AI) engines to provide a solution to a problem, which may be in reaction to a user input, such as a query or other input or which may be proactively identified by the persona. Digital personas represent real-world entities within a digital universe of possibilities. Digital personas may learn and evolve over time, in response to implicit and explicit feedback, in response to changes in the digital universe, in response to its own experience and the experiences of other personas. Some examples provided herein reference the travel industry sector, which is a good example of how the systems herein can provide valuable decision-making capabilities; however, the travel sector is only one of many different sectors in which the systems and processes herein can be implemented.

Referring to FIG. 1, a diagram representing embodiments of systems implementing digital personas is shown and generally designated 100. The systems 100 may be implemented via computer devices, such as desktop, laptop, or tablet computers, smart phones, and other computing devices, as described herein. The systems 100 can include digital personas 102 (labeled as "P" in FIG. 1) in relation to a universe 104. A universe 104, of which there may be multiple, is a set of conditions and information that an AI system implementing the digital personas 102 can perceive. A digital persona 102 may have one or more sub-personas 106 (labeled as "SP" in FIG. 1), although, some personas 102 may not have any sub personas. Personas do not have to be distinct. In addition to personas and sub-personas, the system 100 may also have one or more baseline personas 108. These can be a default persona, or may be used when a persona is created, when one does not exist, or when a representative persona may be needed Below are some examples of how a digital persona 102 can be useful. For example, in a digital realm where people search, work, play, buy, etc. (such as the Internet), each individual can have at least one digital persona which represents that individual's interests. Each persona may reflect what an individual thinks she/he wants, what the individual actually wants, where the individual is, when the individual is at that specific point in time both taken in isolation and taken in the context of the individual's time commitments more generally, what other trusted people do, and what experts do. Further, each persona may be impacted by conditions in an individual's life, such as fatigue, job prospects, sudden money, financial hardship, and factors from the outside world.

In certain embodiments, a person in the digital realm can have multiple personas or sub-personas, each adapted for different aspects (such as sectors) of the realm in which the person participates. For example, differing personas may represent that each person can have multiple roles in the real world, such as individual (play, leisure, personal interests, etc.), employee/employer, spouse, parent/child, friend, etc. Further, control of decisions may impact a persona or a subpersona (e.g. if the user is an employee following an employer guideline, a parent complying with a school's travel requirements, or an individual purchasing with someone else's funds). Depending on the context of a particular interaction with a system, the person may be interacting based on one or more of those roles. For example, planning a trip for work may differ from planning a trip for a family vacation; however, there may be some overlap in the personas used for each, that is some of the details of a person or situation may be applied to multiple personas or sub-personas. A situation can impact each persona the same or a different way and the situation can have a global effect on all personas. In a specific travel example, a user may regularly travel for leisure with a spouse and there may be a sub-persona associated with such. There may also be a sub-persona associated with the user for business travel that obtains information from the other sub-persona when the user plans to bring a spouse on a work trip and, as such, decisions and results can be affected based on the different personas.

In certain embodiments, the systems herein may develop multiple personas for each individual, groups of individuals, representative individuals, or the like for various sectors or "planets" in which they participate. As used herein, the term "planet" may refer to a market segment or sector, such as travel, real estate, financial, health care, job, school, or any other categorization in which a persona could be useful. Each planet that a user operates in can have a different persona, utilize a common persona, or may start with a baseline persona 108, which may be determined by a user or by a persona itself.

Various sub-personas, or alternate personas, can be implemented. For example, a travel sector or travel persona may include a business travel persona, a leisure-solo travel persona, a leisure-plus-spouse travel persona, a leisure-plus-family travel persona, a group travel persona, and so on. Though the persona may be associated with an individual user, a persona may change as a result of learned behaviors or information, such as from a user's interactions with a system, other users interactions with a system, interactions between a user and other users, and changing conditions within the user's universe or planet. Also, a universe can change, adapt, and learn as a result of its interaction with personas. Further, some of the planets or sectors may include an "expert" persona or a "celebrity" persona, which may be selected to allow a user to experience the system and its selected solutions in a manner similar to or the same as that of the selected persona.

Personas are not merely accumulations of user interactions, but rather the personas act as digital representations of an individual, a group of individuals, a representative individual, a business, or the like within the digital realm. The personas may evolve and learn from extrinsic data, from other personas, from interactions between the individual and the digital realm, and from a crowd (in the form of multiple digital personas). The persona can integrate and manage the individual user's past, her/his dynamic present, and plans for her/his infinite number of futures. The persona may be configured to react to a request, to an instigated behavior, such as an initiated search or request, or to a circumstance such as a flight cancellation, medical decision-making, business decisions, personal decisions, and so on. However, a persona can also provide results (information, recommendations, etc.) proactively to deal with a problem (whether or not the user was ever aware of such a problem or would consider it to be so), or to present options, that the user may not be aware of.

In certain embodiments, the persona can take actions to prevent a problem or situation or to prepare for one. For example, the persona may detect a potential timing-related issue between connecting flights and may take action to recommend alternatives or to alert the user to the potential problem. Additionally, the persona may detect an available leisure activity at a travel destination (such as a concert or play) and make recommendations to the user based on her/his persona and travel itinerary. For example, a persona may determine that a weather system may cause issues for an outdoor activity and may present several alternative (e.g. indoor) options in case the user's plans are impacted by the weather. Additionally, a persona may learn from its own experiences and mistakes, may learn from explicit and implicit user feedback, from an environment (e.g. planet or universe), from yield management systems, from other personas, or any combination thereof. The persona can always be on and always be alert. Although, a user may choose to perform an interaction with a system utilizing a corresponding persona, and the user may explicitly request that the persona not learn from the specific interaction. Further, a user or a system may have an ability or option to shut off a persona whether temporarily or permanently so that the persona does not learn from the user's interaction. In some embodiments, a user may have the ability to turn off, shut down, or destroy a persona.

In certain embodiments, a persona may be configured to enhance a user's experiences and interactions with a universe. The persona can be continually striving to provide a best, or best available, answer or information to a user. Further, a persona may be configured to redefine proactively what is "best" and may be configured to constantly strive for better results, whether what it is that makes something better is known or unknown, quantifiable or not. A persona may also be configured to develop an experiential understanding of the individual user, its owner or its needs; that is, a persona may learn based on its experiences with a user or its universe Examples of experiential information can include what a user thinks she/he wants, what a user really wants, where a user is, where a user is going, what is happening in the present, what has happened in the past, what is expected to happen in the future, what other users or personas are doing, what experts are doing, what time the user is in, what the universe is learning or doing, what people the user trusts are doing, what suppliers or companies are doing, in what capacity the user is acting, and who the user is at that moment in time. A persona or decision system implementing persona-based decision-making may have the ability to make decisions autonomously, or the system may make recommendations, assist, observe, correct, or advise a user or another system. Also, a decision system may have the ability to formulate a detailed need or additional needs from an understanding of a simple need of a user.

In some examples, a persona may be sensitive to time, place, or occasion. In some instances, a persona could determine if it was a proper time, place, and setting to contact someone. In certain embodiments, a system may be able to analyze two or more personas simultaneously, or to analyze a persona with respect to other personas. In some instances, two or more personas can be cross-analyzed to pick out a likely agreement position for two parties, such as in choosing a restaurant or settling a dispute.

Other examples of functions, which a decision system implementing persona-based decision-making may perform, include: negotiating on a user's behalf, trading on a user's behalf, scheduling or holding meetings for a user, evaluating potential fits for a solution, communicating on a user's behalf, identifying experts or influencers, becoming an expert or influencer, or communicating wishes or need to other systems or devices.

In certain embodiments, the persona may be transferable or usable by a third party, which may rent, purchase, copy, and make use of the persona with permission. For example a user may want to replicate another persona's behavior in an area of expertise or because someone wants to access a persona that has learned from a specific experience.

Figure 2:
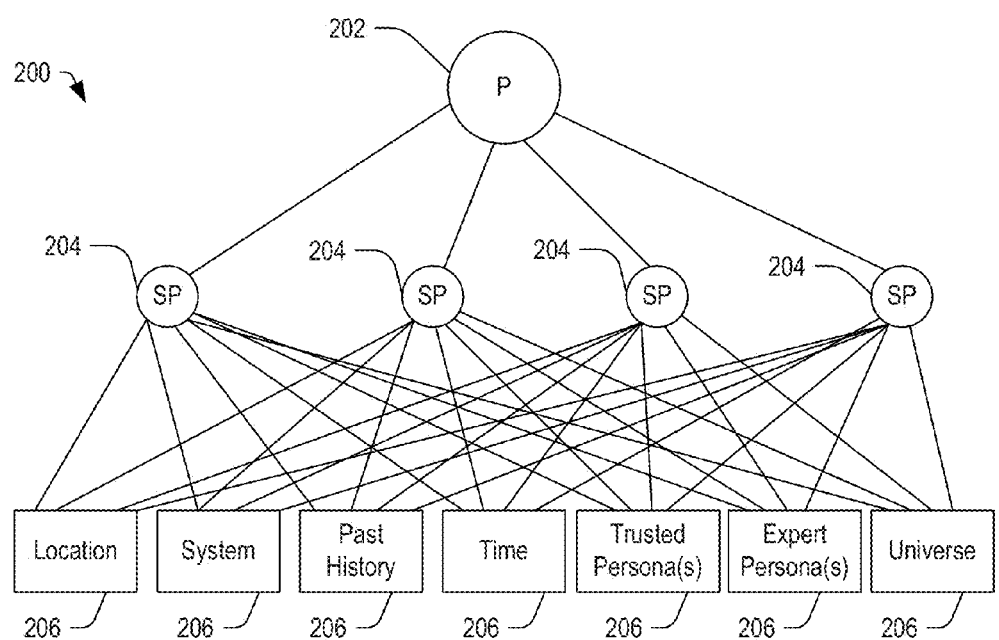
FIG. 2 is a block diagram representing decision systems implementing digital personas, in accordance with certain embodiments.

Referring to FIG. 2, a diagram representing embodiments of decision systems implementing digital personas is shown and generally designated 200. The systems 200 may include one or more personas 202, one or more subpersonas 204, and one or more influence factors 206. In some embodiments, there may not be a differentiation between subpersonas 204 and personas 202, and the influence factors 206 may directly correlate with the personas 202. Further, the influence factors 206 may comprise data received from a system, user, or universe via data transmissions networks, user input devices, or other personas accessible in a memory.

In certain embodiments, the influence factors 206 may influence one or more of the multiple personas (subpersonas 204 or persona 202). A persona 202 or 204 may change as a result of information determined from the influence factors 206. An example list of influence factors may include location, a system, past history, time, a trusted persona, an expert persona, a universe, any other factor, or any combination thereof. While some examples of influence factors are provided, any information that could potentially help in developing a persona to accomplish an intelligent task may be used as an influence factor.

In some embodiments, multiple digital personas may be engaged in making a decision when faced with varied options. A system may implement a set of digital personas that compete among themselves to resolve a problem in order to achieve a solution that best mediates the interests of the user of the digital personas. The system thereby may achieve optimal results for that user. To do this, the system implements processes that occur when the competing priorities, opinions, needs, and desires of the digital personas collide. When introduced with a problem, the system can deliver specific facts and circumstances at hand to an engine with a list of digital personas, where each of these digital personas offers a potential solution in accordance with the following process: (1) the system can produce a solution aligned with specific preferences and restrictions pre-established by the user within each digital persona; (2) the system can conduct a competition among the digital personas to determine optimal solutions for the user in the context of the specific facts and circumstances of each user request; and (3) the system can thereby resolve the problem presented by the user of the digital persona. Throughout the process, the system can intelligently track, collate, analyze, and record each solution and thereby continuously learn the habits and behaviors of the user of the digital personas to achieve ever-more-effective results. In certain embodiments, the system may update a digital persona in response to a trigger event, such as a control signal, a periodic signal, an end of a user session, or some other trigger. The system can allow each artificial intelligence system to describe its approach to solving a problem and allows each digital persona to incorporate the different preferences of the entity (e.g., individual, group, business, etc.). Each digital persona can have the ability to establish a position (a solution that has to compete against other solutions) for its different sub-members as well as its overall position. The different sub-members may include a sub-persona or may include an individual persona within a subset of personas.

A digital persona includes a plurality of parameters, and a member/characteristic parameter of a digital persona may be any value (of any type). The parameter can be any piece of information, whether structured or unstructured, or a combination of structured and unstructured information. An example of a parameter may include price; a stated or inferred preference, such as "I like bananas", "I prefer flying in the morning"; something the user dislikes, such as "I hate that airline"; or anything else, however specified, including free text. Each digital persona may have dynamic, changing values for any or all of its parameters. In the process of teaching a persona or in the process of a persona learning, the persona may acquire new parameters from its experiences, weights of one or more of the parameters may change, or any combination thereof. In an example, if a human or entity has a persona and that persona experiences a new situation (e.g., the persona was exposed to travel products and is now being exposed to insurance products) or if a human or entity is exposed to similar products as before but to which a new parameter has been introduced, the persona can acquire one or more new parameters corresponding to that exposure. In another example, a first user may be exposed to flight information. Suddenly, some of the flights to which the persona was exposed have new information (such as "seat comfort availability"); that new parameter can automatically be acquired by the persona and the experience the persona had can allow this parameter to be assigned a weight.

Each digital persona and digital persona aspect (i.e., the digital persona as a whole and each of its parameters) can have a power parameter allowing the system to know its preceding power and position within a group of digital personas. The power parameter of a digital persona may influence the effect on the decision-making process, such that the higher the weight of that digital persona the greater its effect on the decision-making process, relative to the effect from other competing personas. Additionally, in certain embodiments, a persona having a higher power parameter within a group (a subset of personas having similar attributes) may have a greater influence on the evolution of the baseline persona for that group as well as a greater influence on its evolution and on the possible solutions identified and scored using that digital persona. When a digital persona's parameter has a higher power parameter for a certain aspect of the offered solution, this specific aspect will have more weight in determining the whole solution. Some digital persona parameters may be configured as having either required or discretionary influence powers. In certain embodiments, personas may be affected by the powers of other personas, such as a leader, a mentor, an expert, a celebrity, another persona that represents a trust relationship with another entity (family member, friend, etc.). In certain embodiments, when a new persona is created, the affecting persona(s) may provide the new persona with some parameters ("abilities") from the outset, rather than starting from scratch.

The system can allow setting of digital persona characteristics, content, and values in advance, and can allow changes to those digital persona characteristics, dynamically. In certain embodiments, a company may configure a baseline persona for its site that may have particular preconfigured parameters to influence data retrieval to drive traffic toward particular solutions. Additionally, the power of each parameter may be modified by design or as a result of a problem solving procedure. Changes may be permanent or temporary for a certain problem solving procedure. Further, changes may be pushed to other personas.

Following activity or interactions involving the digital personas, the system can generate a set of potential solutions. These can be of any type. These potential or possible solutions may be of different types. Further, the possible solutions may represent potential solutions to different aspects of a problem. For example, a solution for the travel sector can include all the potential flights from place A to place B, as well as alternative travel arrangements involving planes, trains, boats, automobiles, or any combination thereof. In the financial sector, a solution may be all potential mortgages. In ecommerce, a solution may be a set of products (they may be products from different sectors with different parameters).

To calculate a solution, the group of digital personas can be presented with the solution set. Each digital persona can look for solution parameters it has a suitable "opinion" about; the matching process may be as simple as semantic comparison or use of other methods to find a certain similarity such as using a dictionary, taxonomy, ontology or other available comparison techniques. Whenever a digital persona finds matching parameters, it adds a reference to its opinion on the parameters to the solution. Once each digital persona has "expressed" its reference and its recommended solution, the calculation process commences.

A calculation process may include: (1) ascertaining whether any solution parameters have required (i.e. veto) references; if any solution parameters hold one or more required references, the top required reference is announced as the final score for that parameter; (2) attaching scores to suitable solution members; (3) calculating digital persona power over scores; the parameter's scores can be amended to reflect the power differentiation between all digital personas; (4) scoring all parameters; an average of all scores can be created for each parameter; and (5) summing each solution score; once the solutions are scored, the system can now suggest the best suitable solution based on the summed solution scores.

In certain embodiments, once the calculation process scores the solutions, the system can choose the highest scoring solution and present it as the best score. The system may allow tweaking and the creation of "what if" scenarios. Additionally, the system may allow choosing the best score in a certain subject, group or vertical. For example, "give me the best scoring solutions for best price of a product", "give me the best scoring solution with highest life span of a product." The term "vertical" may refer to a particular market sector, such as travel, financial, healthcare, real estate, entertainment, education, military, retail, grocery and produce, employment, etc.

The system can combine the digital personas that are involved in solving a certain problem. This process can collect all the preferences from all participating digital personas and combine them into one digital persona that manifests the combined needs, wishes, and priorities of the participating personas. The process takes into account each digital persona and has its own preference. Once the system finds competing, overlapping or contradicting preferences, it mitigates among them. The result is a set of preferences for a new, higher level, digital persona.

The higher the order of combining digital personas, the system can gather information about the way colliding preferences were resolved. The resolution of these collisions is graded so the system can weigh the various digital personas' changes for ease of collision resolution in the future. In certain embodiments, when one or more personas are being used in a certain situation (e.g., a corporate brain (multiple personas representing a single corporation) combined with an employee brain (multiple personas representing an individual), the system may establish a "combined brain", which can be used in the process of decision-making. Once the process is finished, the system may gather statistical information on the relations between the personas involved. The system may later inform the entities on the roles they play within the group of personas. For example, the system may inform a user associated with a corporate persona that a rule of "always flying on Saturday mornings" is very impractical and does not work in reality.

An entity is a depiction of a virtual or real being that has a set of preferences or rules in relations to a certain problem. The "problem" could be a scenario, decision, product or a set of products or any other occasion or event where a decision is to be made in regards to choosing one thing over the other. Examples of an entity include a person, a corporate, a group of people, or any combination thereof. An entity may have zero or more digital persona. The entity may have a set of Personas, each for a different problem, or a way to make a decision. For example, an entity has one digital persona mimicking the person's behavior when grocery shopping, another digital persona mimicking the person's behavior when grocery shopping for a friend and another for shopping for a family member. That person's behavior may change based on the context in which the problem is presented and based on the different occasions, time and places. The system is capable of identifying when the entity changes a persona, e.g., when a person acts as a business person, a family person, a social person engaging with friends, or a person in stress, danger, on a holiday, and more.

In certain examples, a persona may have the following attributes: (1) Name: to be used to identify this persona; (2) entity: who does this persona belong to; and (3) variation: states or scenarios in which the entity acts. For example, variations in personas might be used for the entity John Smith when he is buying groceries for the family versus the entity John Smith when he is traveling on business.

A results set is a list of potential results that is introduced to the scoring engine (e.g., the artificial intelligence engines configured using the personas). The system can use the multiple digital personas to score various characteristics for each result and come up with a total score per result, which can allow the system to find a suitable result for the problem at hand.

Once a combined digital persona is achieved, the system can read each characteristic of each result in the results set and look at each preference of the combined digital persona. A preference matching procedure can try to find correlations between the preferences of the various digital personas using one or more of the current state of the art matching technologies, such as simple comparison (e.g. field names of similar value), approximate string comparison, using anthologies, using machine learning, or other string matching technologies. When a correlation is found (see below), a score can be added to the result.

In certain embodiments, a user may perform a search. The system may translate the user request (or search) into a standard request (such as by normalizing the search or request into a suitable format) and translate the standard request into the "language" or application programming interface (API) of each vendor supplying products. The system may request the current product offering from each vendor in parallel using the translated standard request. In response to the request, the system may receive results, which the system may translate into standard results. Each result may be scored by one or two AI engines based on the user persona. In case the user is a corporate user or that user is part of a "group of personas", a combined competing brain virtual persona may be created to represent the sum of all participating personas. If the persona of the user is relatively new or is not "mature", a persona AI engine may perform a weighing function on the data and the evolutionary AI may be skipped. If the persona is mature, a persona AI engine may perform the weighing function on the data together with an evolutionary AI engine. After the weighing is performed, a selector/optimizer (dynamic product offering tool) may choose which results to provide to the user. Each of the results, selected or not, can be stored in a memory, such as a cache.

The user may interact with the system by looking at product offerings, showing interest in one or others, or disregarding some. This is the user's experience. The user interactions (products viewed, time on the pages, etc.) can be fed into the system to allow a persona to learn from the interactions. The system can calculate a personal delta based on the user's experience with the product offerings, so the characteristics of the products in which the user showed interest may gain a "reward" in terms of weighing, while those products the user ignored may get a punishment (demerit) in terms of weighing. The experiences of the user with the offered products can be compared to the characteristics of the user's persona. If a normal deviation is found from one of the characteristics of the persona, that persona may be adjusted (tweaked). If no normal deviation is found, a new persona may be created and the adjustments (tweaks) may be represented as a difference between a basic default (baseline) persona and the new changes. The user may modify search terms, the profile, perform other tasks, request the same search again, and so on. In response to a request to perform the same search, the system may use the cached results (if they haven't expired) and recalculate the AI score for each result.

User experiences may also be provided to an evolutionary AI engine, which can receive the user request and the set of potential solutions (products, results, etc.). The evolutionary AI engine can also receive user behavior data and data related to the overall "success" or "failure" of the process. In certain embodiments, success and failure may be determined by an administrator (a human operator) of the system and can be adjusted.

In certain embodiments, multiple competing "brains" or sets of personas may produce solutions. A solution may be chosen from the set of potential results, and the selected or chosen solution can be introduced to the entity group. That entity group may be human or virtual, and the user represented by the entity group may interact with the system to decline the chosen result. The system can receive a returning alert that the result was declined and that another result was selected. Choosing another result can be performed by showing other results, a subset of the results, or the entire results set and by receiving an input indicating a selection of a particular result. Choosing another result may, or may not, result in showing some aspects of the scoring process in order to assist the entities to make another choice. Once another result is selected, it may be referred as a learning set to the engine, which may be a "state of the art" machine learning mechanism such as neural network, genetic algorithm or other current technology that is used in order to tweak the preferences. The result of the process is an automatic tweaking of the preferences whenever a same subject is researched by the same entity group and the same parameters are attributed to the result set. In certain embodiments, the system can also process situations in which a result is presented to a user and the result isn't declined but is ignored by the user or is almost selected by the user, but then the user changes her/his mind. The small signals may be detected based on the user's interactions and non-interactions, such as adding an item to her/his shopping cart and then either removing the item or allowing the item to sit in the shopping cart for a period of time, such as until a session expires.

A repository of sorts, for example a database, can include requests, entities participating, parameters of the result set and the chosen solution. The repository may also store information about what items were looked at and for how long; what items were ignored; what items were nearly purchased but were not purchased; other selected or reviewed items; and so on. In certain embodiments, the system may infer why a particular item was selected but not purchased. These can be later used by the machine learning mechanism.

In a travel example, three digital personas may have both requirements and preferences over a flight: digital persona #1 may include the corporate's requirements and preferences for booking a flight, digital persona #2 may include an employee that has to book a flight, and digital persona #3 may include the employee's manager.

Digital Persona #1—Corporate Digital Persona—Multiple 10

| Member | Value | Power | Sub value |
|---|---|---|---|
| book 4 days in advance | Veto | 8 | false |
| Fly American airlines | 5 | 5 | true |
| Cost less than $200 | 5 | 2 | true |

Digital Persona #2—Employee—Multiple 5

| Member | Value | Power | Sub value |
|---|---|---|---|
| Prefer flying in the morning | 4 | 4 | true |
| Fly on weekend | 5 | 5 | false |
| Fly wherever I have loyalty status | 5 | 2 | true |

Digital Persona #3—Employee's Manager—Multiple 6

| Member | Value | Power | Sub value |
|---|---|---|---|
| shortest duration | 5 | 5 | true |
| shortest number of total trip days | 5 | 5 | True |
| In case of emergency fly on short notice | Veto | 10 | true |

The calculation process may be performed in one or more of several ways such as neural networks, genetic algorithms or more. The example here shows the "attachment" process.

Solutions, Assuming the Current Date is January 1st:

| # | Date | From-To | Airline | Class | Price | Departure | Duration |
|---|---|---|---|---|---|---|---|
| 1 | 03 Jan | LHR-JFK | Southwest | economy | $400 | 8 am | 4 hrs |
| 2 | 05 Jan | LHR-JFK | Southwest | Business | $650 | 11 am | 2 hrs |
| 3 | 05 Jan | LHR-JFK | AA | Economy | $600 | 9 pm | 4 hrs |

Phase 1 includes adding veto (required) references. Examining Solution 1 Departure Member: added veto: 8 by digital persona #1, added veto: 10 by digital persona #2. Results: Solution #1 is not canceled thanks to the overpowering veto of digital persona #2.

Phase 2 includes attaching relevant scores. Digital persona #1 attaches the relevant scores to airline and costs. Digital persona #2 attaches the relevant scores to duration and airline. Digital persona #3 attaches the relevant scores to duration and total trip days.

Phase 3, all power multipliers are calculated.

Phase 4, all scores for all solution members are calculated.

Phase 5, the system finds solution #1 is the best compromise between all competing digital personas.

In some examples in the travel sector, a system with multiple artificial intelligence digital personas can interact with each other and prioritize against each other in order to provide the best results in any given situation. This interaction can occur in a wide variety of sectors with one example being corporate purchasing.

In the travel business, a company could determine that it wants its employees to carry out their travels in accordance with a set of defined rules and regulations. For example, always take the cheapest flight (assuming flight schedule is within boundaries), stay at a hotel under $200 a night, fly a specific airline wherever possible, and rent cars from a specific car rental agency wherever possible. However, there may be considerations that the company does not specify. For example, which flight to take if two flights have the same price and neither of them is the preferred airline, what airport to fly from if there are several options available, what car type to rent, or what room type to choose. As long as these choices are not specified to the system, they may be left up to the individual to decide. From the company's perspective, while they want their rules abided by, they also want happy employees and therefore ordinarily they will allow the employees to use their discretion where rules don't exist. There is also always the opportunity for an employee to request that a rule is waived but the process whereby any such waiver is requested and potentially granted is usually burdensome. The process of recording employee travel, individually and collectively, is also arduous and time consuming, particularly gathering and reimbursing expenses.

The systems and processes described herein may present solutions to these problems and others. A travel platform or platform in another sector can rely on artificial intelligence and big data analysis to recommend the best choices for any entity, whether individual or corporate, at any point in time, reflecting the circumstances in existence at that point in time. The platform can react in real time to different digital personas using the platform, whether the corporation setting up rules and preferences within it, an individual using it to search for travel products for corporate travel, or an individual using it to search for travel products for his own travel. The system can also analyze behavior, trends, decision-making, preferences and activity to map like-minded users and to learn from user behavior and discoveries, whether or not the users realize that they have made any such discovery.

In addition, the platform can map the inter-relationship between the corporate rules and preferences, which are ordinarily an absolute, and the individual rules and preferences to understand that the corporate rules form the major or primary digital persona while the digital persona rules form the minor or secondary digital persona, meaning that in cases of conflict the corporate digital persona prevails. The platform also understands that a relationship can be dynamic, as are the rules and preferences. A system can have a mechanism whereby a user can either electronically or manually request a waiver of one or more rules or submit a request to purchase a travel product or products, which don't fall within the rules. In certain embodiments, the platform may proactively suggest that a waiver is requested for the user where a much better potential outcome is available. In another scenario, if such a request is granted or the purchase is approved, the platform can either process this as a-one time exception or automatically update the rules to reflect what has been agreed going forward.

In another scenario, an employee may wish to book individual travel using corporate rates negotiated by his employer, if allowed by the employer, or may wish to use the travel platform used by his employer because of the benefits it offers. A platform can recognize the different non-work related digital persona of the user and understand that the corporate digital persona programmed into the platform is not relevant to this scenario, while the individual digital persona can become a primary persona.

The platform can also suggest to a user to create detailed major individual digital persona, which can incorporate not only the rules and preferences he is allowed to choose from when travelling on corporate business, but also opens up those rules and preferences that are chosen by the corporation when he is on work business. The system can understand that, for individual travel, it is to analyze the major individual digital persona rather than the minor one, which also sleeps for the purposes of such travel. The platform may enable the user to create multiple different sub-digital personas.

For example, for when the employee is travelling alone, or with a spouse, or with the spouse and children, the system can create subpersonas for each of the employee's family members so that the platform can recommend items that may improve any of their experiences during the trip. Also, the system can find a family event or find an event specifically tailored to a single member of the traveling party.

In addition to the above, the platform can continuously search for better results after the initial search with better results preferences being defined either by the corporate digital persona only (if the user chooses not to add individual preferences to those defined by his employer), by the corporate and individual digital persona working in tandem as described above, or by the individual digital persona only, reflecting one of his digital personas or sub-digital personas. In certain embodiments, the platform can also proactively suggest what "better" may be, based at least in part on its learning, irrespective of personas. In certain embodiments, the platform may be configured to look for "better" results without being asked (i.e., without user interaction to initiate the searching for "better" results). This can allow the platform to be anticipatory and predictive. In certain embodiments, the platform may be configured to suggest a "better" search that may yield better results based on its understanding yield management systems, rules, group intelligence, and intended results. Further, a persona or personas may reference collective wisdom (e.g. information) gained from interaction of a variety of users, such as those who are similar and dissimilar in generating suggesting capabilities. This can help provide anticipatory and predictive results for users.

The platform can help the user throughout the trip by offering upsells and cross-sells appropriate to their needs, circumstances, location, time, digital persona and other factors and can analyze the user's response to such offers to make smarter offers. In certain embodiments, the platform may provide offers that incorporate dynamic pricing. In certain embodiments, the platform may predict upsells and cross-sells that the user may want (or need) based on the user's trip or based on the occurrence of a particular scenario (or the likelihood of its happening). In an example, the platform may recommend that the user purchase travel insurance for a particular trip based on a potential scenario, such as a likelihood of bad weather and so on or predict the need to organize a car service in a location where transportation is limited and hard to come by.

The platform also can have an ability to cross-analyze other corporate digital personas, other corporate and individual digital persona combinations, or other individual digital personas, as well as the travel market as a whole for numerous purposes. Such purposes may include making suggestions on improvements to the digital personas, making suggestions on better searches to carry out, gathering data on market habits or travel opportunities, or making suggestions for other reasons. In certain embodiments, the platform may proactively suggest "better" searches, based at least in part on its learning, irrespective of personas. In certain embodiments, the platform may be configured to look for "better" results without being asked (i.e., without user interaction to initiate the searching for "better" results). In certain embodiments, the platform may be configured to suggest a "better" search that may yield better results based on its understanding yield management systems, rules, group intelligence, and intended results.

The platform can keep records of transactions, searches, continuous searches, cancellations, past, present, and future activity, as well as upsells and cross-sells offered or purchased throughout the trip. In certain embodiments, the platform may compare the transactions, searches, cancellations, activities (past and present), related offers (upsells and cross-sells) and so on to that of other users, to learned or predicted selections, to expectations of the platform itself, etc. The comparison may be utilized by the platform for learning. Additionally, the platform can share this data with the corporation, with individuals, or others and can incorporate expense tracking into the data.

The system or platform may be configured to assess a "true" value of a product by itself, or on behalf of an entity (for example, a user, a supplier, a group, an organization, or any combination thereof) on a real-time basis. "Value" is currently perceived as something that is mainly centered on a monetary amount, but the system applies a multi-dimensional assessment process that determines multiple values for a particular product, based on decisions made by other personas, expiration of the product, time, date, price, quantity, other factors, or any combination thereof. The combination of the multiple values provides an assessed value or determined value, which can be used to determine a "best" option, such as the option that provides a maximum "bang for the buck" for the entity.

The platform can work with every type of travel inventory, including commoditized and non-commoditized travel and with combinations of travel and non-travel inventory, for example dining. The platform can also respond to structured or unstructured or semi-structured searches carried out by short message service (sms), multimedia message service (mms), email, voice, applications, or any other mechanism. The platform can respond reactively to a search or can store the search request and respond proactively over a period of time with suggestions and guidance, instigating a discussion with the user. In certain embodiments, the platform may instigate a discussion without requiring a search. In certain embodiments, the platform may present opportunities to a user, which opportunities may be based on the persona, based on learned or predicted selections for the persona and for similar personas or based on its understanding of the user or based on events that impact or may impact the user. The platform may be proactive, reactive, or a hybrid of both. Further, the platform can be always on, constantly learning, and experiential, learning experientially from the persona, from other personas, from the universe of possibilities, and so on.

Personas may be generated for individuals, groups, or entities. Further, personas may be generated for particular roles among individuals, groups or entities. For example, an individual may be represented by a digital persona for each of a multitude of roles that he/she plays in the real world, such as an individual leisure persona, an individual work persona, an individual plus spouse persona, an individual plus family persona, and so on. The role at the particular moment of interaction with a persona-based system may impact the information retrieval process, the presentation of the information, and so on. Further, the system may be configured to proactively recommend various options (or even take steps, make decisions, and so on) based on a selected persona, which recommendations may vary based on the context inferred by the system. The system may combine artificial intelligence and real time, crowd-sourced human intelligence to provide a personal Internet presence (persona) that can be used to produce intelligent "best" results at a first time, to provide continuous "better" results over time, and to enhance a total experience of the user. In certain embodiments, the system understands that, unlike many yield management systems, "best" and "better" are not all about price. Instead, the system understands that figuring out "best" and "better" is a dynamic, complex process, and that there may be multiple interpretations of what is "best" or "better", whether from the user, from the system, from the supplier, or from any combination thereof and that these interpretations can change based on time, location, events in the Universe, etc.

In certain embodiments, systems and methods described herein utilize personas to provide a personalized experience for almost any sector. The personas operate to provide a reactive system that reacts to user queries and requests, understanding such queries and requests in an experiential manner that takes into account the totality of the user and his "needs" as opposed to simply focusing on what is requested; and a proactive system that anticipates problems, needs, issues, etc. and that may take steps (without user input) to mitigate or solve those problems, needs, and issues, etc. The combination of reactive and proactive aspects provides a dynamic, constantly learning and evolving system that can always operate (e.g. twenty-four hours a day, seven days a week) that does not need to rest, and that can assist the user in a myriad of ways (sometimes without the user being aware).

In certain embodiments, the personas may capture slices or snapshots of information about the user in various contexts, from travel planning to Christmas present shopping, and from research to healthcare. From those slices of information, user preferences, decision-making processes, likes/ dislikes, and other data may be gleaned, providing a persona that represents the preferences and decision-making of a human being or other entity in the digital realm. That persona may be involved in every aspect of the user's experience, from how the GUI may be presented to a particular user to how the results may be presented within the GUI, from how questions are interpreted within the system to how results may be weighed and selected, etc.

In certain embodiments, a persona may operate continuously to search for "better" options for a user's query (i.e., better options than that which the user selected, or better options than those that were previously presented to the user). Those better options may be understood to be "better" based on the user's prior interactions with available options (which results he/she viewed, which results he/she viewed for longer than others, and which results he/she ignored).

In certain embodiments, the persona may "watch the user's back" in the real world by managing aspects of the user's experience in the digital realm (e.g. analyzing and predicting risks for the user, as well as suggesting or implementing solutions to reduce risk). Some or all of the user's experiences, however minor, may be fed to the system for informing the persona. The information gathered by or provided to the persona may not be limited to search or query or requests for assistance. Rather, the information may be gathered and correlated to the persona over time from various sources. That information may be used to provide further services and enhanced experiences over time.

In an example, a user may have a prescription for a particular prescription drug, such as a high blood pressure medication. The persona, having knowledge of this prescription, may detect that a generic version of the prescription drug has just become available. The persona may generate an alert to the user to notify him/her of the newly available generic version. In some instances, the persona may also remind the user at a time when the user needs to refill his/her prescription that a cheaper generic version is now available.

In the context of travel, the persona may be aware that the user has two dogs, and that arrangements may need to be made for kenneling the dogs when the user travels. In certain embodiments, the persona may generate a list of items that need to be completed prior to departure and may provide the list to the user, may initiate arrangements and surface an alert to the user to finalize the arrangements, or may make reservations and appointments on behalf of the user based on the user's calendar. In certain embodiments, the persona may communicate with the kennel where the dogs usually stay to verify availability and may tentatively make reservations for the dogs to stay, notifying the user that the reservations have been made but that the reservations may require confirmation and providing the phone number to confirm. In the event of travel abroad, the persona may determine that the user has not yet been vaccinated for a certain disease and that vaccinations for that disease are recommended when traveling to a particular region, and may tentatively make a doctor's appointment or alert the user to make a doctor's appointment to complete the recommended vaccinations.

The examples provided herein are representative of the experiential nature of the personas, which learn from and about the user and put such information to work on behalf of the user, continuously. In another example, the persona may determine a health history associated with the user, and may prompt the user to pursue a particular follow up regimen based on its knowledge of the user. In some examples, the persona may identify a health-related journal article corresponding to a health issue of the user and may alert the user to the article.

In certain embodiments, the persona may operate as the best personal assistant a user could hope for, attending to the needs of the user and, to the extent possible based on the information available to the persona, anticipating the user's needs and wants. The persona may anticipate the user's needs and may provide the user with options and solutions for problems or issues that he/she did not even know existed. In a particular example, after travel plans have already been made, the persona may determine that a dangerous political situation has arisen in an area that may affect a leg of the user's trip. The persona may identify alternative travel arrangements to circumvent the political turmoil, and may either automatically adjust the itinerary or may recommend alternatives to the user from which the user may choose.

The process of creating and enhancing a digital persona involves creating a digital snapshot of human behavior and preferences at a point in time. This snapshot may include a multi-dimensional object tree of a persona that can be related to other personas (both of the same user and of other users), and, by summing the data of the snapshot, an entity can be created from the persona that can be used by its owner. The owner can then lease, sell, loan, or otherwise share his/her persona to other users for their use in order to get a solution to problem in a manner in which the owner would have solved it.

In certain embodiments, persona changes can be saved in a time series manner in memory where the "state" of the persona can be tracked over time, allowing research on its evolution. For instance, a version (e.g. snapshot) of a persona may be saved for every incremental change to the persona, along with a time stamp of the change. Personas can therefore be multi-dimensional object trees that represent behavior and evolution of a digital entity from a baseline entity, to a current state that mimics human behavior of a certain user at a point in time. Over time, the personas may evolve to reflect new information, mirroring the user's own evolution and even expanding beyond a user's evolution as a persona adds dimensions from other users or other personas.

In certain embodiments, the personas may be influenced by or may adopt wisdom accrued from other personas, i.e., "crowd wisdom". In an example, the system may identify groups of personas belonging to multiple users that have similar preferences or behaviors. By grouping users with similar preferences or behaviors, the system can generate a group of personas that can jointly evolve in multiple ways. For example, a less "evolved" persona (e.g., a newly created persona, a little used persona, etc.) can learn from the more evolved persona in the group. When a user with a certain persona (that is relatively immature persona or a persona with less experience than others) is identified as belonging to a certain group, that user's persona can leverage the experience of the crowd by borrowing preferences, decision-making criteria, and so on from a "group" persona or from other "expert" personas within the group. In an illustrative example, a first persona of the group represents a first user that has tried five wines originating from New Zealand. A second persona of the group represents a user who has experienced over 50 wines from New Zealand. Both users have been identified as having similar behavioral patterns, causing the system to associate them with the group. When the user associated with the first persona is about to purchase the next wine (from New Zealand or from another country) several possibilities may occur: 1) the second persona may affect the decision-making process; 2) the system may offer the user of the first persona products that were successful for the user of the second persona; or 3) the second persona's experience may be shared with the user of the first persona.

In some examples, the user of the first persona may search using certain terms, change the terms and change again. At that point, the system may determine that the second persona when through a similar experience. In response to making that determination, the system may provide the results of the last search made by the second persona that had a "success" to the user of the first persona.

In certain examples, a mature persona can become a trend maker or fashion maker for the group. In another example, by tracking or following randomly selected personas, the system can utilize behavioral forecasting to identify a user's persona archetype, making it possible to simply and easily classify the persona into one or more groups.

The problem with current statistical "people who bought this also bought that" approaches is that the statistical solution creates a barrier that makes adoption of new trends very slow. The system accepts new trends much more easily. When a first user and a second user have personas that belong to the same behavioral group and when the second user creates an "anomaly" (buys a product out of their "usual" decision path, makes a significant change to preferences/brain, etc.), the system allows the first user to be exposed to the changes by the second user by the way of showing first user the results of those anomalies. This allows "trend makers" to be followed immediately, even before a "trend" becomes widely accepted.

In certain embodiments, when an unknown user starts creating a behavioral experience with the system, the system may compare that user's behavior to the "first" of available persona archetypes. Having grouped personas allows quick identification (e.g. using image processing, or other comparison techniques). The user can quickly be identified to a group and thus have access to the "Experience" for the group even if that persona is immature or the person behind it is inexperienced.

By creating a digital human experience persona, the system is able to "copy" the "spirit" of human experience, behavior and decision-making in one a first scenario (e.g., when that human (user) is buying a travel product). However, by making multiple digital entities that create copies of this persona in different scenarios, the system creates a more and more accurate copy of that human. Given enough time and future availability of computer power and storage power, it may be possible to create a digital representation of the multi-dimensional human. For example, it may be possible to generate a digital persona that can mimic or otherwise digitally represent a human being, even after the human on which the digital persona is based is no longer with us (i.e., has died). In certain embodiments, a digital persona could be created to represent a person, such as Einstein, George Washington, Dennis Rodman, or other individuals.

The persona may operate in conjunction with AI engines on a computing system to provide a dynamic personalized experience that yields the best results for the user, where the user is identified at her/his essence at that point in time. The persona can take into account the user's statements, actions, locations, time, relationships, expert information, what is going on in the world around the user, and so on, and assists the user by finding the result that best suits the user at that moment. The system understands that the decision-making by the user may vary from time-to-time based on context. Such variations may be reflected by a collection of personas that represent the user in those different decision-making moments or roles. Embodiments of a system, which may be configured to make use of personas, such as to provide a personalized, intelligent search, retrieval and proactive recommendation interface, is described herein with respect to FIG. 3.

Figure 3:
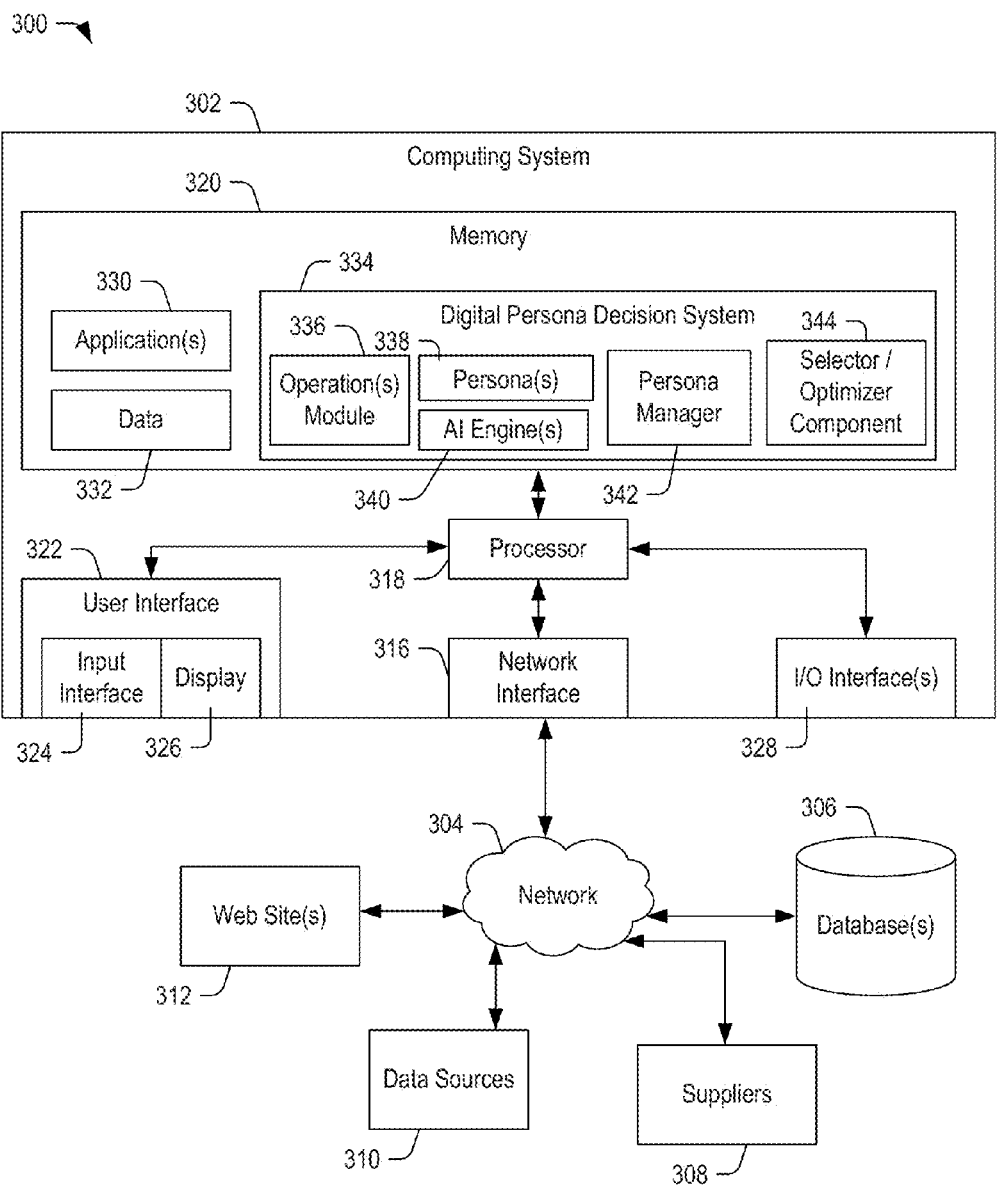
FIG. 3 is a block diagram of a system including a digital persona decision system, in accordance with certain embodiments.

FIG. 3 is a block diagram of a system 300 including a digital persona decision system, according to certain embodiments. The system 300 includes a computing system 302 that may be configured to communicate with various devices and systems through a network 304, such as the Internet. In certain embodiments, the computing system 302 may communicate via the network 304 with one or more databases 306, one or more suppliers 308, one or more other data sources 310, one or more web sites 312, other data sources, or any combination thereof.

The computing system 302 may include a network interface 316 configured to communicate with the network 304. The computing system 302 may also include a processor 318 coupled to the network interface 316, to a user interface 322, to a memory 312, and to an input/output (I/O) interface 328. In some embodiments, the user interface 322 may include a display interface configured to couple to a display device and an interface (such as a Universal Serial Bus port) configured to couple to a keyboard, a mouse, or another input device to receive user input. In certain embodiments, the user interface 322 may include the input interface 324 and a display 326, such as a touchscreen device.

The memory 320 may include a disc drive, a flash memory, cache memory, Random Access Memory (RAM), Read Only Memory (ROM), or any combination thereof. At least a portion of the memory 320 is a non-volatile memory configured to store data 332 and to store instructions that may be executed by processor 304 to perform a variety of functions and operations. The memory 320 may store one or more applications 330 and a digital persona decision system 334. The digital persona decision system 334 may include an operations module 336, personas 338, one or more artificial intelligence (AI) engines 340, a persona manager 342, and a selector/optimizer component 344.

The operations module 336, when executed by the processor 318, may cause the processor to receive data at an input and, after processing with other aspects of the digital persona decision system 334, provide an output including, for example, search results that have been ranked (scored), sorted, weighed individually or together, filtered, or otherwise processed according to a selected one of a plurality of personas 338. The personas 338 may be generated, modified, stored, and retrieved for use by the AI engines 340. Further, the personas 338 may include digital representations of individual consumers, groups of consumers, organizations, other entities, or any combination thereof.

The AI engines 340 include instructions that, when executed, cause the processor 318 to apply a selected persona or more than one selected persona of the personas 338 to received queries, to received results from queries, or any combination thereof. The AI engines 340 cause the processor 318 to process the data according to the selected persona(s) to rank the data, filter the data, or otherwise alter the data to provide a desired result that corresponds to a particular persona. The AI engines 340 may apply the selected persona to try to do what the user means rather than what the user says he or she means (i.e., to retrieve data corresponding to what the user intends to find). The AI engines 340 may also apply the selected persona to rank, sort, filter, or otherwise process received data. Additionally, the AI engines 340 may include at least one evolutionary function that, when executed, causes the AI engines 340 to process and update a persona over time, based on environmental factors, interactions of other personas, and so on. In particular, the AI engines 340 rely on experiential learning over time. In certain embodiments, the AI engines 340 assimilate numerous interactions by various personas, some of which may be similar to the selected persona, to learn experientially. The experiential learning process involves analyzing persona interactions (explicit or implicit) with the "universe" of available options to generalize trends and other information, which may be used to adjust the selected persona, other personas, etc., and to make recommendations and assist in decision-making.

In certain embodiments, the AI engines 340 may include collaborative filtering, clustering, classification, frequent pattern mining, outlier detection, noise reduction, and other functionality implemented via distributed or scalable machine-learning algorithms, such as the Apache Mahout machine-learning project or other machine learning systems. Examples of the functionality and algorithms implemented by an Apache Mahout machine-learning system are described, for example, at http://web.cs.wpi.edu/~cs525/s13-MYE/lectures/6/HadoopAnalytics.pptx; https://mahout.apache.org/users/recommender/recommender-documentation.html; and https://mahout.apache.org/users/basics/algorithms.html.

In certain embodiments, the AI engines 340 may include collaborative filtering, clustering, classification, frequent pattern mining, outlier detection, noise reduction, and other functionality implemented via systems that may be implemented using declarative rule-based systems, such as Drools or another rule-based management system. The AI engines 340 may be configured to process data (structured, unstructured, or semi-structured data) by filtering, clustering, classifying, weighing, correlating, performing any of the above-described functions, or otherwise processing the data.

It should be appreciated that a persona may operate in conjunction with the AI engines 340 independent of a query. In certain embodiments, a persona may respond to events, or to look out for needs and events where the persona may be required to do something or where the user should do or not do something in order to achieve a specific outcome. In certain embodiments, the persona may be configured to identify and present opportunities or solutions to a user proactively.

The digital persona decision system 334 further includes a selector/optimizer component 344 that, when executed, causes the processor 318 to select between available results and to provide selected results to an output. In certain examples, the selector/optimizer component 344 may be presented with multiple multi-dimensional sets of search results, which may have been sorted, filtered, ranked, or otherwise processed by the AI engine 340 applying multiple selected personas 338. In an example, the results may be sorted, filtered, ranked, or otherwise processed using each of the multiple selected personas 338, providing search results ranked across multiple dimensions according to each of the personas, and the selector/optimizer component 344 may select one of the sets of ranked search results for providing as an output. In certain embodiments, the selector/optimizer component 344 may operate on opportunities, problems, outcomes, and event analysis in response to experiences and activities in the user's life and independent of any user query.

In certain embodiments, the selector/optimizer component 344 may select between the sets of search results based on data associated with a requesting device. In certain embodiments, the selector/optimizer component 344 may be configured to select a "best" representation of the results according to the available information about the user as represented by his/her persona at that point in time. In certain embodiments, the selector/optimizer component 344 may select a "best" representation of opportunities, problems, outcomes, and event analysis in response to experiences and activities in the user's life and independent of any user query, proactively providing a best representation of the possibilities according to the available information about the user as represented by his/her persona at that point in time.

In some embodiments, multiple digital personas may be engaged in making a decision when faced with varied options. In certain embodiments, the computing system 302 may implement a set of digital personas that compete among themselves to resolve a problem in order to achieve a solution that best mediates the interests of the user of the digital personas. In an example, the problem may be a search request. By allowing the multiple digital personas to impact the search and the processing of the results, the computing system 302 may produce multiple, varied result options, which can be compared and optionally processed by the selector/optimizer component 344. In certain embodiments, the selector/optimizer component 344 may select between the competing results or selectively combine results from the competing results. The computing system 302 thereby may achieve optimal results for that user.

In certain embodiments, data from requesting devices and data from data sources may vary widely from source to source, in terms of content, organization and so on. To effectively process data from multiple requesting sources and from multiple data sources, the computing system 302 may normalize the data and may operate on the data using AI engines 340 to produce queries directed to what the user really wants as opposed to relying solely on the keywords entered by the user. In certain embodiments, the computing system 302 may normalize the structured data (such as database data, labeled data, or preprocessed data), unstructured data (such as text documents and other text) and partly structured data (such as extensible markup language (XML) code, and so on). The computing system may translate such text, including the key words, into a homogenous language that may be integrated together to form a comprehensive blueprint of opportunities, solutions to problems, etc. In certain embodiments, the data may be normalized by extracting the data, transforming the data into a format suitable for a table, and loading the data into a table, where the table provides a temporary staging area for the data prior to further analysis and processing. One possible expanded view of the digital persona decision system is described herein with respect to FIG. 4.

Figure 4:
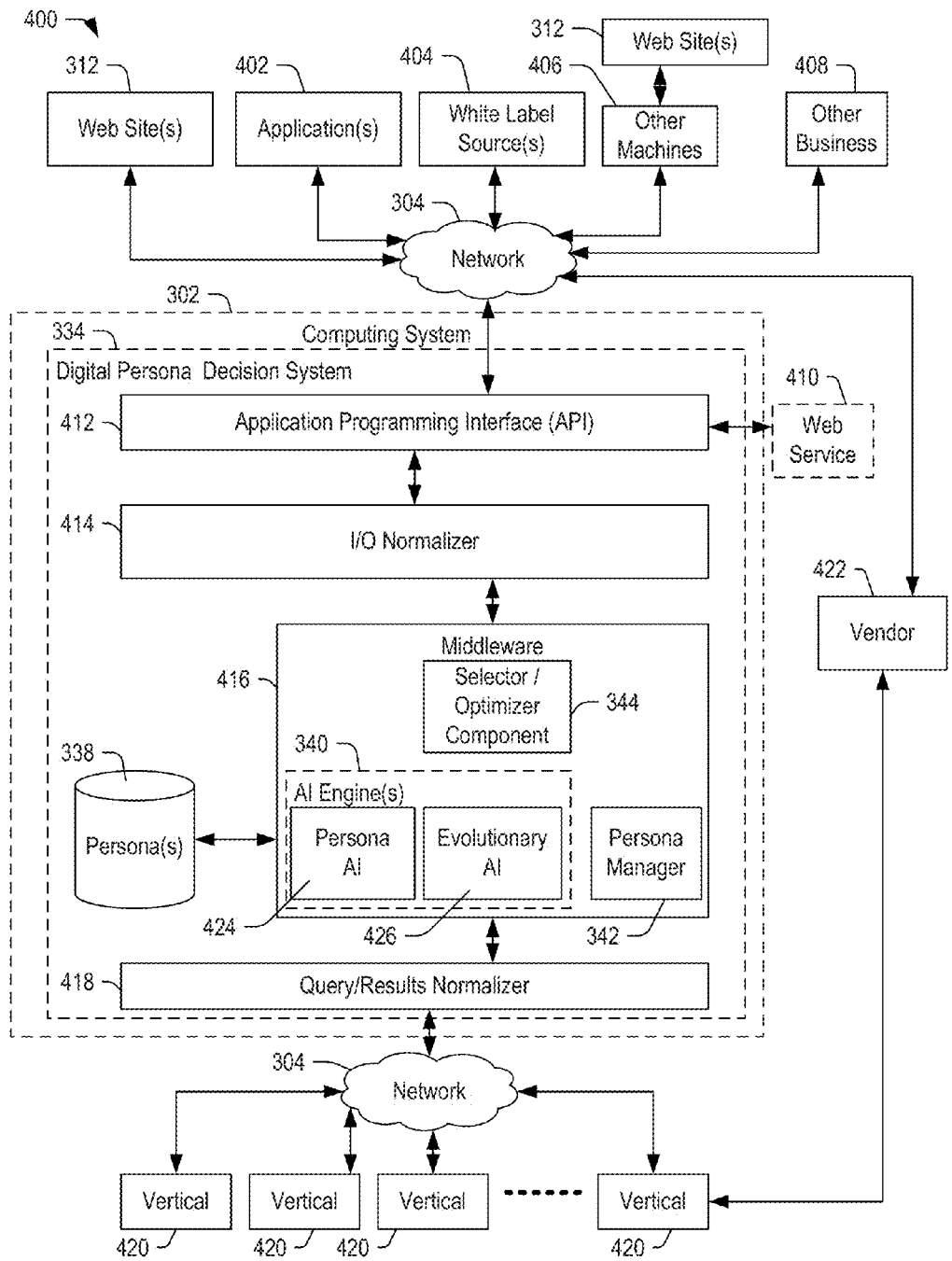
FIG. 4 is a block diagram of a system including a digital persona decision system, in accordance with certain embodiments.

FIG. 4 is a block diagram of a system 400 including a digital persona decision system 334, according to certain embodiments. The system 400 includes the computing system 302, which may be configured to communicate with web sites 312, applications 402, white label sources 404 (i.e., private label applications or services), other machines 406, a web site 312 through one of the other machines 406, other business 408, vendors 422, or any combination thereof, through a network 304. Additionally, the computing system 302 may be coupled to one or more verticals 420 through the network 304. The term "vertical" may refer to a particular market sector, such as travel, financial, healthcare, real estate, entertainment, education, military, retail, grocery and produce, employment, etc. Each of the verticals, identified by 420, may include a plurality of websites, businesses, etc. that service that particular sector. Though each of the verticals 420 are depicted as distinct entities, it should be understood that the verticals 420 overlap one another and that a business entity or website may cross multiple verticals, or sub-categories within one or more verticals (sub-verticals).

The one or more verticals 420 represent particular industry areas, business, business categories, and the like. In an example, one of the verticals 420 may be a travel vertical, which may include flight information, car rental information, hotel accommodations, train information, and so on. Another of the verticals 420 may be an information (research) vertical. Another of the verticals 420 may be a leisure activity vertical (e.g., concerts, live performances, plays, movies, parks, restaurants, golf, etc.).

In the illustrated example of FIG. 4, the computing system 302 is depicted as being coupled to two different networks, both of which are labeled 304. It should be understood that the networks 304, though separated, may be understood to be the same.

The computing system 302 includes the digital persona decision system 334. The digital persona decision system 334 may include an application programming interface (API) 412, which may be coupled to the web sites 312, applications 402, white label sources 404, other machines 406, other businesses 408, web service 410, vendor 422, or any combination thereof. The web service 410 may be part of the computing system 302 or may be associated with another device or system. The API 412 coordinates interactions between the computing system 302 and external components, devices, applications, etc. Further, the API 412 may receive data from the network 304 and may provide the data to an input/output (I/O) normalizer 414.

The I/O normalizer 414 translates received data into a format suitable for processing by the middleware 416. In certain embodiments, the I/O normalizer 414 may perform extract, transform, and load (ETL) functions using artificial intelligence. In particular, the I/O normalizer 414 may extract data from a received data stream, transform the data into appropriate formats (e.g., transform date information in a form of m/d/yy into a form mm/dd/yyyy), and load the data into a temporary table, which may be provided to the middleware 416. The normalization process may be performed automatically by a machine (the I/O normalizer) and may only utilize a minimal "mapping" effort with respect to placement of the data into the table.

The middleware 416 may include the selector/optimizer component 344, the AI engines 340, and the persona manager 342. The persona manager 342 may receive data from the I/O normalizer 414 and determine one or more personas from the personas 338 for use in connection with the received data. Additionally, the persona manager 342 may cause the processor to selectively execute a persona AI engine 424 (which applies selected personas to data), an evolutionary AI engine 426 (which may initiate changes in selected personas based on user interactions with the data, based on information derived from other personas, based on information derived from the "universe" of options, or any combination thereof), or a hybrid of both. The computing system 302 further includes a query/results normalizer 418, which may normalize a query, data, other information, or any combination thereof into data formatted for a particular one of the verticals 420.

In certain embodiments, a user may initiate a query via the web site 312, a mobile application, a business-to-business (B2B) connection, or any other front end device or system, and the query may be submitted to the computing system 302. The API 412 receives the query and provides the query to the I/O normalizer 414. The I/O normalizer 414 processes the query into a suitable format for the middleware 416. The middleware 416 may select one or more personas from personas 338 using the persona manager 342. The middleware 416 may also apply the selected persona(s) to the query using the persona AI engine 424 to perform query expansion, apply modifications or corrections to the query, and add constraints and refinements to the queries according to a selected persona to customize the query to the selected persona. The middleware 416 may provide the processed query to the query/results normalizer 418, which may normalize the processed query into suitable formats for one or more data sources associated with a particular vertical 420. The query/results normalizer 418 may then provide the processed and normalized query to one or more data sources associated with the vertical 420.

In certain embodiments, the options/solutions may be processed on a computing device such as a server and the results may be provided to a remote device, such as a laptop computer, a tablet computer, a desktop computer, a smart phone, or another data processing device. In certain embodiments, the computing system 302 may be implemented on a smart phone or other computing device, which may present options/solutions to a display.

In response to the processed and normalized query, the computing system 302 may receive results associated with the particular vertical. The query/results normalizer 418 may receive results from multiple data sources and may extract, transform, and load the results into one or more temporary tables, which may be passed to the middleware 416. The persona AI engine 424 may apply one or more selected personas from personas 338 to the results to produce one or more processed results. The processed results may be ranked, sorted, weighed, filtered, processed, or any combination thereof according to each of the one or more selected personas, potentially producing multiple multi-dimensional sets of processed results, which may be provided to the selector/optimizer component 344. The selector/optimizer component 344 may select one of the sets of processed results and may provide the selected one of the sets to the I/O normalizer 414, which may extract, transform, and load the data from the selected one of the sets of processed results into a format suitable for the AIP 412 to provide the results to a destination. The destination may be a device, an application, a web interface, etc.

When introduced with a problem, the I/O normalizer 414 may normalize the input and provide the input to the middleware 416. The middleware 416 can deliver specific facts and circumstances at hand to a persona AI engine 424 with selected digital personas from the personas 338, where each of these selected digital personas offers a potential solution in accordance with the following process: (1) the computing system 302 can produce a solution aligned with specific preferences and restrictions pre-established by the user within each digital persona; (2) the system can conduct a competition among the digital personas to determine optimal solutions for the user in the context of the specific facts and circumstances of each user request; and (3) the system can thereby resolve the problem presented by the user of the digital persona. The selected digital personas may be applied to the persona AI engine 424 to customize the persona AI engine 424, which customized AI may process the input data to adjust keywords, apply restrictions and query enhancements, and produce queries that are aligned with the specific preferences and restrictions associated with that particular persona. Such preferences and restrictions may be configured by a user, may be learned over time from explicit and implicit feedback from the user's interactions, may be inferred from interactions of various personas, or any combination thereof. The queries produced by the persona AI engine 424 based on each of the selected personas may be normalized by query/result normalizer 418 and may be sent to one or more data sources. Each of the normalized queries produces results, and the results from each of the queries provides a basis for competition among the digital personas, which competition may be resolved by the selector/optimizer component 344 to determine optimal solutions for the particular problem. The results may be normalized by query/result normalizer 418 and provided (together with the associated persona) to the selector/optimizer component 344, which may select between the results or which may selectively combine the results from one or more of the sets of results to produce a set of search results, which may then be provided to normalizer 414 for normalization before transmission to a device. Throughout the process, the computing system 302 can intelligently track, collate, analyze, and record each solution, monitor user feedback (explicit and implicit), and thereby continuously learn the habits and behaviors of the user of the digital personas. The learned habits and behaviors may be used by the evolutionary AI engine 426 to refine the digital persona over time to achieve ever-more-effective results.

In certain embodiments, the computing system 302 uses unsupervised "deep" learning to learn about available options within the universe of options, to observe and learn from user interactions with that universe, and to refine a baseline persona associated with a particular category of users for a vertical 420 within the universe of options. The evolutionary AI engine 426 may modify the default or baseline personas within personas 338 based on such deep learning. Other personas (i.e., those representing individuals, corporations, etc.) may be understood as differences or deviations from the baseline persona for that particular category of entity. In an example, a persona associated with a user named Terry may be understood as a difference or delta between Terry's preferences, selections, and restrictions and those of the baseline persona. Since the baseline persona may evolve over time, twenty-four hours per day, based on interactions associated with every other persona in the system or based on interactions with the digital universe, Terry's persona benefits from the deep learning of the system without changing any parameters specific to Terry's persona. Thus, the computing system 302 evolves the individual's persona over time as its understanding of the universe of options evolves, and without losing the individuality of the user's persona. In particular, the persona AI engine 424 can selectively weight the deltas of the user's persona relative to the baseline persona in order to dampen the impact of evolution of the baseline persona, particularly if there is an extended period of time between visits by the user.

In certain embodiments, the computing system 302 can implement searches (using the AI engines 424 and 426 and the personas 338) to fundamentally alter the user's experience. By utilizing personas, the computing system 302 may provide results, options, etc. that are tailored to the particular user, changing the experience from an episodic, non-experiential, and non-predictive experience to one that is tuned to the particular user through experiential learning. The user's persona in conjunction with the persona AI engine 424 makes it possible to provide an experience that is tailored to the particular user, predicting and providing what the user really wants and anticipating what the user may truly need, even if the user is not aware of those needs.

In certain embodiments, the user's persona can operate in conjunction with the persona AI engine 424 to provide a dynamic personalized intelligent search that yields the "best" for the user, with the user being split into the very essence of the user at that point in time taking into account what the user says he/she wants, what the user actually wants, where the user is, when the user is, what people are doing that the user trusts (such as friends, family, experts, etc.). Instead of assuming that there is only one user (which is what most people, websites, companies, etc. do), the system can recognize that a user may act differently and may make different types of decisions based on the context within which the decision is being made (e.g., time of day, individual's decision-making role (individual, employee, father, etc.), the date and its correspondence to upcoming events (birthdays, holidays, anniversaries, etc.), how the user is being impacted by the universe, and other context-based information.

In certain embodiments, the computing system 302 can be configured to look for "better" options/solutions, with the concept of "better" encompassing one or more factors (including a large number of factors), defined by the user, suggested by the system, or both. In certain embodiments, the computing system 302 may be configured to look for "better" proactively without being asked or based on a user action.

In certain embodiments, the computing system 302 may communicate with suppliers 308. A supplier 308 may utilize data from the system to learn that there is a demand for his/her product or a similar product. Further, the supplier 302 may also learn that the demand for the product or similar product exists at conditions similar to those at which the product was made available to consumers, but not identical to those conditions (i.e., different price, different color, different features, different quantity, projected delivery date, etc.). The supplier 308 may also determine information about the person or persons requesting the product to determine the value of the person seeking the product, taking into account a broad value (category A) or narrow sub-values.

In a particular example, a first user may be a window shopper, always asking for "better". The first user may say that he/she is interested in five star products, but for this first user it's really all about price. A second user may purchase about 30% of the time. The second user may be a total cheapskate, but may be an executive platinum consumer with that supplier. Further, the second user may be followed by many as a trendsetter, meaning that he/she starts and leads trends. A third user may purchase nearly all the time, but has no loyalty to any particular supplier, and has little or no price sensitivity. The third user may be an impulse shopper. The computing system 302 may dynamically determine the status of the first user, the second user, and the third user, which status changes over time. In certain embodiments, the computing system 302 may understand that the second user is of particular interest to the supplier who wants to keep the second user as an executive platinum level consumer. Further, the computing system 302 may recognize that the second user is also of particular interest to another supplier who wants to steal the second user because the second user is the "right sort of customer." Thus, on the supplier side, the request for "better" or the suggestion of a desire for "better" (as a request may not actually have been made by the user) can yield a competition between suppliers 308 either for that user's business or that potential business. That competition may occur on the basis requested, such as $20 less than originally offered, or on different grounds, such as the same price as originally offered but with a free upgrade; the same price as originally offered plus bonus points; requested $20 cheaper but only able to offer $5 cheaper but will include breakfast; and so on. The response to the request for better or the suggestion of a desire for better can in turn yield behavior from the persona AI engine 424 (implementing the persona) on the consumer side, which may accept one of the offers, negotiate, specify a different "better" request, etc. This can be done with any type of inventory, upsell or cross-sell and could be done with any virtual product. In certain embodiments, the interactive nature of the system allows for a potentially infinite number of user/system communications and system/supplier communications and allows for multiple, potentially simultaneous conversations to provide product options or other types of options for the user.

The computing system 302 or platform may be configured to assess a "true" value of a product by itself, or on behalf of an entity (for example, a user, a supplier, a group, an organization, or any combination thereof) on a real-time basis. "Value" is currently perceived as something that is mainly centered on a monetary amount, but the computing system 302 applies a multi-dimensional assessment process that determines multiple values for a particular product, based on decisions made by other personas, expiration of the product, time, date, price, quantity, other factors, or any combination thereof. The combination of the multiple values provides an assessed value or determined value, which can be used to determine a "best" option, such as the option that provides a maximum "bang for the buck" for the entity.

In an example, in a first layer, the computing system 302 may perform a financial assessment (monetizable cost) of a particular option as compared to another available option. For example, a first product may cost $100 while a second product may cost $120. In a second layer, the computing system 302 may determine a public perception or acceptance of one or more characteristics of a product. For example, the computing system 302 may determine a public perception that economy class seats have less value than business class seats. The computing system 302 may gather the characteristics of a product and determine the publicly accepted value of these characteristics. In a particular example, the computing system 302 may determine that a flight in economy class seats in the morning has a different value as compared to business seats on a flight in the evening or at night. The computing system 302 does not evaluate better or worse during this process, but just determines that the flights have different values.

The computing system 302, in a third layer, determines the perceived value of the product for a given entity. For example, for user X, flying economy class versus business class isn't important, but the time of day attribute is important. For another user, user Y, seat comfort is important. The value specific to an entity reflects the entity's likes and dislikes, both as specified by the user or learned by the computing system 302, even when the latter contradict the former. The computing system 302 may, in a fourth layer, determine changes in the universe or universe of options that may, in the future, change the public perception or the entity perception. The computing system 302 may combine each of these values to determine a "real" value of the product. In certain embodiments, the "real" value may be calculated as a monetizable cost divided by the real value for the user, which is the publicly accepted value, the perceived value for the user, and changes in the universe or universe of options that may affect the publicly accepted value or the perceived value (or both). For example, a flight for $100 on a first airline in business class may have a lower "real" value than $120 flight on a second airline in economy class, at least at specific points in time or for specific users.

For the supplier, the computing system 302 may provide real-time demand insights and the ability to quantify information, such as who the insights come from, under what circumstances the insights were generated, and so on. Further, the computing system 302 may be configured to forecast and to impact future demand by taking actions that impact public perception, entity perception, or both. The actions taken can lead to a difference between the determined "true" value and the perceived value, and it may take a period of time before one catches up to the other.

In certain embodiments, a supplier or another involved entity may "play" with "what if" scenarios, by adjusting parameters in the computing system 302, in order to research and identify a "real" value of current product offerings or of virtual or future products. For example, an entity such as a supplier may add or remove certain characteristics of a product and may assess the impact of the change to the "real" value. In a particular example, a supplier can "design" products that are more cost efficient but still yield their desired value. In an example, a hotel manager can check the value of a room at a certain time and can add different non-monetary items to the offering, such as early check-in, a room with a view, an upgrade, etc. In response to such additions, the supplier can identify the resulting increase or decrease in products "real" value. In an example, the supplier can then use the computing system 302 to forecast the impact of change of value on the user's willingness to buy the product. In this way, the computing system 302 allows suppliers to tailor their product offerings and to the users without selling things the user don't need.

In certain embodiments, the computing system 302 may search experientially, reflecting the user's needs (actual and potential, expressed and unexpressed) rather than simply responding to the search request. In an example, the user's persona, taking into account the scheduled travel plans of the user, may proactively search for kennels for the user's dog and prompt the user to schedule the dog's stay at the kennel. Further, the user's persona may proactively prompt the user to get vaccinations for the upcoming trip. Additionally, the user's persona may determine that the user has a family member in the vicinity of his/her travels and may proactively search and selectively provide travel options to the user that would allow the user to visit his/her family member during the travel. In certain embodiments, the persona may act as the user's personal assistant, taking into account past, present and infinity of futures to proactively present options to the user. Further, the persona may interpret user actions and inactions in response to presenting such options and may update itself automatically without the need for new searches and without the need for the user to manually configure preferences.

In certain embodiments, the persona in conjunction with the persona AI engine 424 may have the ability to understand a non-standard search request that incorporates a multiplicity of structured, unstructured and partly structured data, where, under ordinary circumstances, it would not be clear what is actually being searched for. In certain embodiments, the persona may utilize previously provided information, e.g., that the user always chooses child friendly hotels when the user searches for hotels, to make assumptions and to adjust the user's search to provide child friendly results.

Further, in certain embodiments, the persona in conjunction with the persona AI engine 424 may perform a predictive search or take a predictive action in the case of an upcoming experience. For example, the persona may be aware of a personal milestone (such as the user turning 40 years old), and may make one or more recommendations to the user based on such awareness. In certain embodiments, the persona in conjunction with the AI engines 340 may be configured to analyze decisions from a plurality of personas, producing a group intelligence that may be used to identify a trend at an early point, before anyone else would consider it a trend. The computing system 302 may detect variations in decision-making, which may represent a very early trend or series of trends and make recommendations to guide the user toward the trend, providing "expert" wisdom and trendy outcomes before such trends are recognized as "expert". Understanding that other systems may recognize the beginnings of such a trend as noise, the personas and the computing system 302 take the smallest noises (and sometimes the absence of noise where it would otherwise be expected) and learn from it for the personas and for the users. Such predictive analysis allows the personas to make recommendations to trendy selections before such selections become well-known to others outside of the computing system 302. For example, when a restaurant is trending up based on reviews and known traffic, the persona may recommend the restaurant to a user, even before local media or others in the user's circle of friends become aware of the new "hot" spot. In certain embodiments, the computing system 302 may recognize a particular persona as being an "expert" based on his/her "successes", where "success" may be defined based on a "purchase" or some other factor. Such experts may be recognized within the computing system 302 based on such information, whether or not that person may be an expert elsewhere. In certain embodiments, the persona may be a "celebrity" or "expert" persona, such as an Einstein persona, which could be an expert persona with respect to certain subject area. Further, the computing system 302 may recognize a "trendsetter" based on the user's ability to make choices, over time, that may be unpopular at the time the choice is made, but that becomes popular shortly after the trendsetter's decision was made. That persona, over time, may be identified as a trendsetter.

It should be appreciated that restaurant trends represent a simple example of such trend analysis. The computing system 302 may be applied to financial markets and other market sectors to provide similar trending data, which may be used by the personas to make recommendations to the user.

In certain embodiments, the computing system 302 may interact with a particular vertical 420, such as a healthcare vertical, in a variety of overlapping ways. In the context of healthcare or medical care, information is problematic in that consumers of medical care (ordinary people) typically do not know the complexities of medical care diagnosis or treatment. Further, the consumers often do not have enough time to learn this information before consumption decisions must be made. Further complicating matters, medical care is typically episodic and disconnected, characterized by insufficient data sharing, disassociated care givers, limited access to new information/services/providers, no guarantee of best results or services, and episodic, discrete treatments.

In the context of such healthcare (medical care), the personas provide an intelligent platform that can understand the lifetime health journey of each unique individual as a continuous journey rather than a disconnected, episodic event. The persona can continuously search for the best health services, information and experiences from any and all content sources. The persona may be ever present and ever learning. The system can use the persona to monitor health practices and to empower the user with information and resources for managing for example his/her evolving treatment, provider, and insurance experiences, making recommendations and offering insights and information beyond the present situation. Further, the persona can investigate particular healthcare offerings and determine past, current and possible future medical interactions. Further, the persona can maintain data about the user's lifetime journey of ailments, diagnoses and treatments to provide a complete picture of the user's health history and profile without human repetition or reporting errors.

In certain embodiments, the persona may identify medical studies that may be of interest, journal articles, and so on. The persona may determine when a rating of the user's current doctor has fallen and when a rating associated with another doctor is higher and may recommend that the user consider changing doctors. In certain embodiments, the persona may notify the user that his/her prescription is ready, that it's time to take the prescription and so on. The persona may remind the user of his/her dental appointment and may remind the user that it is time to schedule a dental appointment for his/her daughter. In certain embodiments, the persona may notify the user of changes to his/her insurance policy and so on. In certain embodiments, the system can also take actions if required by configuring the persona AI engine 424 with a selected persona and the system can perform a variety of functions and operations. Further, the system, once configured, can also separate less serious situations from serious situations and can escalate a situation, which may have been ignored by the user the first time.

The normalizers 414 and 418 of computing system 302 may translate data from any source (in any format) to be useful and valuable to all users and medical professionals. The persona may utilize such data to gain intra-medical insights from past diagnoses, treatments, habits, familial history, activities, providers, and more.

While discussions herein include examples of healthcare and travel verticals 420, it should be understood that the computing system 302 may extend to any market or market segment or sector or other area of decision-making Examples of verticals 420 may include healthcare, real estate, retail, military, financial, entertainment, food, education, and other markets.

In certain embodiments, the systems described herein may utilize personas to provide a predictive search that may recommend alterations (e.g. trip alterations as to date/time/origination city changes) to maximize value, to visit family, to bypass political situations, to avoid weather systems, etc.

In certain embodiments, the systems described herein may utilize personas to provide group intelligence by combining users' experiences, choices and results (through groups of personas) to apply new knowledge to future searches. In certain embodiments, the system may combine the multiple personas to produce one combined persona, which may provide solutions based on group intelligence. In certain embodiments, the system may utilize the multiple personas to generate multiple solutions, which may be selectively provided to the user based on selections made by the selector/optimizer 344.

In certain embodiments, the systems described herein may utilize personas to apply social, family and relational status to decision-making processes. In an example, the persona may recognize the familial/relational status of a traveler without status (i.e., a spouse, an employer, etc.) who has a direct influence on the non-traveling status holder (i.e., Platinum customer/member member), and may assist in making informed decisions to ensure a positive experience for the traveler.

In certain embodiments, the system may maintain a digital persona library, and may offer users the opportunity to buy or rent a persona (such as an expert persona, a celebrity persona, and the like) to make decisions and "live" like an expert or celebrity. In certain embodiments, each persona may be compiled to a digital file that may be transferred to a user device for use with another persona-enabled system. In certain embodiments, each rented persona may be utilized as a digital representation via a proxy server that manages the client/site interactions.

In certain embodiments, the systems described herein may utilize personas to allow a persona from a first vertical to be applied to another unrelated vertical. Alternatively, the persona may be duplicated for use in the other unrelated vertical. For example, the user may leave one vertical, such as travel, and the persona may be applied in another vertical, such as retail.

In certain embodiments, the systems described herein may utilize personas to provide a multi-field search adjustment. The persona may be used to adjust single or multiple fields (such as price, stops, dates in the travel vertical, for example). The query results may dynamically reflect the changes.

In certain embodiments, the systems described herein may utilize personas to provide a multi-leg segmentation search that compares traditional multi-city options to a combination of one-way flights to find a best value.

In certain embodiments, the systems described herein may utilize personas to search for and cross-reference coupons, discounts and rebate offers to find the best combination of valid offers to maximize savings.

In certain embodiments, the systems described herein may utilize personas to dynamically analyze competitor prices and to create a differential and generate maximum commissions. In certain embodiments, the systems described herein may utilize personas to provide a revenue calculator assistant that calculates which supplier maximizes a travel company's revenue taking into account all possible revenue sources available at that point in time such as commissions, overrides, etc. In certain embodiments, the systems described herein may utilize personas to provide a yield management engine that analyzes demand and makes recommendations to a supplier to increase value to targeted customers.

In certain embodiments, the systems described herein may utilize personas to provide group conflict resolution that finds solutions that fit multiple travelers' contrasting needs (status, currency, time, location, etc.). In certain embodiments, the systems described herein may utilize personas to provide currency agnostic transactions that combine cash, cards, points, miles and crypto-currency (e.g., BitCoin) to make purchases.

In certain embodiments, the systems described herein may utilize personas to provide a group brain. The group brain may be a combination of multiple digital personas working together to adapt and make decisions that appeal to the group. In certain embodiments, the systems described herein may utilize personas to steal customers by providing a real-time continuous reverse bid opportunity that allows suppliers to provide better value for a ready-to-buy customer and to recover transactions that would otherwise be lost and to generate entirely new transactions. Additionally, in certain embodiments, the systems described herein may utilize personas to provide language agnostic transactions that deliver real-time multi-lingual translation for transactions and user communication to facilitate transactions.

As described herein, personas can contain a vast amount of knowledge and power concerning a user, whether that user is a person, group, business, or other user. The value for certain personas may be very high. Thus, the systems and processes described herein can be implemented with the highest levels of digital security. For example, the personas may be authenticated to specific users, devices, groups, or other authentication entities. Further, the personas themselves may be encrypted any time they are stored or transmitted externally to an authenticated processor. Further, memory and processors storing or utilizing the personas may be hardened to prevent malicious intrusions and attacks. In the example of the digital persona decision system 334, the personas may be encrypted before being stored to 338 and all communications over networks 304 may be encrypted. Further, all information and data between the web services 410 may be encrypted.

Figure 5:
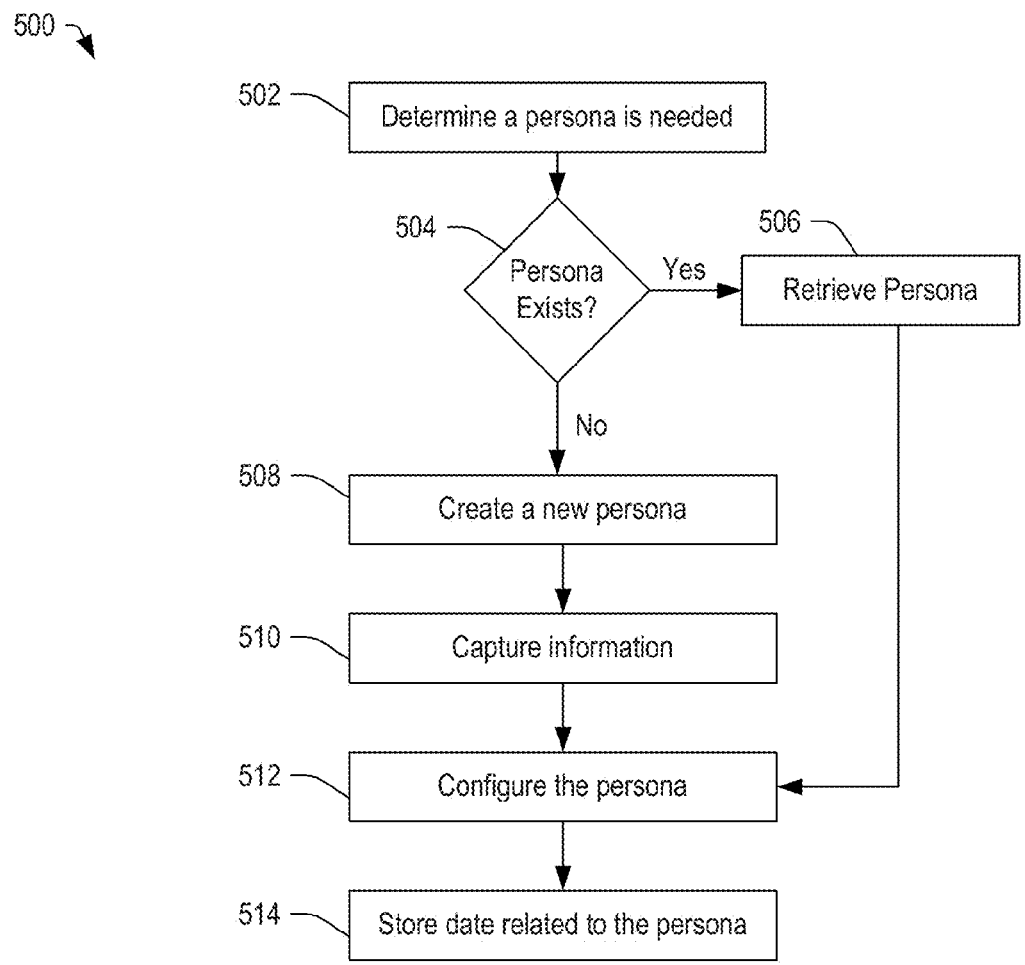
FIG. 5 is a flow diagram of a method of providing a persona, in accordance with certain embodiments.

Referring now to FIG. 5, a flow diagram representing embodiments of methods of providing digital personas is shown and generally designated 500. At 502, the system determines that a persona is needed. In certain embodiments, the system may determine that a persona is needed in response to receiving a query. In a particular embodiment, the system may receive a query from a user, causing the system to determine that a persona is needed.

Advancing to 504, if a persona exists, the method 500 advances to 506 and the system retrieves the persona. The system may search personas 338 to identify one or more personas (or possible personas) for the particular query, the user, the context, or any combination thereof. The personas may represent individuals, groups, organizations, or any combination thereof. In an example, the persona may be associated with an "expert", which expertise may be recognized by others and identified through social media, or may be requested by the user based on their track record or may be determined by the system based on particular parameters. If a match (or possible matches) is available, the system retrieves the persona(s). In certain embodiments, the system may recognize an expert in the system, even if others wouldn't recognize the persona (or user) as an expert. In an example, the system may interpret noise in the system or detect expertise developing (based on trends, purchases, and experiential learning) and may monitor the persona as a future expert.

The method 500 then advances to 512 and the system may configure the persona. The system may add context information, date and time information, user-specific information, other information, or any combination thereof to the retrieved persona. Continuing to 514, the system stores data related to the persona in a memory. In a particular example, the system may store a difference between the configured persona and a baseline persona in the memory. In another example, the system may compress the configured persona to a set of parameters, which may be stored in memory. In either case, the difference values or set of parameters may subsequently be utilized by the persona AI engine 424 to rank results, sort results, weigh or filter results, process results, or any combination thereof.

Returning to 504, if the persona does not exist, the method 500 advances to 508 and the system creates a new persona. In certain embodiments, the system may retrieve a baseline persona (a default persona) from a memory and may use the baseline persona as a starting point for the generation of a persona. The baseline persona may be a digital representation of an average user, group of users, or other entity (such as a corporation) derived from interactions of users with the "universe" of options for a particular vertical, configured by an administrator, determined by the system based on trends determined from interactions, or any combination thereof.

Continuing to 510, the system captures information. In certain embodiments, the information may be captured by prompting the user to answer some questions about his/her preferences. In certain embodiments, the system may retrieve information corresponding to other personas that have posed similar queries, may retrieve implicit and explicit feedback, may retrieve changes to the "universe" of possibilities, or any combination thereof.

The method 500 then advances to 512 and the system may configure the persona. In certain embodiments, the system may adjust the baseline persona based on the collected information. Continuing to 514, the system stores data related to the persona in a memory.

Figure 6:
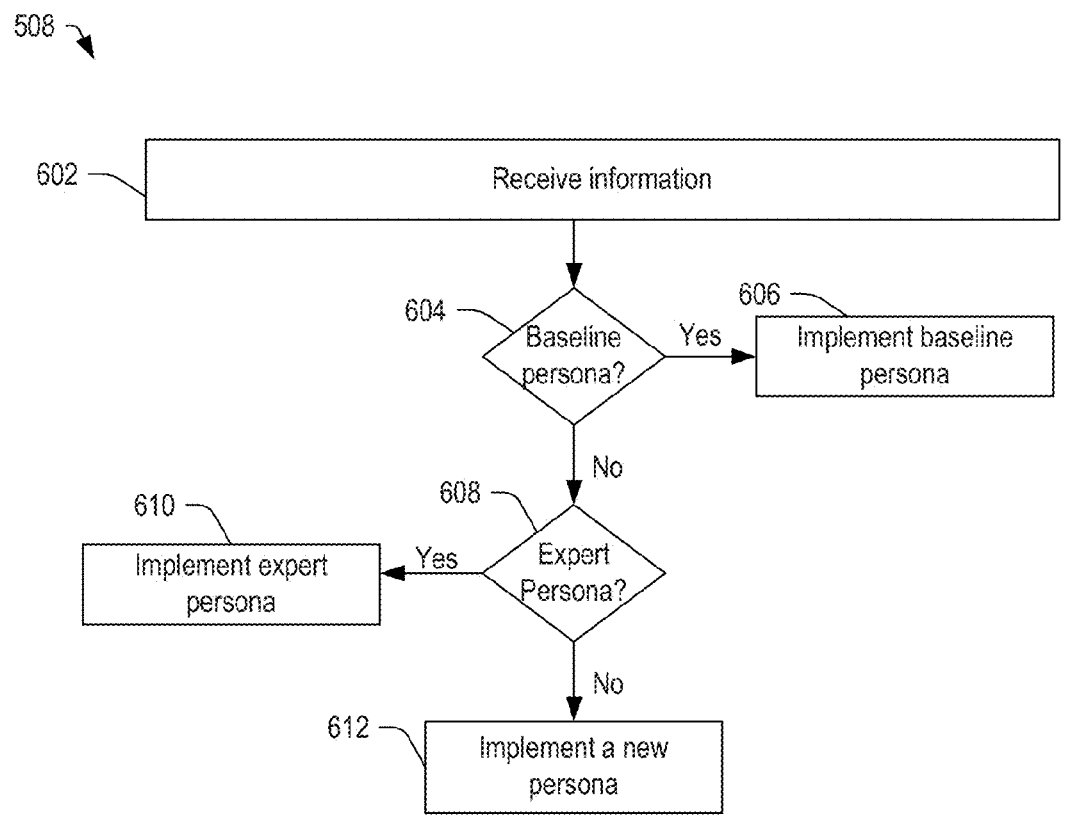
FIG. 6 is a flow diagram of a method of creating a persona, in accordance with certain embodiments.

FIG. 6 is a flow diagram of a method 600 of creating a persona according to certain embodiments. At 602, information is received. The information may be received in response to a query, in response to a user signup, in response to user activity, in response to changes in the universe or universe of options, in response to events, or any combination thereof. The information may be received from a web service, another computing device, a vendor, etc. Advancing to 604, the system determines if the information corresponds to a baseline persona. In certain embodiments, the received information may include a selection of a particular persona or may include no selection. In certain embodiments, if no persona selection is indicated, the system may determine that the baseline persona is desired. If, at 604, the baseline persona is determined, the method 600 advances to 606 and the system implements the baseline persona.

Otherwise, at 604, if a baseline persona is not indicated, the method 600 advances to 608 to determine if an expert persona is indicated. If an expert persona is determined at 608, the method 600 advances to 610 and the system may implement the expert persona. Returning to 608, if an expert persona is not indicated, the method 600 moves to 612 and the system implements a new persona.

In the above-discussion, the term "implements" may refer to the selection and application of a particular persona. Implementation of a new persona may invoke the creation process described with respect to FIG. 5.

Figure 7:
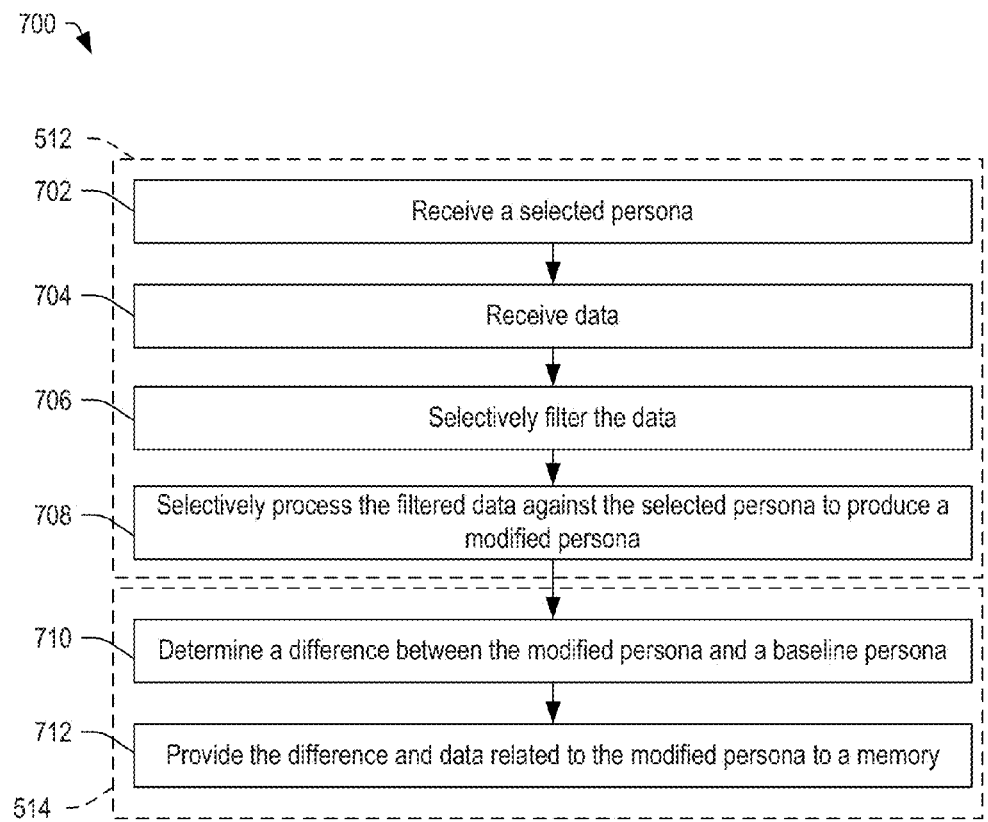
FIG. 7 is a flow diagram of a method of updating a persona, in accordance with certain embodiments.

FIG. 7 is a flow diagram of a method 700 of updating a persona according to certain embodiments. The method 700 expands on blocks 512 ("configure the persona") and 514 ("store data related to the persona") of FIG. 5. Within block 512, at 702, a selected persona is received. The selected persona may be received by middleware 416 (in FIG. 6). Advancing to 704, data is received. The data may be received from a query/results normalizer 418 or from the I/O normalizer 414.

Continuing to 706, the data may be selectively filtered. In certain embodiments, the data may be selectively filtered to discard outliers, to remove unrelated information, and so on. Advancing to 708, the filtered data may be selectively processed against the selected persona to produce a modified persona.

Within block 514, the method 700 continues to 710 and the system determines a difference between the modified persona and a baseline persona. Proceeding to 712, the difference and data related to the modified persona may be provided to a memory.

Figure 8:
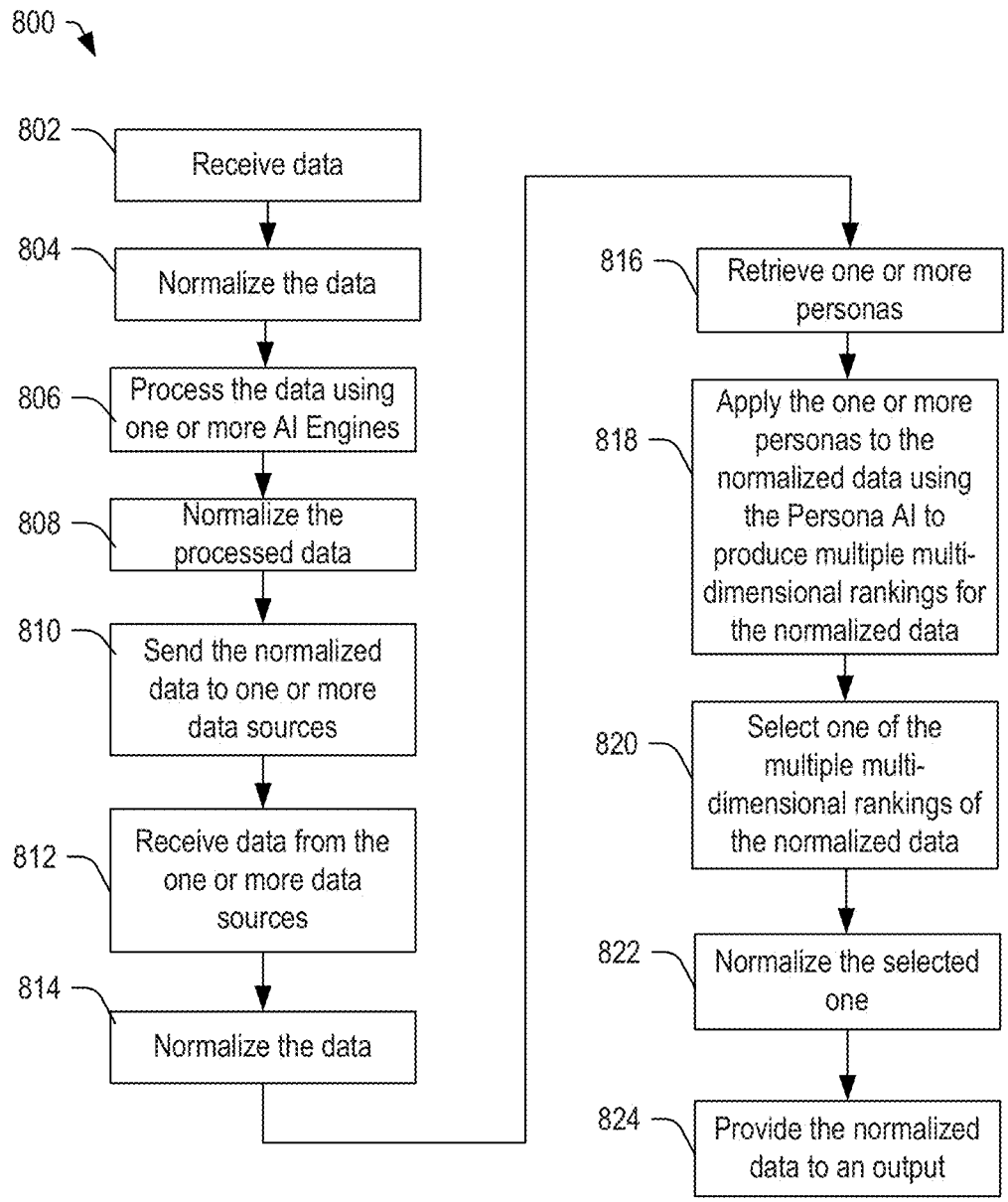
FIG. 8 is a flow diagram of a method of providing information based on a selected persona, in accordance with certain embodiments.

FIG. 8 is a flow diagram of a method 800 of providing information based on a selected persona according to certain embodiments. At 802, data is received at the system. In certain embodiments, the data may be received from a web site 312, an application 402, a white label source 404, another machine 406, another business 408, a website 312 through another business 408, a web service 410, a mobile phone, a vendor 422, or any combination thereof.

Advancing to 804, the data is normalized. In certain embodiments, the data is normalized by extracting, transforming and loading the data into a temporary table using, for example, the I/O normalizer 414. Continuing to 806, the data is processed using one or more AI engines 340. The data may be processed by applying one or more selected personas to produce a query, apply constraints, and otherwise refine the data. Moving to 808, the processed data is normalized. In an example, the processed data is refined, altered, or otherwise formatted to be suitable for querying data from one or more data sources associated with a particular vertical.

Continuing to 810, the normalized data is sent to the one or more data sources associated with a particular vertical. In certain embodiments, the data may be normalized into the form of one or more queries that may be sent to selected data sources. Proceeding to 812, data is received from the one or more data sources. In certain embodiments, the data received from each of the data sources may be formatted differently. Advancing to 814, the data is normalized. In certain embodiments, the query/results normalizer 418 may extract the data received from the one or more data sources, transform the data into a standard format for the system, and load the data into temporary tables.

Moving to 816, one or more personas may be retrieved. The one or more personas may be the same personas as those applied by the AI engines 340 to process the data at 806 or may be different personas. Proceeding to 818, the one or more personas are applied to the normalized data using the persona AI engine 424 to produce multiple multi-dimensional rankings for the normalized data. In certain embodiments, each persona, when applied by the persona AI engine 424 may provide weights to each attribute of the normalized data.

Continuing to 820, one of the multiple multi-dimensional rankings of the normalized data is selected. The selector/optimizer component 344 may select the one based on data associated with the request or based on the particular vertical 420. Advancing to 822, the selected one (i.e., the results) are normalized. In certain embodiments, the results may be normalized for the particular destination by the I/O normalizer 414. Continuing to 824, the normalized data is provided to an output. In certain embodiments, the output may include a network transceiver configured to transmit the data to a destination device through the network 304.

In certain embodiments, a user may perform a search. The system can receive data related to the search at 802. The system may translate the user request (or search) into a standard request (such as by normalizing the search or request into a suitable format) and translate the standard request into the "language" or application programming interface (API) of each vendor supplying products. The system may request the current product offering from each vendor in parallel using the translated standard request. In response to the request, the system may receive results, which the system may translate into standard results. Each result may be scored by one or two AI engines based on the user persona. In case the user is a corporate user or that user is part of a "group of personas", a combined competing brain virtual persona may be created to represent the sum of all participating personas. If the persona of the user is relatively new or is not "mature", a persona AI engine 424 may be used to perform a weighing function on the data, but the evolutionary AI engine 426 may be skipped. If the persona is mature, the persona AI engine 424 can perform the weighing function on the data and an evolutionary AI engine 426 can process the persona and the data. After the weighing is performed, a selector/optimizer (dynamic product offering tool) may choose which results to provide to the user, at 820. Each of the results, selected or not, are stored in a memory, such as a cache.

The user may interact with the system by looking at product offerings, showing interest in one or others, and disregarding some. This is the user's experience. The user interactions (products viewed, time on the pages, etc.) can be fed to the system. The system can calculate a personal delta based on the user's experience with the product offerings, so the characteristics of the products in which the user showed interest will gain a "reward" in terms of weighing, while those products the user ignored will get a punishment (demerit) in terms of weighing. The experiences of the user with the offered products can be compared to the characteristics of the user's persona. If a normal deviation is found from one of the characteristics of the persona, that persona may be adjusted (tweaked). The adjustment or tweak of the persona may include incremental change notations, which may be numeric deltas from a baseline and which may be interpreted by the AI engine to differentiate one persona from the next. If no normal deviation is found, a new persona may be created and the adjustments (tweaks) may be represented as a difference between a basic default (baseline) persona and the new changes. The user may modify search terms, the profile, perform other tasks, request the same search again, and so on. In response to a request to perform the same search, the system may use the cached results (if they haven't expired) and recalculates the AI score for each results.

User experiences may also be provided to an evolutionary AI engine, which receives the user request and the set of potential solutions (products, results, etc.). The evolutionary AI engine can also receive user behavior data and data related to the overall "success" or "failure" of the process. In certain embodiments, success and failure may be determined by an administrator (a human operator) of the system and can be adjusted.

Figure 9:
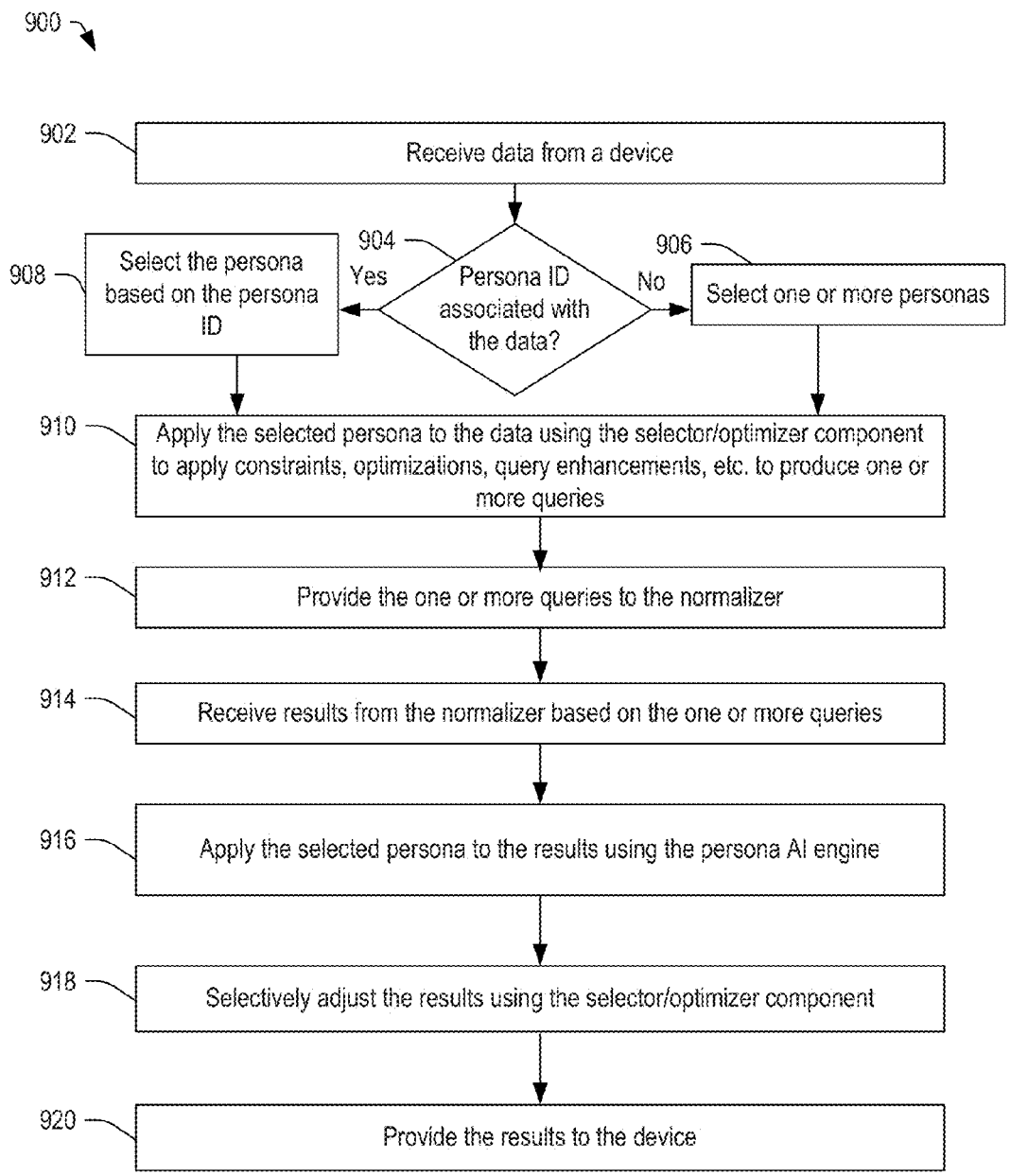
FIG. 9 is a flow diagram of a method of providing information based on a selected persona, in accordance with certain embodiments.

FIG. 9 is a flow diagram of a method 900 of providing information based on a selected persona according to certain embodiments. At 902, data is received from a device. Advancing to 904, the system determines if a persona identifier (ID) is associated with the received data. If so, the persona is selected based on the persona ID. In certain embodiments, a persona ID may be associated with a user identifier, a session identifier, or some other indicia that can be used to link a particular user or device to a particular persona. Once the persona is selected at 908, the method 900 advances to 910 and the system applies the selected persona to the data using the selector/optimizer component 344 to apply constraints, optimizations, query enhancements, etc. to produce one or more queries.

Returning to 904, if a persona ID is not associated with the data, the method 900 advances to 906, and the system selects one or more personas. The persona manager 342 may select the one or more personas. In certain embodiments, the selected personas may include an individual persona, a group persona, an entity persona (e.g., a company, organization, or other type of structure), or any combination thereof. Once the persona is selected at 906, the method 900 advances to 910 and the system applies the selected persona to the data using the selector/optimizer component 344 to apply constraints, optimizations, query enhancements, etc. to produce one or more queries.

Advancing to 912, the one or more queries are provided to the normalizer. In certain embodiments, the one or more queries are provided to the query/results normalizer 418. In certain embodiments, the query/results normalizer 418 may send the one or more queries to data sources associated with a selected vertical 420.

Continuing to 914, results are received from the normalizer based on the one or more queries. In certain embodiments, the results may be received, extracted, transformed, and loaded into temporary tables by the query/results normalizer 418. Advancing to 916, the selected persona is applied to the results using the persona AI, such as the persona AI engine 424 in FIG. 4. In certain embodiments, the personal AI engine 424 applies the selected persona to the results to sort, filter, rank, weigh or otherwise process the results according to the persona. In certain embodiments, the personal AI engine 424 may apply multiple selected personas to the results to produce multiple processed sets of the results.

Moving to 918, the selector/optimizer component 344 selectively adjusts the results. In certain embodiments, the selector/optimizer component 344 selectively adjusts the results by filtering, sorting weighing or otherwise altering the results. In certain embodiments, the selector/optimizer component 344 may select between multiple processed sets of results and may provide the selected (adjusted) results to the I/O normalizer 414. Proceeding to 920, the results may be provided to the device. In certain embodiments, the results may be provided to a process, a device, or another entity.

Figure 10:
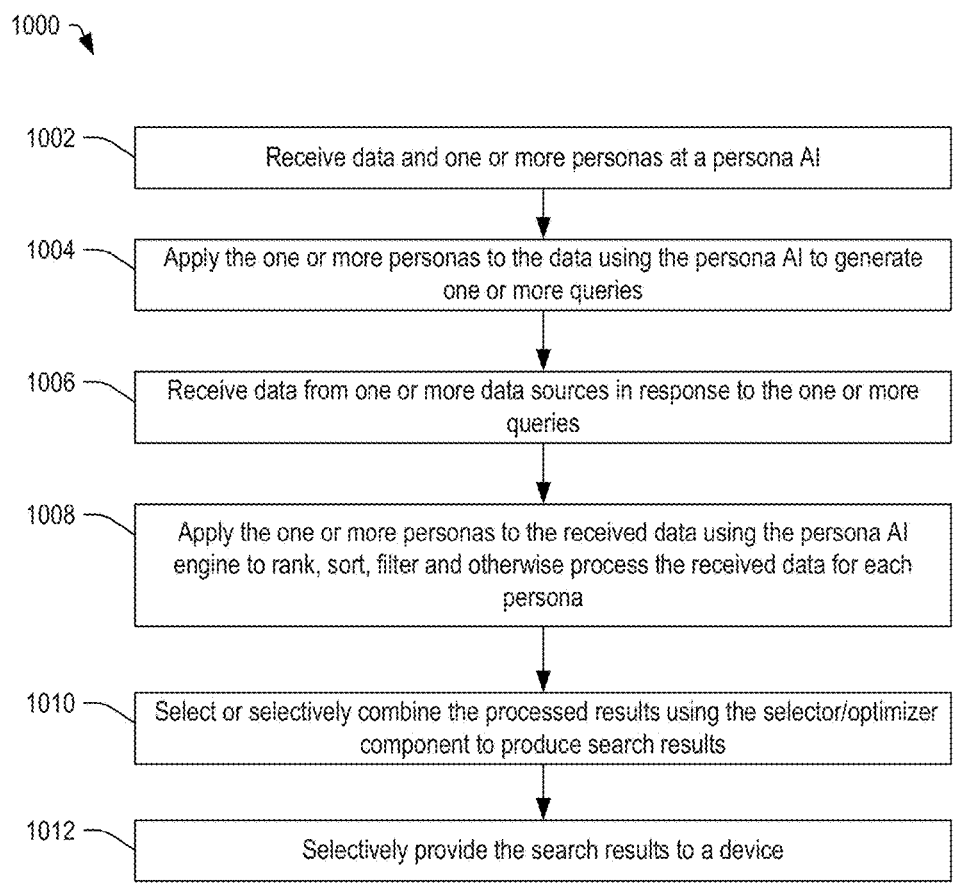
FIG. 10 is a flow diagram of a method of providing information based on a selected persona, in accordance with certain embodiments.

FIG. 10 is a flow diagram of a method 1000 of providing information based on a selected persona according to certain embodiments. At 1002, data and one or more personas are received at a persona AI. In certain embodiments, the persona AI may be executing on a processor and the data and the one or more personas may be loaded into processor memory. In certain embodiments, the persona AI may be implemented a computing system having a persona AI installed thereon and executable by a processor to operate as an artificial intelligence engine. Continuing to 1004, the one or more personas are applied using the persona AI to generate one or more queries. In certain embodiments, the selected personas may describe different preferences and restrictions, and the selected persona in conjunction with the persona AI engine may utilize query expansion and other techniques, influenced by the preferences and restrictions, in order to generate the one or more queries for the particular persona. The queries may then be sent to one or more data sources.

Advancing to 1006, data is received from one or more data sources in response to the one or more queries. The data may be received in response to queries from each of the one or more data sources, and the computing system 302 may maintain the data independently for each persona. Continuing to 1008, the one or more personas may be applied to the received data using the persona AI engine to rank, sort, filter, weigh and otherwise process the received data for each persona. Results corresponding to each persona may vary, and the rank and order may vary from persona to persona. Multiple sets of ranked, filtered, sorted, weighed and otherwise processed results provide competition between the personas, which competition may be resolved by the selector/optimizer component 344.

Moving to 1010, the processed results are selected or selectively combined using the selector/optimizer component to produce search results. The selector/optimizer component may select results from some search results and combine them with search results from another, in part, based on social voting between the personas and deep learning. Continuing to 1012, the search results are provided to a device.

Figure 11:
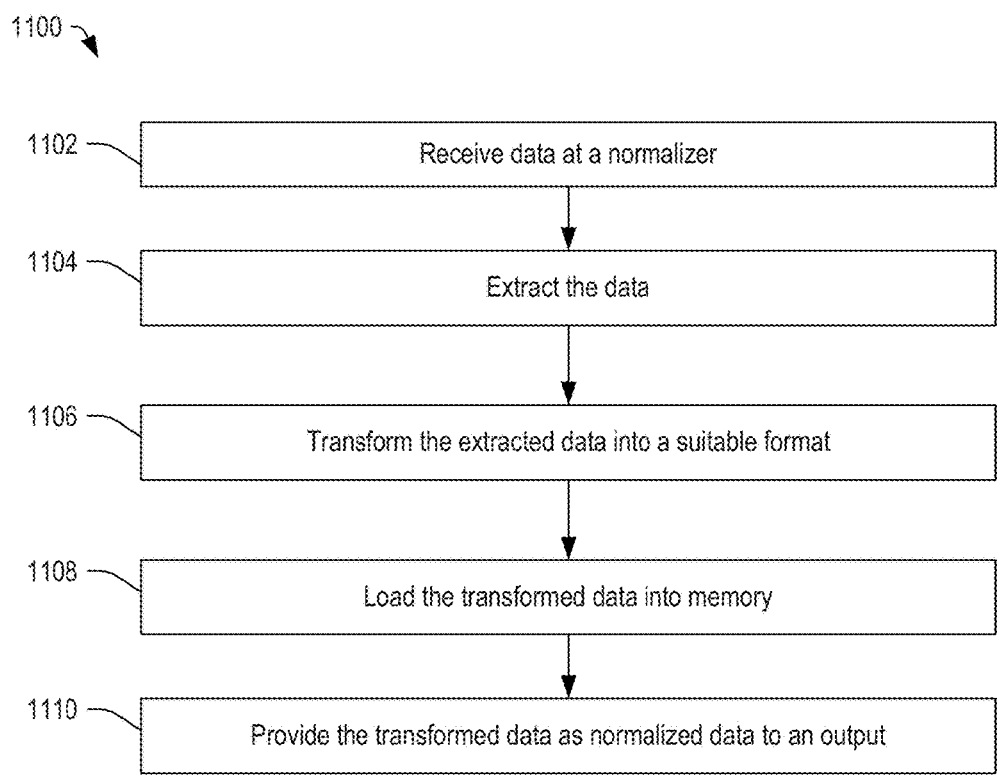
FIG. 11 is a flow diagram of a method of normalizing received data, in accordance with certain embodiments.

Referring now to FIG. 11, a method of normalizing data is described and generally indicated at 1100. At 1102, data is received at a normalizer. In certain embodiments, the normalizer may be the I/O normalizer 414, the query/results normalizer 418, another normalizer, or any combination thereof. Continuing to 1104, data is extracted. In certain embodiments, the data may be received in a variety of formats including tables, data streams, documents, and so on.

Moving to 1106, the extracted data is transformed into a suitable format. The suitable format may be determined based on the processing to be applied. In certain embodiments, the data may be transformed for insertion into fields. The transformation may include altering the data slightly to match the pre-defined format, such as a four-digit year as opposed to a two digit year in a date field.

Proceeding to 1108, the transformed data is loaded into memory. In certain embodiments, the transformed data may be stored in temporary tables. In certain embodiments, the transformed data may be stored in a database. Continuing to 1110, the transformed data is provided to an output as normalized data. In certain embodiments, the output may be coupled to a circuit or a processor executing instructions to process the normalized data.

Figure 12:
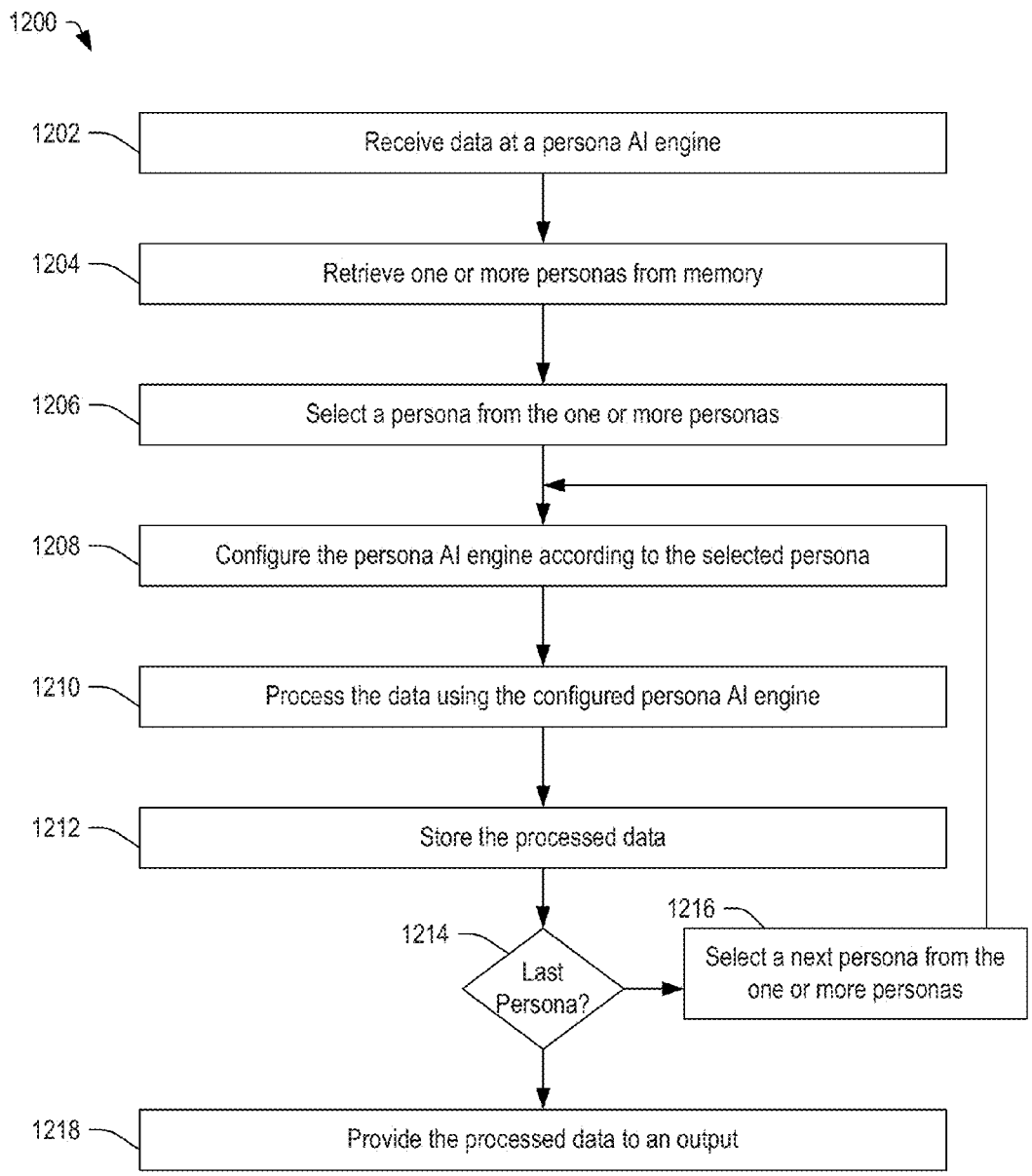
FIG. 12 is a flow diagram of a method of configuring a persona artificial intelligence agent, in accordance with certain embodiments.

Referring now to FIG. 12, a method of applying personas to a persona AI engine is described and generally indicated at 1200. At 1202, data is received at a persona AI engine. In certain embodiments, the data may be part of a query or may be results retrieved in response to a query. Advancing to 1204, one or more personas may be retrieved from memory. In certain embodiments, the one or more personas may have been retrieved prior to receiving the data.

Continuing to 1206, a persona may be selected from the one or more personas. Moving to 1208, the persona AI engine may be configured according to the selected persona. In certain embodiments, configuring the persona AI engine may include modifying a baseline persona to configure the persona AI engine for the selected persona. In certain embodiments, configuring the persona AI engine may include loading the selected persona into the persona AI engine.

Proceeding to 1210, the data is processed using the configured persona AI engine. In certain embodiments, the processing applied to the data may vary based on the context. In response to a query, for example, the processing may involve query expansion and application of filters or limiters to provide queries that correspond to the data and to the persona. In an illustrative example, if the persona is an individual's leisure persona, the persona may be able to disambiguate a search for "EAGLE" because the persona recognizes the user's interest in professional football as opposed to bald eagles and the persona AI engine may adjust and limit the query expansion to reflect those interests. Continuing to 1212, the processed data may be stored.

Advancing to 1214, the system determines if this is the last persona of the one or more personas. If it is not the last, the method 1200 proceeds to 1216 and the system selects a next persona from the one or more personas. The method 1200 then returns to 1208 and the persona AI engine may be configured according to the selected persona. Returning to

1214, if the persona is the last, the method 1200 advances to 1218 and the processed data for each of the personas is provided to an output.

Figure 13:
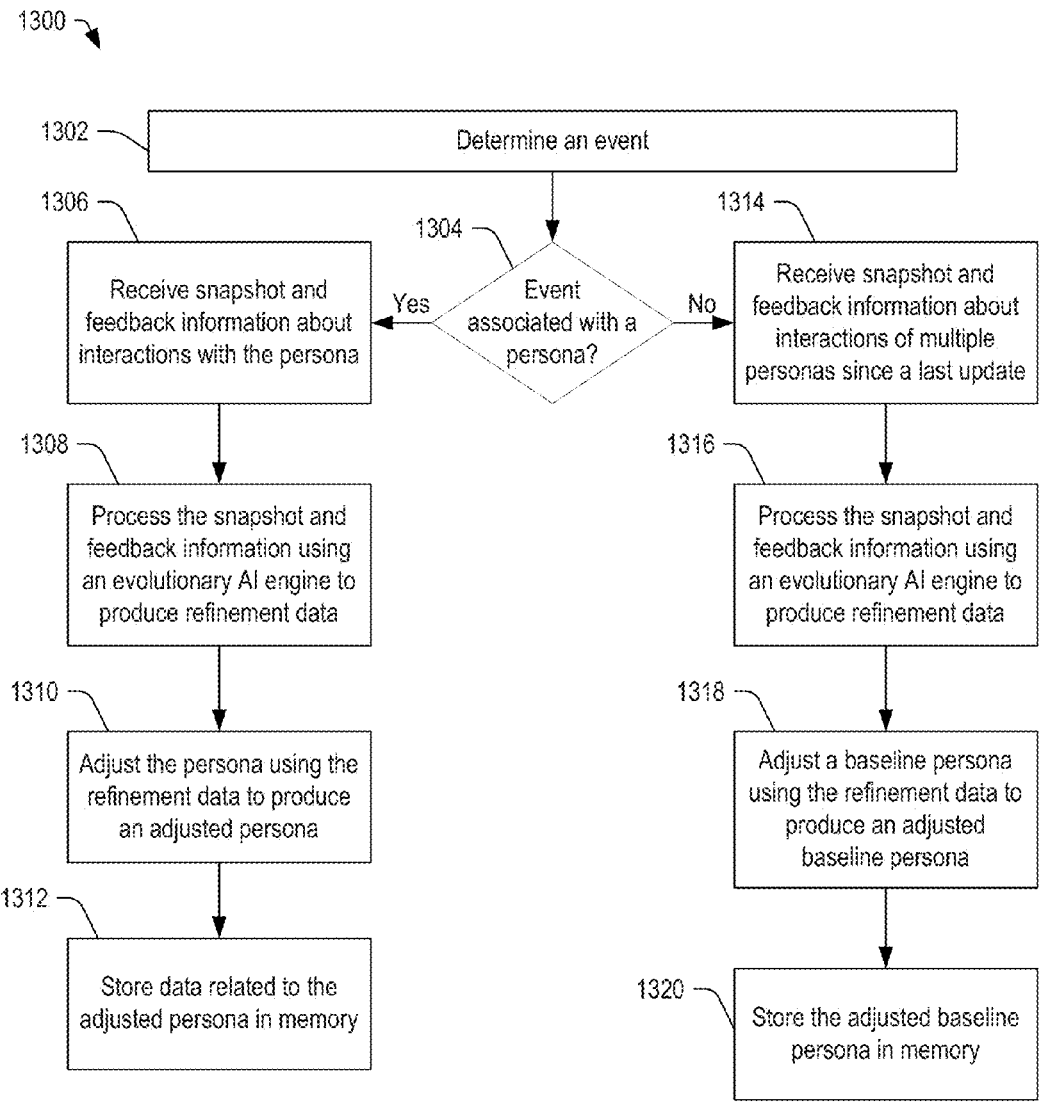
FIG. 13 is a flow diagram of a method of modifying personas using an evolutionary intelligence agent, in accordance with certain embodiments.

Referring now to FIG. 13, a method of adjusting personas using an evolutionary AI engine is described and generally indicated at 1300. At 1302, an event is determined. In certain embodiments, the event may be a triggering event, such as an end of session event corresponding to a user interaction with the system, an expiration of a period of time, a control signal from an administrator, or another triggering event.

Advancing to 1304, the system determines if the event is associated with a persona. If the event is associated with a persona, the method 1300 continues to 1306, the evolutionary AI engine receives snapshot and feedback information about interactions with the persona. In certain embodiments, the system may receive a series of snapshots captured at different times during a user's session. Each snapshot represents the available options and the feedback information represents user interactions (explicit and implicit) with those options at a particular point in time. In certain embodiments, the smallest interaction or triggering event may be taken into account as a user interaction.

Proceeding to 1308, the snapshot and feedback information are processed using an evolutionary AI engine to produce refinement data. In certain embodiments, the refinement data may include differences between a baseline persona and the user's preferences and restrictions determined from the user's interactions. Continuing to 1310, the evolutionary AI engine may adjust the persona using the refinement data to produce an adjusted persona. Moving to 1312, the evolutionary AI engine may store data related to the adjusted persona in memory. The data related to the persona may be the differences between the persona and the baseline persona.

Returning to 1304, if the event was not associated with the persona, the method 1300 advances to 1314, and the evolutionary AI engine receives snapshot and feedback information about interactions of multiple personas since a last update. Moving to 1316, the evolutionary AI engine may process the snapshot and feedback information to produce refinement data. Proceeding to 1318, the evolutionary AI engine may adjust a baseline persona using the refinement data to produce an adjusted baseline persona. Continuing to 1320, the evolutionary AI engine may store the adjusted baseline persona in memory.

Provided herein are certain examples and embodiments of how a persona based decision-making system could be implemented and used. For example, FIGS. 14 and 15 and the related descriptions illustrate examples of systems and processes for inventory searching with an intelligent recommendation engine. In another example, FIGS. 16 through 19 and the related description illustrate examples of systems and processes for searching for inventory using an artificial intelligence prioritization engine. In another example, FIGS. 20 through 22 and the related description illustrate examples of systems and processes for single page travel search and results modification. Such examples, and others found herein, are discussed with respect to travel, which is a good example of how the systems and processes herein can provide valuable decision-making capabilities; however, travel is only one example in which the systems and processes herein can be implemented. The systems and processes herein can be applied to any decision-making sector, whether it is based on an industry, family, personal, or other information; other examples may include financial, healthcare, real estate, entertainment, education, military, retail, grocery and produce, employment, education, and so on.

Figure 14:
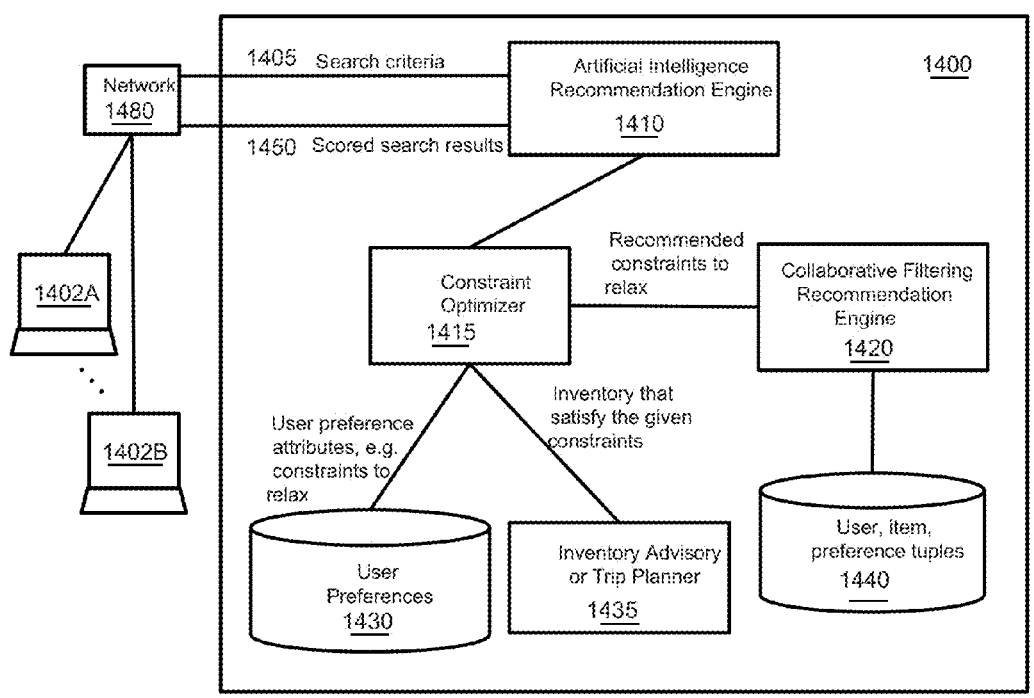
FIG. 14 is a schematic view of an example implementation of a persona-based decision system, implemented to allow searching for inventory, such as travel arrangements and tickets, in accordance with certain embodiments.
Figure 15:
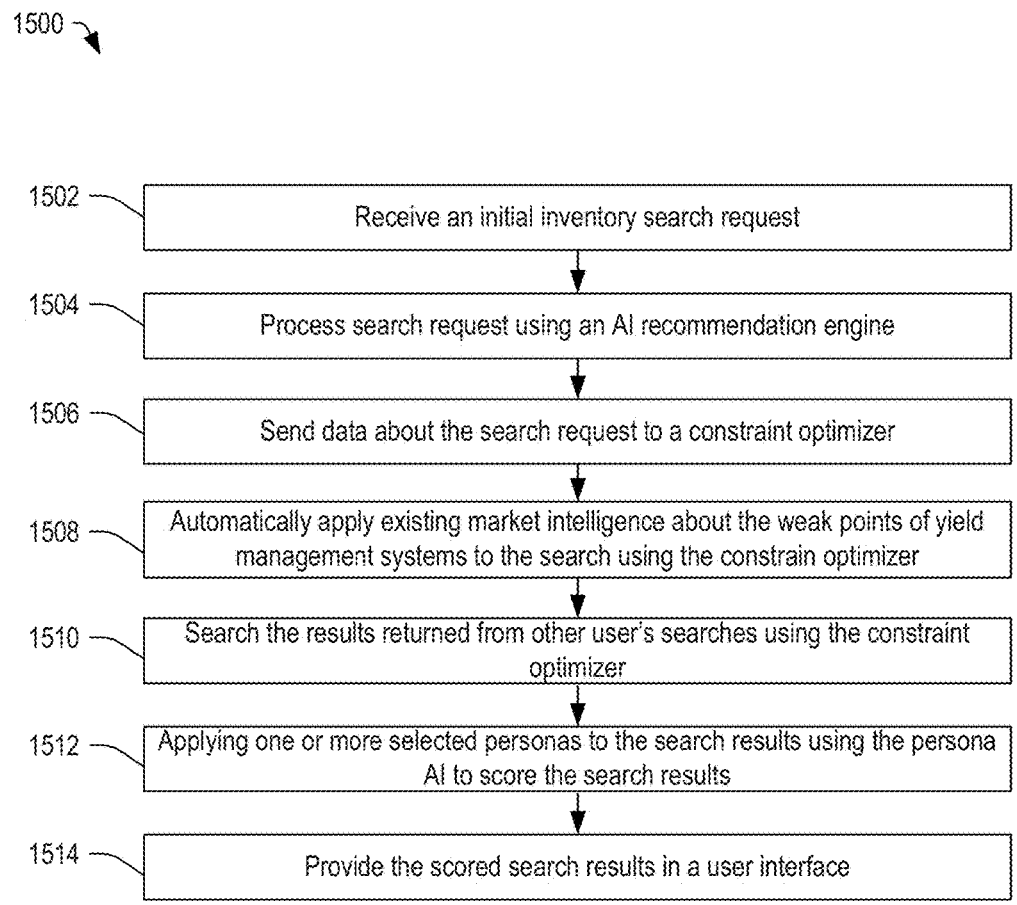
FIG. 15 is a flow chart illustrating an example process of a persona based decision system, implemented to allow searching inventory, including travel arrangement and tickets, in accordance with certain embodiments.

Referring to FIG. 14, a schematic view of an exemplary system for searching for inventory, such as travel arrangements and tickets is shown. Referring to FIG. 15, a flow chart illustrating an exemplary method for searching inventory, including travel arrangement and tickets is shown. When practical, similar reference numbers denote similar structures, features, or elements.

In some implementations, systems, methods, and articles of manufacture are provided for inventory searching, including prioritized searching, such as travel searching. This prioritized searching may include an intelligent recommendation engine that provides suggestions on the optimum search to carry out or best search results based on a prioritization taking into account a combination of one or more determined fluctuations or rules or norms in yield management systems, user-stated preferences for an inventory search, and monitored metadata representative of the recent searches conducted by other users that are relevant to a user's current search or requirements. In certain embodiments, the intelligent recommendation engine may provide suggestions after the search is carried out or at the time the search is to be instigated. In an example, if a user searches for X, the best result may be Y. However, if the user searches for Z, the user may find a better Y. In certain embodiments, the recommendation engine may operate to suggest "better" results to the user.

Implementations of the current subject matter can include, but are not limited to, systems and methods including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter. While the discussion has included examples of travel sites and travel arrangements, it should be appreciated that the present systems and methods are not confined to travel. In certain embodiments, the operation of the system may extend to any information-rich industry or sector, such as healthcare, food, exercise, and so on.

On existing travel sites, when a user searches for inventory, say for flights from Austin to Madrid leaving June 5 and returning June 12, the user receives a large quantity of search results. The user has to sift through those search results, decide whether any of the search results are appropriate, and then, on the basis of guesswork, decide whether to adjust any part of those search results and do a new search. The user may also run his or her search again at a later point, whether that hour, that day, or on a subsequent day, or even on multiple occasions, to see how the search results compare. Carrying out new and repeated searches is important as pricing and availability of inventory may appear to make no sense to an ordinary customer. Pricing and availability fluctuate continuously throughout an average day. It is not uncommon for a search at one point in a day to yield a result significantly better or worse than at another point in the day, so that the subsequent results are usually cheaper or more expensive.

Changing dates or making what appears to be a minor tweak to a travel route can also result in a huge price differential. One example is a search from Tel Aviv to Houston. In response to a search with these cities as the origin and destination, respectively, with the trip dates of April 12 to April 20, the user would find a business class price of $3350 with two stops during the flight, resulting in a flight of a long duration, round trip. However, if the user modified the trip dates and considered a stop in Istanbul, the price, in this example, plunges to $2480 with two nonstops on the way out and only one stop on the way back.

To address these and potentially other issues with currently available solutions, methods, systems, articles of manufacture, and the like consistent with one or more implementations of the current subject matter can, among other possible advantages, provide search systems, methods, and guidance that direct a user to some of the weakest points in yield management systems in order to help the user find the best prices or best match on inventory he or she is seeking. The systems and methods described herein can provide guidance and search results that potentially fulfill his or her criteria without the user repeatedly performing searches or using trial and error to discover the best way to perform a search. These search results include inventory the user probably couldn't otherwise find without endless searching and a lot of luck, or inventory the user could find, but only with a lot of hard work and effort.

The weak points in yield management may correspond to inventory pricing that correlates to timing before inventory expiration, travel timing, travel routing, and the like. These weak points may be identified programmatically or heuristically, and one or more rules may be defined programmatically to identify these weak points whenever the weak points exist or at the onset of these weak points. The weakest of the weak points are those weak points in yield management that provide the greatest deviation in favor of the criteria identified as important to the user implementing the search, such as the lowest price, shortest trip, and the like. The search system finds the weakest points in yield management to target in two ways.

The first way is to use existing market intelligence about the weak points of yield management systems. This existing market intelligence includes information or rules regarding how or where to find the cheapest prices, such as booking travel at off-peak times (for example Tuesdays and Wednesdays), comparing two one way tickets against a round trip, adding a stop in one or both directions on an international ticket to see if it reduces the price, and the like. The search system may automatically search with these and other parameters behind the scenes (e.g., in background), so results may be provided more quickly when a search is invoked, or is about to be invoked. Moreover, when one or more of these weak points in yield management presents a possible better result, the search system can offer the result to the user proactively, without the user explicitly requesting this type of result.

The second way the search system may find some of the weakest points in yield management to target is to integrate metadata about existing market intelligence with a constant stream of supplemental data based on real-time user activity. Examples of market intelligence in the travel market include trends in service provider pricing, identification of scarcity or surplus in items such as fuel or labor force that may influence pricing, and the like. The supplemental data may map search requests to search results and analyze particular combinations of searches and results that yield a favorable outcome. A favorable outcome may be any outcome that produces a result that closely resembles the ideal result, including a reduction in price, an increase in level of service (e.g., first class travel versus coach seating), a shorter travel duration, fewer stops (or more to accommodate traveler needs), departure and arrival times closer to those desired by the user, and the like. This outcome can be favorable to a specific user, a specific class or group of users, or to users more generally.

An example of using supplemental data based on real-time user activity is a scenario where, over the course of a couple of hours, several people carry out various searches for travel from New York to London. A first user could conduct the New York to London search and get results for flights ranging in cost from $700 to $1500. However, the $700 fare in this example is only available on one flight leaving on a Thursday evening and returning the following Monday either in the morning, afternoon, or evening. An hour later, a second user searches for flights from New York to London leaving around the same dates as the first user, but going Tuesday and coming back Monday. In this example, the search system delivers the results requested, but also offers a notification message advising that it can save the second user significant money if he or she is prepared to change outbound flights from Thursday to Monday, with the combination identified. As such, the user is provided additional travel options based on the supplemental data in parallel with travel options based upon a search using market intelligence and the second user's search criteria. In some cases, market intelligence may have been applied to the searches of the first user, and so the results returned to the second user may include results based upon supplemental data to which market intelligence has previously been applied and travel options based upon a search using market intelligence and the second user's search criteria.

FIG. 14 is a schematic view of an exemplary system 1400 for searching for travel arrangements and tickets. The search system 1400 may include an artificial intelligence recommendation engine 1410, a constraint optimizer 1415, a database of user preferences 1430, an inventory advisory engine 1435, a collaborative filtering recommendation engine 1420, and a user, item, preference tuples database 1440 (e.g., a database of an ordered list of elements). The system 1400 may couple to a network 1480 and one or more user interfaces 1402A, 1402B at computing devices including, for example, desk top computers, lap top computers, tablet computers, mobile phones, and the like.

The user interface 1402A, 1402B may comprise a browser, an application, and the like to allow interaction with system 1400. The user interface 1402A and 1402B may present the fields for entering search criteria 1405. For example, the user interface may accept input from a user to initiate a search for goods or services at the artificial intelligence recommendation engine 1410, including perishable goods or services. The search criteria 1405 can be transmitted through network 1480 from the user interfaces 1402A, 1402B to the artificial intelligence recommendation engine 1410. The artificial intelligence recommendation engine 1400 generates scored search results 1450, which are presented by the user interfaces 1402A, 1402B after being transmitted through the network 1480.

These scored search results 1450 may be generated by the artificial intelligence recommendation engine 1410 using information from the constraint optimizer 1415. The constraint optimizer 1415 receives data derived from the search criteria 1405 (e.g., metadata) and may, in turn, re-direct the data to the collaborative filtering recommendation engine 1420, and the inventory advisory engine 1435.

Depending on the information, or metadata, that the artificial intelligence recommendation engine 1410 has and passes on to the constraint optimizer 1415 regarding the search and particular parameters that the user wishes to use during this particular search, the constraint optimizer 1415 can draw information from any of the database of user preferences 1430, the collaborative filtering recommendation engine 1420, and the inventory advisory engine 1435. The collaborative filtering recommendation engine 1420 can in turn obtain information from the database with user, item, preference tuples 1440 (e.g., an ordered list of elements).

For example, the user can have multiple personas in system 1400 with different preferences associated with each personas. Each personas can contain information the user has provided, as well as data collected by the system from past interactions with the user. A user can have multiple core personas, for example the user as business traveler, user as leisure traveler (for example, for trips away with the user's spouse or friends), and the user as a family traveler (for example, for trips with the spouse and children). In addition, there may be sub-personas, for example to differentiate a trip with the user's spouse from a trip with friends. The personas can be created by the user, or personas can be suggested by the system based on user activity.

Each personas may correspond to different user needs, and each persona may be identified and used automatically. For example, when flying on business, price is less likely to be the key issue. Further, in healthcare, other factors may be more important to a consumer, such as convenience to the user's current location, a doctor or clinics overall rating, availability of an appointment, and so on. Different factors may be more important for different markets, such as food, leisure, work, etc. In certain instances, a travel user can be very time sensitive on routings, stops, and duration to accommodate long or multiple meetings in to a short space of time. When flying as a leisure traveler, price is likely to be a much bigger factor, and the user is also likely to want as much comfort as possible. The user also has different needs if travelling with children, where for example being on the fewest number of planes for the shortest period of time may be a preference. The system can also utilize other information about the user, whether or not such information is communicated as a preference, including the number of children the user has and their ages.

The information including personas and the associated preferences can be stored on the user, item, preference tuples database 1440 (e.g., a database of an ordered list of elements). The collaborative filtering recommendation engine 1420 can take the search information that is passed to it from the artificial intelligence recommendation engine 1410 via the constraint optimizer 1415 and request additional information corresponding to the indicated persona from the user, item, preference tuples database 1440. This information is returned to the constraint optimizer 1415 to help generate search results on the artificial intelligence recommendation engine 1410 that reflect the information collected from past interactions with the user from all of the personas, the particular persona being used in this search, or both, as well as secondary information such as the make-up of the user's family.

General user preferences, those which may apply regardless of the persona and which are received directly via user input, may be stored in the user preferences database 1430. The constraint optimizer 1415 can receive information from the artificial intelligence recommendation engine 1410 and in turn return to the artificial intelligence recommendation engine 1410 a short-list of search results based upon the user preferences in the user preferences database 1430, results returned by the inventory advisory engine 1435, as well as information regarding search constraints to relax from the collaborative filtering recommendation engine 1420.

The results returned by the inventory advisory engine 1435 may include the search results returned by searches performed by other users previously for trips, or more generally, inventory that shares some, or all, of the same characteristics of the user's current search. When the search is for travel, previously identified travel inventory can include inventory in the same general vicinity and for about the same time-frame. In the example above, the inventory advisory engine 1435 may have stored in it multiple, previously performed searches, and when a user searches for a trip from Tel Aviv to Houston, with the trip beginning on April 12 and ending on April 20, the inventory advisory engine 1435 can return air fare results for trips to and from similar or nearby locations and on or around the same dates that resulted from previous users' searches.

The artificial intelligence recommendation engine 1410 may examine the results returned from the constraint optimizer 1415 to further compile a refined list of suggested search results that should appeal to the user, and thus return scored search results to the user via the user interface (any of 1402A, 1402B) via the network 1480.

Though the databases 1430, 1440 are shown separate from the constraint optimizer 1415, collaborative filtering recommendation engine 1420, artificial intelligence recommendation engine 1410, and inventory advisory engine 1435, the databases 335, 340 can be located on a computing device, such as a computer server, on which one or more of the engines 1415, 1420, 1410, 1435 are located, or they can be physically located on separate devices connected by a network. Alternatively or additionally, some of the databases can be physically located on the same device as one or more engine while some of the databases or engines are remotely located.

FIG. 15 is a flow chart illustrating an exemplary method for searching for travel arrangement and tickets. In the method shown, the search system 1500 received an initial inventory search request 1502. This initial search request is processed by an artificial intelligence recommendation engine, in 1504 (e.g. 1410 in FIG. 14), and data about the search query may be distributed to a constraint optimizer (e.g. 1415 in FIG. 14) as in 1506. The constraint optimizer can apply existing market intelligence about the weak points of yield management systems to the search, as in selecting travel to begin on a Tuesday or Wednesday, as described above and shown in 1508. The constraint optimizer may also search the results returned from other users' searches for similar inventory items as in 1510, such as trips near the same locales or around the same time period. The results obtained by the constraint optimizer may also include results from the collaborative filtering recommendation engine, as described above. All of these search results can be processed by the artificial intelligence recommendation engine as in 1512 and presented to the user via a user interface as scored search results as in 1514.

The systems and methods described may differ from existing search systems by accumulating knowledge about a subset of products relating specifically to a user's preferences, product offering, time of year, market status, and the like. The repeating search provided by the recommendation engine can significantly increase the ability of a user to get the best result. The best result can be the best result within a certain time period, or the best result can be the best result from a longer period of time, that considers market fluctuations, product availability, and price to find the optimal item of inventory to fit the user's criteria.

The same systems and methods may work equally well with other types of travel inventory for example hotel, car, cruise, villas and apartments, as well as with non-travel inventory, including concert tickets and other inventory whose price may change over time. An example of the systems and methods described above working for hotel inventory would be a first user search for travel to Dallas, booking a reservation on Thursday at the Omni Hotel Downtown. In this user's search, a price is quoted of $200, but where a second user, an hour earlier, searched for the best four star hotels in downtown Dallas, and the second user found an incredible special of $100 on a newly opened boutique. The search system would provide the $200 result to the first user, but recommend that the first user consider a search including an additional, comparable hotel to the Omni because a significant saving has already been identified for an alternative that may appeal equally well to the user.

One or more aspects or features of the subject matter described herein can be realized in digital electronic circuitry, integrated circuitry, specially designed application specific integrated circuits (ASICs), field programmable gate arrays (FPGAs) computer hardware, firmware, software, or combinations thereof. These various aspects or features can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural or object-oriented programming language, or in assembly/machine language. ororor To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, or articles depending on the desired configuration. The implementations set forth in the foregoing description do not represent all implementations consistent with the subject matter described herein. Instead, they are merely some examples consistent with aspects related to the described subject matter. Although a few variations have been described in detail, other modifications or additions are possible. In particular, further features or variations can be provided in addition to those set forth herein. For example, the implementations described herein can be directed to various combinations and sub combinations of the disclosed features or combinations and sub combinations of several further features disclosed herein. In addition, the logic flows depicted in the accompanying figures or described herein do not necessarily require the particular order shown, or sequential order, to achieve desirable results. Other implementations may be within the scope of the following claims.

In some implementations, there is provided systems, methods, and articles of manufacture for inventory searching, including prioritized searching, such as searching for perishable inventory including travel searching. This prioritized searching may include an artificial intelligence recommendation engine that provides travel search results and suggests better searches based on a prioritization taking into account a combination of user-stated preferences for a travel search and monitored metadata representative of results obtained from previous users' searches for identical or similar travel, including identical or similar locations and travel dates. This prioritization may also be based upon market intelligence, business rules, user defined rules, and preferences that pertain solely to a particular search.

Figure 16A:
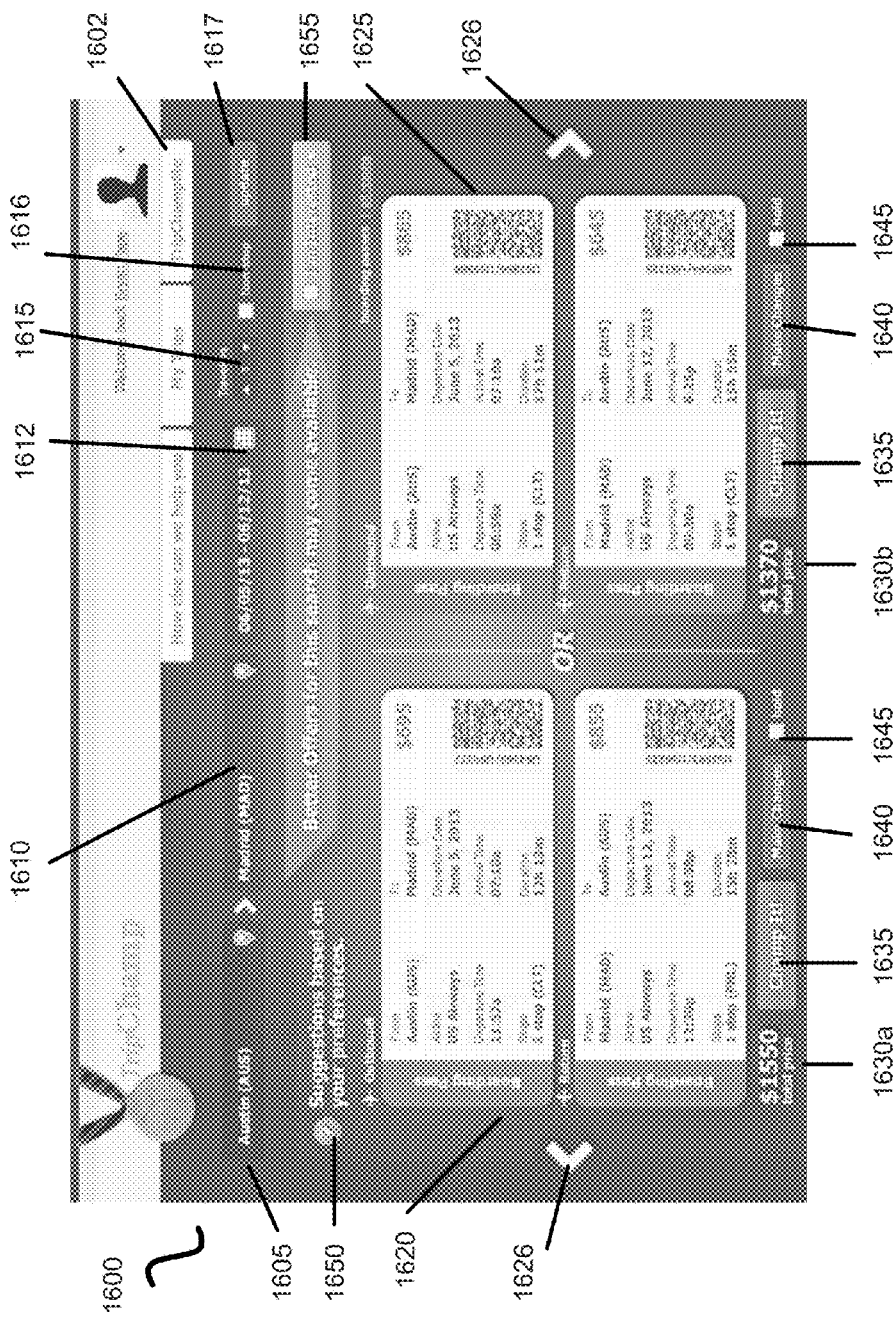
FIG. 16A is an example view of a user interface in an implementation of a persona based decision, implemented to allow searching for travel arrangements and tickets, in accordance with certain embodiments.
Figure 16B:
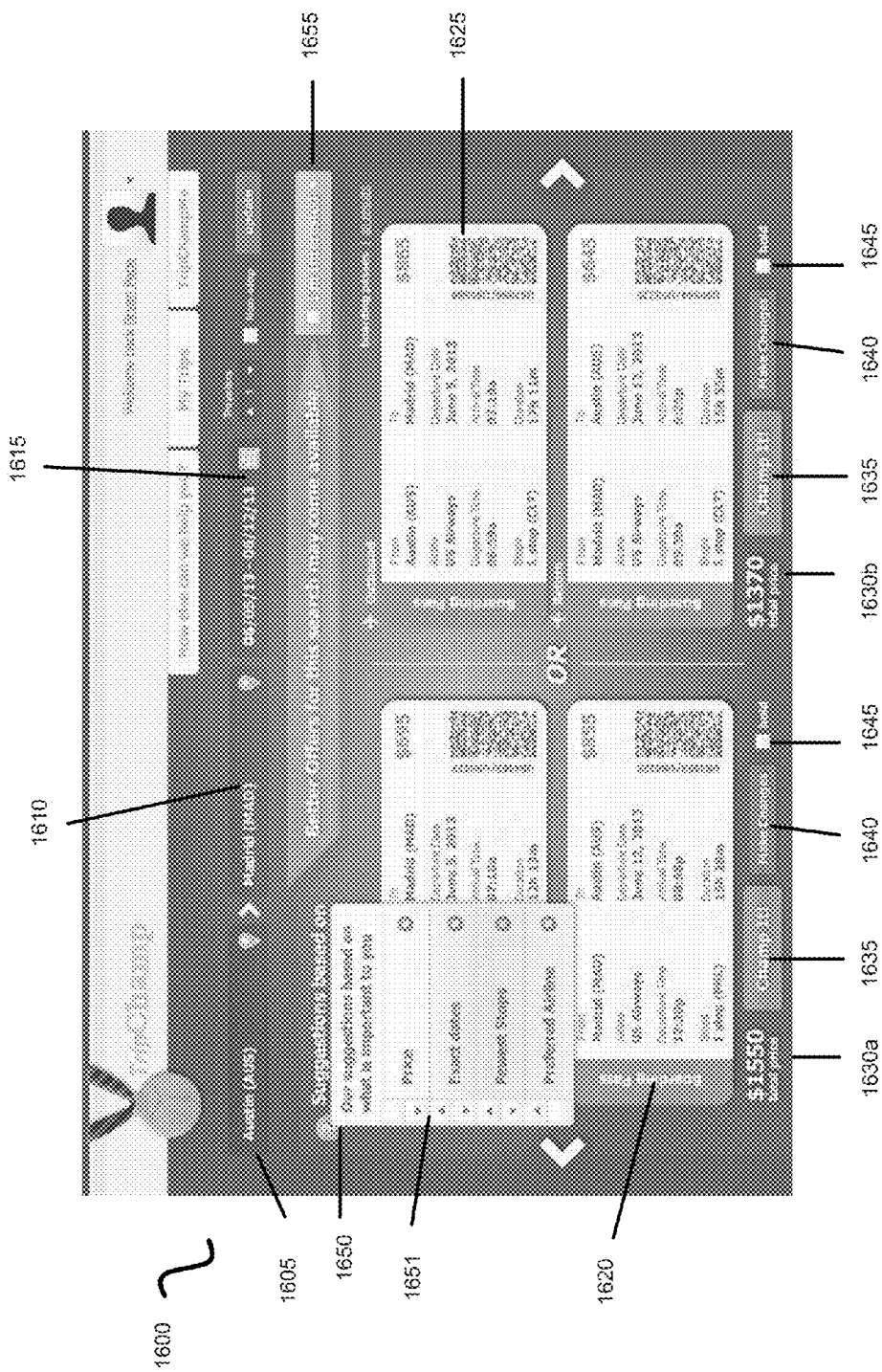
FIG. 16B is a schematic view of an example implementation of a persona based decision system, implemented to allow searching for travel arrangements and tickets, in accordance with certain embodiments.
Figure 18:
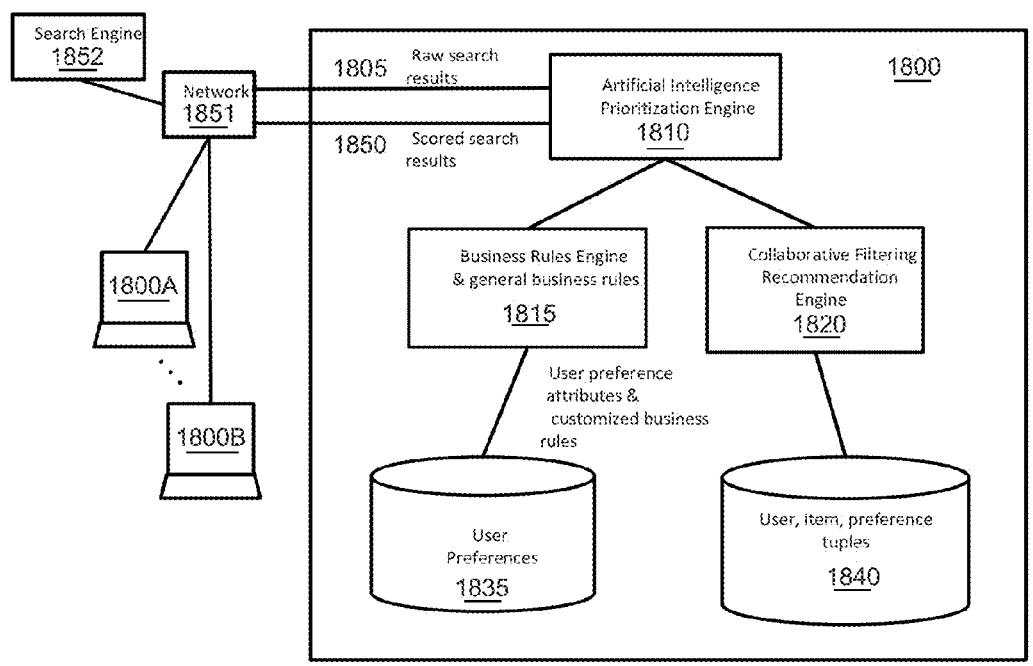
FIG. 18 is a schematic of an example implementation of a persona based decision system, implemented to allow searching perishable inventory, such as airline tickets, that includes an artificial intelligence prioritization engine, in accordance with certain embodiments.
Figure 19:
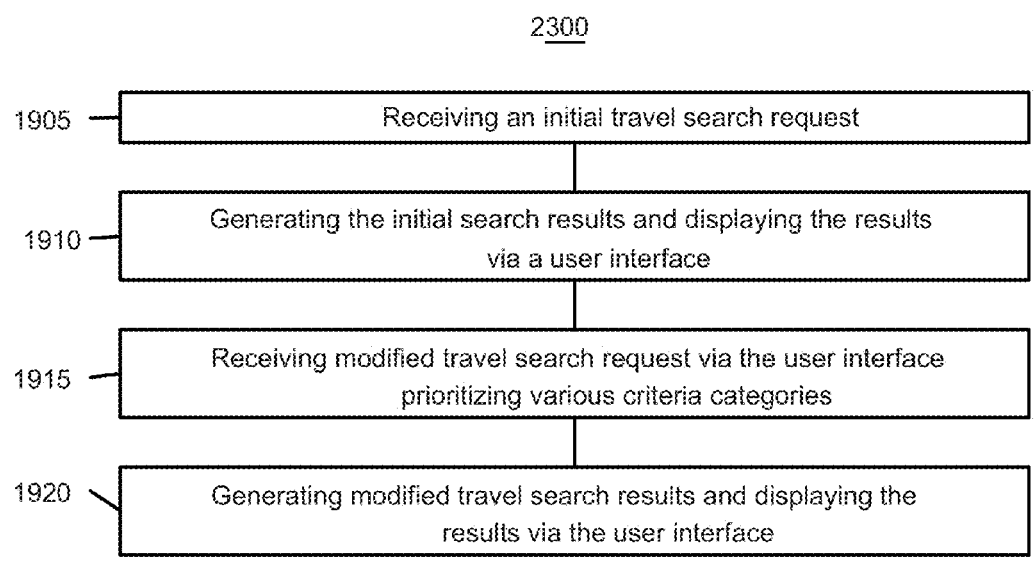
FIG. 19 is a flow chart illustrating an example implementation of a method of a persona based decision system, implemented to allow searching for travel arrangement and tickets, in accordance with certain embodiments.

Referring to FIG. 16A, a view of an exemplary user interface for searching for travel arrangements and tickets is shown. Referring to FIG. 16B, a schematic view of an exemplary system for searching for travel arrangements and tickets is shown. Referring to FIG. 18, a schematic of an implementation of a system for searching perishable inventory, such as airline tickets, that includes an artificial intelligence prioritization engine is shown. Referring to FIG. 19, a flow chart illustrating an exemplary method for searching for travel arrangement and tickets is shown. When practical, similar reference numbers denote similar structures, features, or elements.

In some implementations, there is provided systems, methods, and articles of manufacture for searching for items including, for example, perishable inventory. The search may be performed as a prioritized search using an artificial intelligence engine that provides items, such as travel search results, based on a prioritization taking into account a combination of user-stated preferences for a travel search and monitored metadata representative of the user's behavior with respect to a travel search.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

Conventional searching for perishable inventory, such as event tickets, travel tickets, and other items whose pricing can change over time, can result in overwhelming search results in terms of the number of possible items that fit the search criteria. On existing travel sites that search multiple data resources, when a user searches for inventory, say for flights from Austin to Madrid leaving June 5 and returning June 12, the user can receive a page of nearly 2000 results. The existing search sites search travel agent databases, data or sites from individual airlines, and the like, for the user. However, these conventional, existing search sites are unable to discriminate between results that the user does or does not wish to see until the user expresses a preference. For example, these existing sites will display fare prices outside of the user's price range, such as a $5000 economy ticket where the base fare is $1400. Also, a user may not want to consider certain airlines because he or she has had bad experiences travelling with that airline, because the airline has bad user reviews, or for other reasons such as cultural factors. The existing travel search sites will not be able to filter these preferences out, and may ask the user to select or deselect user interface elements, such as selection boxes/icons, to further refine the search results, for example by selecting specific airlines or choosing between nonstop flights and flights with one stop. The user's input results may result in a more manageable number of possible fits for his or her search criteria. However, when the user returns to the site, runs the search again, or runs a different search he or she is shown the same diversity of results, some of which are undesired, as in the previous search because the system used by existing search sites typically do not learn from the decisions made by the user, and do not apply weights to rank search results, but utilizes simple binary filters to interrogate whether or not a search result fulfills specific search criteria.

The subject matter disclosed herein may, in some example implements, relate to prioritized searching that includes an artificial intelligence engine that provides recommended search results for perishable inventory, for example, travel search results, based on a prioritization taking into account a combination of user-stated preferences for a travel search and monitored metadata representative of the user's behavior with respect to a travel search. There may also be provided an artificial intelligence prioritization engine that conducts a search utilizing the core search criteria provided by the user, but instead of returning all of the search results responsive to the search criteria, the search results can be prioritized based upon additional criteria to provide fewer results, but results that are more likely to be of interest to the user. This additional criteria used by the artificial intelligence prioritization engine can include specific criteria that the user has for this search only, general rules the user has established, patterns in purchases made by the user, and the like, and this additional criteria can help determine the best matching results to present at a user interface including the user performing the search. As a consequence, instead of looking through dozens and dozens of search results, the user can be presented with fewer results, such as five or fewer results, that the artificial intelligence prioritization engine predicts will suit the user's desires, needs, or the like. Among the results presented by the artificial intelligence prioritization engine can be the best result for the user at that specific point in time that reflects the preferences and circumstances surrounding the user at that moment. The artificial intelligence prioritization engine can take into account user behavior at the time of search, each user reaction to each result, and can maintain a behavioral profile taking into account past user sessions, which behavior profile may be processed by the AI engine to adjust the persona.

FIG. 16A shows an exemplary user interface 1600 for searching for travel. In this view of the exemplary user interface 1600, a user is searching for a trip starting at Austin, Tex. to Madrid, Spain and back again from June 5 until Jun. 12, 2013. The user interface 1600 has a series of navigation buttons 1602, an origin of trip field 1605, a destination of trip field 1610, a time-frame for the trip field 1612, a traveler quantity indicator 1615, a non-stop preference indicator 1616, an update button 1617 for updating results presented at user interface 1600 when a change is made, a first suggested itinerary 1620, a second suggested itinerary 1625, one or more scroll button 1626 to view returned search results, a first air fare 1630*a*, a second air fare 1630*b*, an optimization button 1635, a change enabling button 1640, a hold button 1645, a prioritization engine activation button 1650, and a price optimization indicator 1655.

In the example search for a fare round-trip from Austin to Madrid and back again, the origin of the trip, Austin, is in the origin field 1605 and the destination of the trip, Madrid, is in the destination field 1610. The origin and destination fields 1605, 1160 can receive typed input or input through a list or a map. The user can see the airports in an area and consider leaving from an alternate airport in a neighboring city to better optimize his or her search. If Madrid seems to be resulting in inopportune times, too few non-stop legs, expensive fares, or other undesired aspects, the user can consider travelling through another city, such as Barcelona, during at least one leg.

Still in FIG. 16A, the user can input the desired dates into the time-frame field 1612 through typing or through a pull-down menu or calendar. The number of travelers can be indicated in the traveler quantity indicator 1615 either by typing in the number of travelers or by using interface buttons to increase or decrease the number. In the example of FIG. 16A, the user interface 1600 shows that the search is for airfare for one traveler, but the user can increase the number of travelers if he or she is traveling with a companion or with family. If the user prefers to see only non-stop flights, he or she can indicate that in the non-stop indicator 1616. If the number of travelers, origin, or destination changes, or the traveler decides that he or she would prefer a non-stop flight, then he or she can see the impact of these changes by implementing the update button 1617.

The results of the search can be displayed as representative boarding passes 1620, 1625 with the origin and destination, the departure and arrival time, the duration for each leg, the number of stops, and the price for each leg. The total price 1630a, 1630b for each pair of representative boarding passes 1620 and 1625, are listed below the boarding passes, as are buttons for holding any pair of representative boarding passes 1645 for comparison to other search results, buttons to enable the user to make changes 1640, and buttons to purchase the air fare 1635 represented by the boarding passes 1620 and 1625. To see more search results, the user can utilize the scroll buttons 1626.

The user can decide that he or she does not want to search through all the search results by scrolling through them one at a time. The user can use the navigation buttons 1602 in FIG. 16A to review his or her search history, to view other search options, or input more criteria and preferences. Alternatively or additionally, the user can choose to see the results generated by the artificial intelligence prioritization engine by selecting that option 1650.

FIG. 16B shows the user interface of FIG. 16A with the artificial intelligence prioritization engine results option 1650 configured to provide results to user interface 1600. When the user decides to use the artificial intelligence prioritization engine, the user interface 1600 may present a list of criteria 1651 at user interface 1600. The list of criteria can include price, exact travel dates, fewest stops, and preferred airlines, or any other type of criteria that can be used to categorize search results. As shown in FIG. 16B, the items in the list are presented in an order, with the most important criteria at the top.

The artificial intelligence prioritization engine identifies what factors are most important to a user at user interface 1600 by evaluating what he or she tells the system (for example, system 300 described below) is considered important, for example cheapest flights, fewest stops, shortest duration, preferred airline (in this example US Air) and by combining the information provided by the user with monitored activity information, such as what the user actually does over time when searching, selecting, or booking travel. For example, what a user says he or she does and actually does may not always the same, and there may be a mismatch between the user's conscious and sub-conscious desires. To illustrate further, a user might tell everyone that he or she only books the cheapest flights but actually he or she might regularly select US Air flights that are cheap but not necessarily the cheapest flights when compared to flights from all carriers. The reasons the user makes this selection is known only to the user, but may for example be a result of better treatment received on this airline or loyalty status. By combining what the user says with what he or she does, the system including the artificial intelligence prioritization engine may provide a much more accurate result that reflects the changing experiences, needs and desires of the user, and may store such information as part of the user's persona.

In FIG. 16B, user interface 1600 includes as the most important factors to a given user the following (which are in rank order from most to least important): cheapest price, shortest duration, fewest stops, and preferred airline (in this case US Air).

The user may decide that on this trip "Shortest Duration" is more important as he or she is travelling with young kids and wants to spend as little time on the plane as possible. The artificial intelligence prioritization engine takes this into account and allows the user to change the order of the prioritization fields, to delete fields entirely, or to add an entirely new field. The changes can be made permanent or left for that trip only. The artificial intelligence prioritization engine may constantly update itself so that, as soon as changes have been made by the user at the user interface engine, those changes are provided to the artificial intelligence prioritization engine to allow searching for and returning to user interface 1600 an updated set of search results (for example, the five best search results for that user with an indicator next to each result describing why that result has been chosen, for example because it is the cheapest price).

As mentioned above, if the user wants to remove criteria from consideration, he or she can remove it from the list, for example, by using the buttons on the right hand side of the list shown. When the user wants to change the importance of a category, he or she can move the category up or down on the list, such as by using the arrows on the left hand side of the list. The preferences that the user has for criteria can be defined on other pages that can be reached using the navigation buttons 1602, based upon information supplied when creating a user persona, based upon past behavior associated with the user persona, or any combination thereof.

If the user would like to run the search again closer to the desired travel date to see if any better results are available, he or she can utilize the price optimization indicator 1655. Once activated, the user can decide when to run the search again, or how frequently to run the search and have the search results or an indicator of new search results sent to him or her. In certain embodiments, the indicator may be sent to the user as an email message, a sms text, an audio alert, a voice message, an image, another type of notification, or any combination thereof.

Figure 17A:
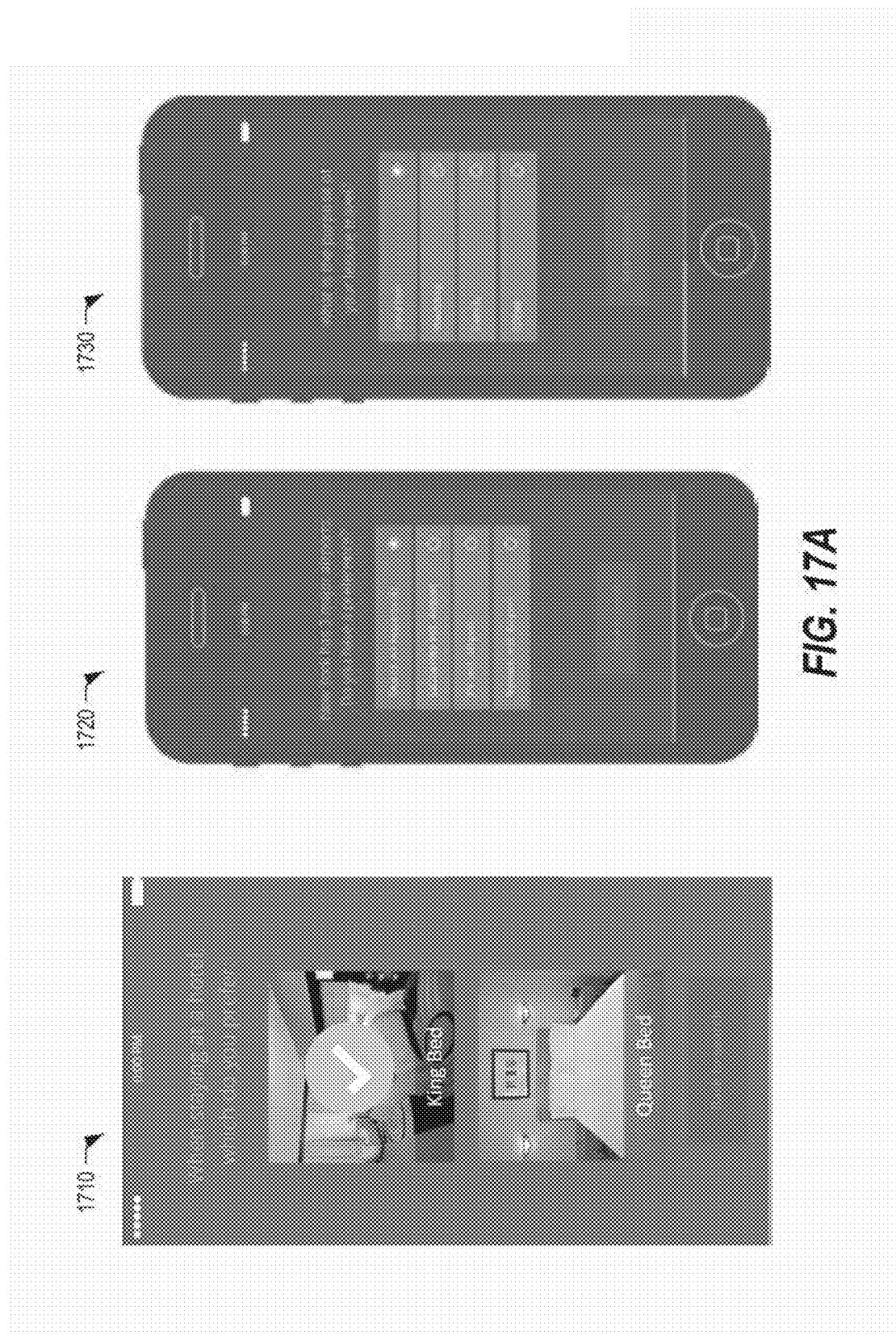
FIGS. 17A-17D are views of example implementations of graphical user interfaces for the systems and methods described herein, in accordance with certain embodiments.

FIGS. 17A-17D are views of user interfaces that can be used to provide travel solutions determined by the systems of FIGS. 3 and 4 and that can be used according to the methods described herein with respect to FIGS. 5-15, in accordance with certain embodiments. FIG. 17A shows embodiments of GUIs for a persona-based decision system that allows a user to specify options or preferences. Three example GUIs are shown: the first GUI 1710 depicts an example preference choice for a user to select; the second GUI 1720 also depicts an example preference choice for a user to select; and the third GUI 1730 depicts a question soliciting information from the user. The GUIs may present one or more options or preferences to the user. In certain embodiments, the options or preferences may be presented to the user while a search is being conducted. The selected options or preferences may be incorporated into the pending search before results are transmitted to the user. In certain embodiments, the options or preferences presented to the user may not be directly related to a pending search and not incorporated into a pending search, but any selected options or preferences may be saved to a persona (or elsewhere) for later use.

In GUI 1720, the following information is presented as an example: "New York has 3 major airports. Do you have a preference?" This statement is followed by four selectable options: "Search All Airports," "LaGuardia International Airport," "JFK International Airport," and "Newark International Airport." The user may specify one of the options, and the travel search may be limited to the selected airports. Moreover, the persona may be updated with this information so that subsequent searches will be similarly restricted.

The GUI 1730 may collect additional user preference information while the system is processing a request. In the particular example shown, the GUI 1730 includes a question about the purpose of the leisure travel, such as "Vacation," "Wedding," "Family," or "Other." This additional user preference information may be used by a persona-based decision system to recommend additional options, features, or information, such as hotels, rental cars, leisure activities, etc. Any options, preferences, or information may be displayed to a user while a search is pending, the results of which may be used in a pending search, saved for later, or both. While some specific examples are shown, any type of input device or GUI may be used to receive user feedback.

Figure 17B:

FIG. 17B shows an embodiment of a GUI 1750 for a persona-based decision system that can present search results as a plurality of results cards. The example depicted is for a travel search involving flights between Austin, Tex. and Phoenix, Ariz. departing from Austin, Tex. on March 21 and returning from Phoenix, Ariz. on April 2. Each result card includes information allowing a user to make an informed decision as to whether that result satisfies the user's preferences. In a travel example, such might be a price, airline information, and flight information including a flight itinerary having the departure and return flight information including the departure and arrival times and including duration information. Each result card further can include an option to execute the result; in the travel example, such may be to book the selected flight.

The result cards may be sorted into a ranked order based on the persona under which the analysis was performed (e.g., a business persona, a leisure persona, or some other persona, such as a "leisure plus family" persona). The top choice based on the persona-based decision system's understanding of the user's preferences, which may be a complex mixture of analysis and information as described herein.

In certain embodiments, the user may interact with the GUI 1750 to save a particular result (such as by clicking a star icon on the result card) or to discard a particular result, such as by clicking a trash icon on the result card. In response to user interactions (explicit feedback) or in response to implicit user feedback inferred from, for example, time spent on a particular card or determined from historical information about such explicit and implicit feedback), a persona-based decision system may update the persona information to produce a more refined persona that may enhance the user's experience in the future. For example, this may include information about results a user did not choose, whether or not the user specifically identified such results for deletion.

Further, in certain embodiments, the user may scroll or flip through the result cards to see other potential results. Further, in certain embodiments, the user may select one of the result cards, such as by double-tapping the result card, which may cause the GUI 1750 to "flip" the result card over to show more detailed result information, such as in the travel example might include connecting flights, layovers, and other information for the selected travel card. In some embodiments, a single tap may flip a result card to show, or not to show, more detailed information.

The GUI 1750 may further include a menu bar across the bottom that may remain accessible across multiple result cards and that may be accessed by the user to access information pertaining to the results, such as in the travel example: duration data, stops data, cost data, times data, and airline data, and such may allow access and configuration of user preferences associated with such data. The GUI may also present an option for the user to specify whether the settings should be applied to the current search or applied to global settings for all future searches.

The GUI 1750 also can show a plurality of result cards. In the illustrated travel example, icons at the top of the result card are indicated, which icons may represent factors or categories to which the result card is associated. In the travel example, the icons may represent associations with certain categories, for example a clock (duration), a dollar sign (cost), a multi-node icon (stops), or an airplane icon (airline). The icons can also be color coded to allow a user to recognize a category relationship based on the color of the icon, e.g. highlighted while others are faded. Further, each travel card may have an edge that is color coded for a particular category or attribute. In the travel example, this may include "Number of Stops," "Duration," "Price," and "Preferred Airline." The GUI 1750 makes it possible for the user to flip through the result cards quickly based on such preferences in order to quickly view a result that best fits his/her preferences.

While the persona-based decision system and associated GUIs described herein have been discussed using examples that are related to travel-oriented tasks, it should be appreciated that the functionality of the persona-based decision system may be extended to other functions, such as business or personal task management.

Figure 17C:
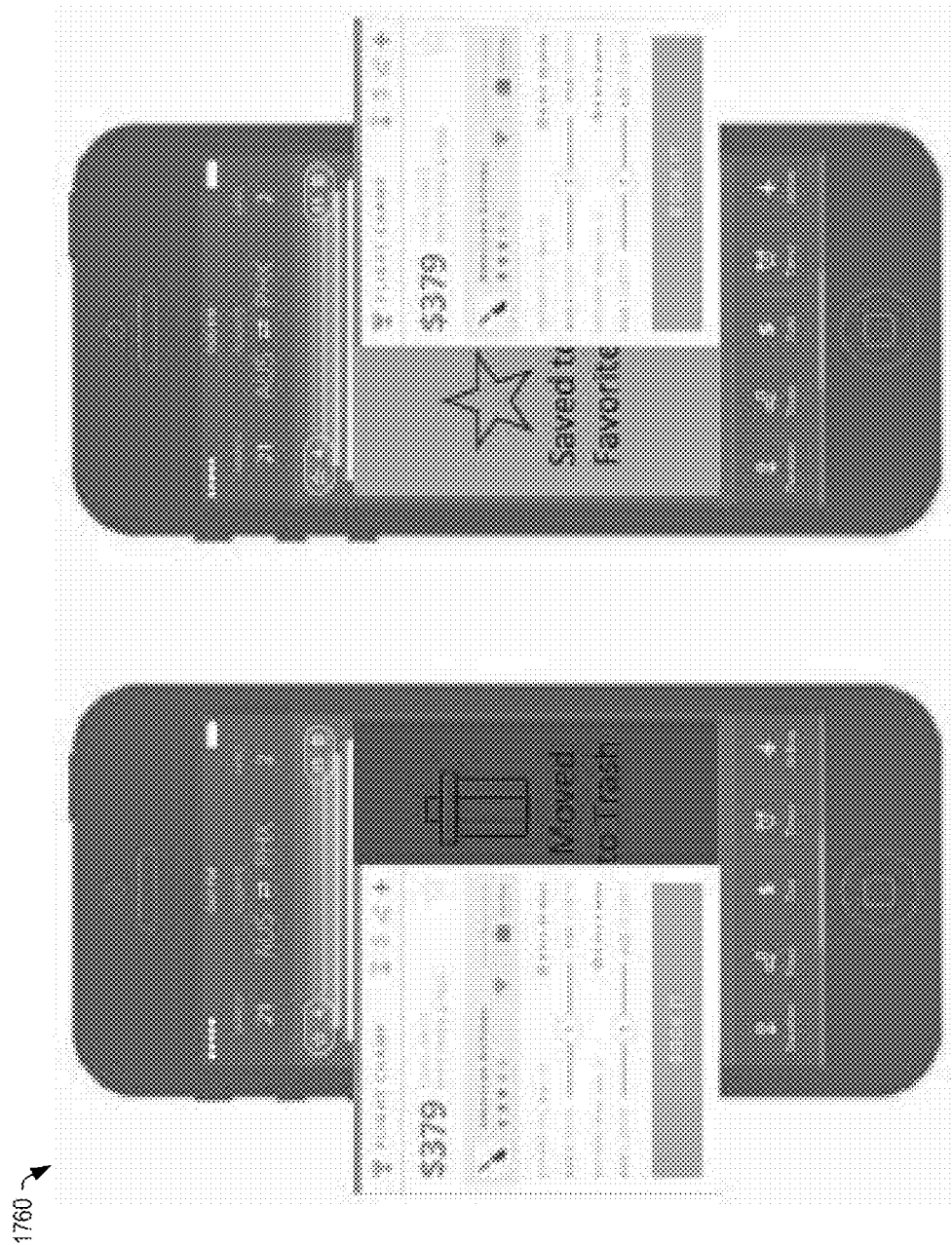

FIG. 17C shows an embodiment of a GUI 1760 for a persona-based decision system where the user may save or trash a particular result card by dragging the result card in one direction or another. In the illustrated example, dragging the result card to the left saves the result card, and dragging the result card to the right discards the result card. Other drag and drop options may also be used.

Figure 17D:

FIG. 17D shows an embodiment of a GUI 1770 for a persona-based decision system that can present results via a computer application, such as a browser viewing a web page or other computer program. Results may be displayed to the user one at a time, such as by flipping the cards over by selecting them, or may be displayed to the user together, or any combination of results could be displayed. As discussed herein, the GUI 1770 may include selectable options for the user to provide feedback to the persona-based decision system, provide preferences to the decision system, filter the results, or any combination thereof.

FIG. 18 is a schematic of a system 1800 for searching perishable inventory, such as airline tickets and the like. The system 1800 may include an artificial intelligence prioritization engine, a business rules engine with general business rules 1815, a database of user preferences 1835, a collaborative filtering recommendation engine 1820, and a database with information including user, item, and preference tuples 1840 (e.g. ordered lists of elements). The system 1800 may couple to a network 1851, a search engine 1852, and one or more user interfaces 1800A, 1800B at computing devices including, for example, desk top computers, lap top computers, tablet computers, mobile phones, and the like.

The user interface 1800A, 1800B may comprise a browser, an application, and the like to allow interaction with system 1800. The user interface 1800A, 1800B may present the search results as disclosed herein and present pages, such as those described with respect to FIGS. 16 and 17. For example, the user interface may accept input from a user to initiate a search (for example, by selecting 1635 at FIG. 16 or 17) for perishable goods or services at search engine 1852. The input can be transmitted through network 1851 from the user interfaces 1800A, 1800B to search engine 1852. The search engine 1852 generates so-called "raw" search results 1805, which have not been processed for prioritization by system 1800. These raw results may be provided at 1805 to system 1800 including artificial intelligence prioritization engine 1810, although the raw results may be provided to the user interface initiating the search as well 1800A, 1800B or to the artificial intelligence prioritization engine 1810 of the system 1800.

Depending on the information, or metadata, that the artificial intelligence prioritization engine 1810 has regarding the search and particular parameters that the user wishes to use during this particular search, the artificial intelligence prioritization engine 1810 can draw information from any of the business rules engine with general business rules 1815, the database of user preferences 1835, the collaborative filtering recommendation engine 1820, and the database with user, item, preference tuples 1840 (e.g. ordered lists of elements). For example, the user can have multiple personas in system 1800 with different preferences associated with each persona. Each persona can contain information the user has provided, as well as data collected by the system from past interactions with the user. A user can have multiple core personas, for example the user as business traveler, user as leisure traveler (for example, for trips away with the user's spouse or friends), and the user as a family traveler (for example, for trips with the spouse and kids). In addition, there may be sub-personas, for example to differentiate a trip with the user's spouse from a trip with friends. The personas can be created by the user, or personas can be suggested by the system based on user activity.

Each persona may correspond to different user needs. For example, when flying on business, price is unlikely to be the key issue. However, the user can be very time sensitive on routings, stops, and duration to accommodate long or multiple meetings in to a short space of time. When flying as a leisure traveler, price is likely to be a much bigger factor, and the user is also likely to want as much comfort as possible. The user also has different needs if travelling with children, where for example being on the fewest number of planes for the shortest period of time is likely to be desirable, even if this costs more money. Or a situation may include needs for a traveler where a preferred or long layover time between flight legs is needed to accommodate a special needs traveler getting between gates. The system can also utilize other information about the user, whether or not such information is communicated as a preference, including the number of children the user has and their ages.

The information including personas and the associated preferences can be stored on the user, item, preference tuples database 1840 (e.g. a database of ordered lists of elements). The collaborative filtering recommendation engine 1820 can take the search information that is passed to it from the artificial intelligence prioritization engine 1810 and request additional information corresponding to the indicated persona from the user, item, and preference tuples database 1840. This information is returned to the collaborative filtering recommendation engine 1820 to select search results from the raw search results 1805 that reflect the information collected from past interactions with the user from all of the personas, the particular persona being used in this search, or both, as well as secondary information such as the make-up of the user's family.

General user preferences, those which may apply regardless of the persona and which are received directly via user input, may be stored in the user preferences database 1835. The business rules engine with general business rules 1815 can receive information from the artificial intelligence prioritization engine 1810 and in turn return to the artificial intelligence prioritization engine 1810 a short-list of search results based upon the user preferences (the user's persona) in the user preferences database 1835.

The artificial intelligence prioritization engine 1810 may examine the results returned from one or both of the business rules engine with general business rules 1815 and collaborative filtering recommendation engine 1820 to further compile a refined list of suggested search results that should appeal to the user. The artificial intelligence prioritization engine 1810 may use a rule based engine or other artificial intelligence mechanisms, such as genetic algorithms, evolutionary algorithms, and the like, that can test and evaluate results. The other artificial intelligence mechanisms can provide the result most likely to be suitable for the user, taking into account the user persona used, as well as the timing and search parameters. The artificial intelligence engine may use mechanisms to identify such user archetypes while the user interacts with the artificial intelligence engine. Additionally, the artificial intelligence engine can forecast the user preferred results and user preferences based on interactions with other users that perform similar searches. In some implementations, the artificial intelligence rule engine is an optional component in the system. The system can utilize artificial intelligence technologies including evolutionary algorithms, genetic algorithms, and the like.

Though the databases 1835, 1840 are shown separate from the business rules engine 1815 and collaborative filtering recommendation engine 1820, the databases 1835, 1840 can be located on a computing device, such as a computer server, on which one or more of the engines 1815, 1820 are located, or they can be physically located on separate devices connected by a network. Alternatively or additionally, some of the databases can be physically located on the same device as one or more engine while some of the databases or engines are remotely located.

FIG. 19 is a flow chart illustrating an exemplary method for searching for a type of perishable inventory, e.g. travel arrangements and tickets 1900. In the method shown, the system receives an initial travel search request via the user interface (1600 in FIG. 16 and FIG. 17) in 1905. This initial search request is processed by a search engine that returns results to be reviewed by the user via the user interface as in 1910. The user can choose to implement the artificial intelligence prioritization engine or to otherwise modify the search 1915. If the user chooses to modify the search manually, he or she can change the priority of certain factors, including price, duration, exact travel dates, or actual parameters, such as the origin and destination for each leg of the trip. When the user chooses to have the artificial intelligence prioritization engine generate a short-list of search results, the process occurs as described above, with respect to FIG. 18. In either case, modified travel search results are created and displayed on the user interface 1920. From there, the user can either choose to purchase a fare, ask to run the search again in the future, or modify the search again, and each of these actions can be implemented by the system after accepting user input.

Although some of the examples described herein refer to travel searches, any other items may be searched for using the processes disclosed herein. For example, the items being searched may include hotel rooms, cruises, car rentals, villas, dining, and any other item whether travel related or non-travel related. Criteria for the prioritization fields can include any suitable criteria, such as cheapest price, highest star rating, best user reviews, preferred brand or chain, location—generally or proximate to a point of interest, special offers, celebrities associated with the location or brand, facilities, and the like.

In some implementations, there is provided systems, methods, and articles of manufacture for prioritized searching for perishable inventory including travel searching. This prioritized searching may include an artificial intelligence engine that provides recommended search results, for example travel search results, based on a prioritization taking into account a combination of user-stated preferences for a search and monitored metadata representative of the user's behavior with respect to a search, such as travel search results. This prioritization may also be based upon business rules, user defined rules, and preferences that pertain solely to a particular search.

Figure 20:
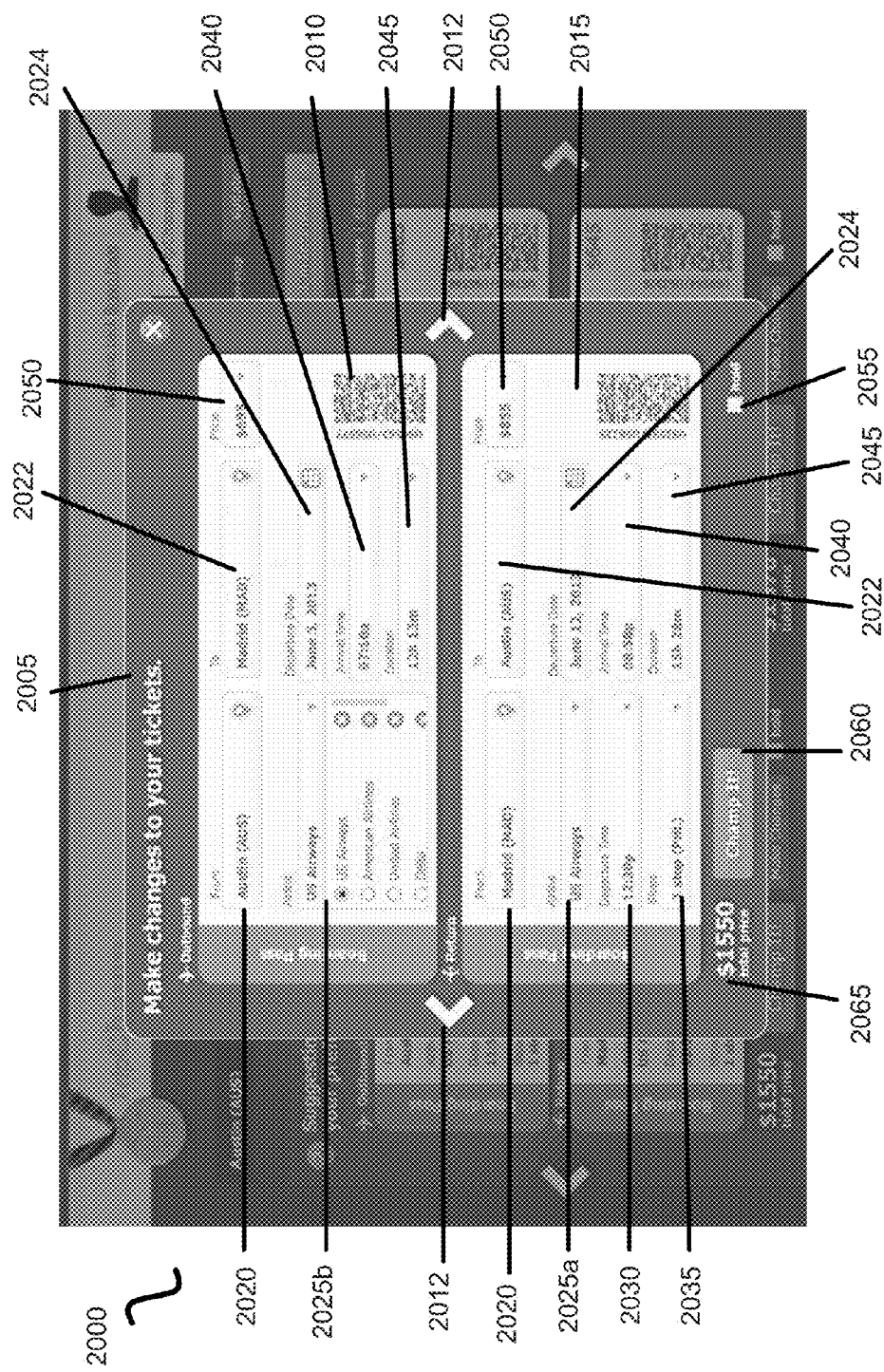
FIG. 20 is a view of an example implementation of a user interface of a persona based decision system, implemented to allow searching for travel arrangements and tickets, in accordance with certain embodiments.
Figure 21:
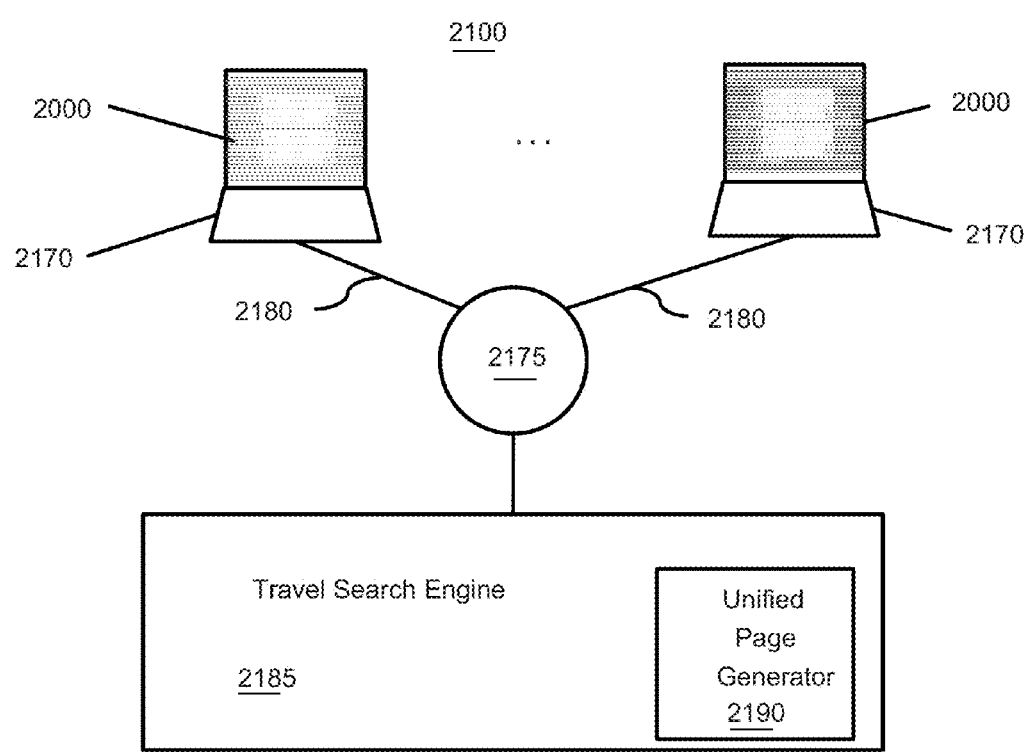
FIG. 21 is a schematic view of an example implementation of a persona based decision system, implemented to allow searching for travel arrangements and tickets, in accordance with certain embodiments.
Figure 22:
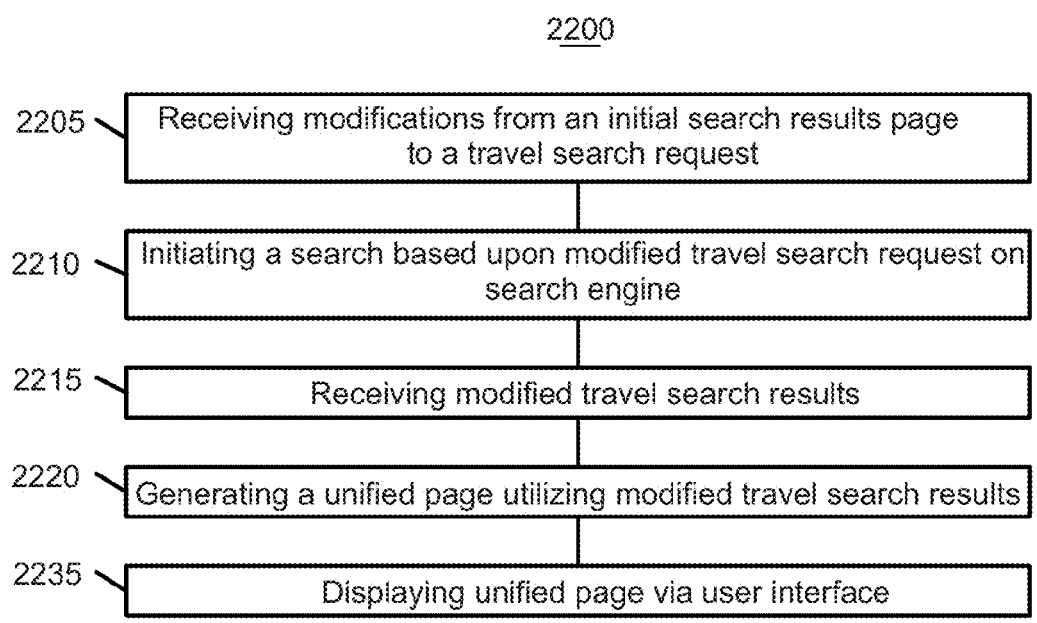
FIG. 22 is a flow chart illustrating an example implementation of a method of a persona based decision system, implemented to allow searching for travel arrangement and tickets, in accordance with certain embodiments.

Referring to FIG. 20, a view of an exemplary user interface for searching for travel arrangements and tickets is shown. Referring to FIG. 21, a schematic view of an exemplary system for searching for travel arrangements and tickets is shown. Referring to FIG. 22, a flow chart illustrating an exemplary method for searching for travel arrangement and tickets is shown. When practical, similar reference numbers denote similar structures, features, or elements.

In one aspect, methods for searching for items, such as perishable or time-sensitive inventory including travel related items. The methods may include presenting initial search results to a user; allowing the user to change the search parameters either individually, in combination or in totality; and providing updated/revised results in the same search context. Systems and apparatus for accomplishing the described methods, or resulting from the practicing the described methods, are also presented.

searching for goods or services that are closest to a consumer's desires is often a complex process, particularly when the price of a good or service can change over time or a variety of complex factors impact the price. An example of a complex search, in which customer preference and price are factors, is the search for travel tickets. Air travel, in particular, is a service whose price varies not only with origin and destination, but with dates of travel, the airline providing the service, the number and location of stops during a flight, the duration of any stops during a flight, and the portion of the air plane one chooses for the location of his or her seat, and the like. A travel consumer can choose to try to optimize his or her preferences, including the price of the trip, without the help of a professional, by using tools, such as travel search tools offered by web sites that aggregate travel information.

While search tools may streamline the search, these tools are still cumbersome in some respects. Current search systems are also limited, in that these systems do not allow the user to change the values of search parameters either individually, in combination, or in totality. For example, a user may have to utilize multiple websites or different pages. Specifically, on existing travel search sites, when a user searches for inventory, say for flights from Austin to Madrid leaving June 5 and returning June 12, the user receives the search results, evaluates how closely the results match his or preferences, and then has the ability to make changes in a variety of ways. For example, a user can update his or her search by selecting or deselecting icons/fields to narrow down choices. An example of this is selecting only certain airlines or selecting nonstop flights as opposed to flights with one or more stops. Another way in which a user can make changes arises when the user wants to make a substantive change. An example of such a substantive change is changing the dates of travel or changing the trip origin, destination, or both.

Utilizing conventional searching means, including existing web sites, the user can make changes by revising search parameters by for example making an entry at a user interface, such as revising a date field, a destination field, an arrival field, or the like. Once a user makes a change, a user may then execute another search to obtain results. However, these types of searches are typically cumbersome in the sense that a user has to repeatedly go to an original search, change search parameters, and then wait for the new search results to emerge. This difficulty is compounded when a user has to carry out a large number of searches, which is not uncommon, particularly with complex travel arrangements, such as international travel. Another difficulty is that this back-and-forth between websites and search result pages can force a user to take notes in order to keep track of the search results and the impact of changing one or more search parameters, such as the trip origin, the date, departure time, or airline.

In some example implementations, the subject matter disclosed herein may provide a user interface page (also defined as a view) where one or more parameters of a travel search are varied and the corresponding results are provided in a user interface that maintains the context of previous, related searches. For example, rather than providing search or modified search results as a separate page, the results can be provided and presented using the same context as the initial search, without forcing a user to go to another page or website. For example, the user may be presented with a single page, where search parameters can be provided, results obtained, and, if needed, additional search parameters can be provided and results obtained, while providing the same or substantially the same page (at least from the perspective of a user). As such, the user does not need to scour the results of various searches, each with its own search results page.

FIG. 20 is a view of an exemplary user interface 2000 for searching for travel arrangements and tickets. The user interface 2000 presents the results after an initial search in a search results window 2005. The search window 2005 presents a page (for example, a hypertext markup language page). The search window 2005 is generated after a search request is executed by a travel search engine. For example, a user can form a search request to find a flight from Austin, Tex., to Madrid, Spain leaving Austin on Jun. 5, 2013 and returning from Madrid on Jun. 12, 2013. The initial search results can return an airfare indicating US Airways as the carrier both ways, with one stop on the return flight, and a total price of $1550. The user can then decide to change the outbound carrier from Austin to Madrid, and possibly add a stop during the outbound flight. Rather than providing a separate window, a new list of search results are provided within the same (or substantially the same) page, at least from the perspective of the user, to maintain the context of the searching. For example, changing airlines at 2025b and invoking a revised search provides updated results in the same page 2005, maintaining the context of the search so that the user does not need to access other pages, web sites, or piece together the results of disparate searches.

The search window 2005 further includes an outbound boarding pass representation 2010 (outbound boarding pass) and a return boarding pass representation 2015 (return boarding pass). The outbound boarding pass 2010 and the return boarding pass 2015 may include one or more search parameters, which can also be used when searching for air fare. Each boarding pass 2010, 2015 includes one or more search parameters including: an origin field 2020, a destination field 2022, a departure date field 2024, an airline field 2025*a* and 2025*b*, a departure time field 2030, an arrival time field 2040, a number of stops field 2035, and a duration field 2045, although other travel related search parameters may be displayed as well.

The search window 2005 may also include one or more of the following fields: a total price 2065; a hold check box 2055 for holding or saving a search result for further consideration; a search initiation button 2060 for initiating a travel search based on the travel search parameters 2020, 2022, 2024, 2025*a*, 2025*b*, 2030, 2035, 2040, 2045, and the like.

The values in the fields within the search results 2005 may be populated after an initial search is completed. In FIG. 20, the user has executed a search for airfare from Austin to Madrid and back again. The initial search can be based upon a basic set of requirements input by a user or the initial search can be based upon a combination of basic requirements and user preferences, such as one or more of the search parameters defined at outbound and return boarding passes 2010, 2015. Moreover, the initial search results can include more than one set of outbound and return boarding passes 2010, 2015. In cases like these, the user can scroll through sets of the initially returned boarding passes 2010, 2015 using icon 2012, which allows scrolling through pages representing boarding passes with results that are close to the optimal results based upon the search parameters. If the user finds a set of boarding passes 2010, 2015 with parameters, such as cost and duration, that are acceptable to the user, he or she can choose to end his or her search and purchase the fares that correspond to those representative boarding passes 2010, 2015.

If the user does not find a suitable set of representative boarding passes 2010, 2015, he or she can change the values in any of the origin field 2020, destination field 2022, departure date field 2024, airline field 2025*a* and 2025*b*, departure time field 2030, arrival time field 2040, the number of stops field 2035, and duration field 2045 of either or both representative boarding passes 2010, 2015 shown in FIG. 20. If changes are made, the search can be re-executed with the results provided within the page 2005 to maintain the context searching process. Changes can be made to one search parameter only, a combination of search parameters or to all of the search parameters at once, as required by the user.

In the example of FIG. 20, the airline field 2025*a* shows that the user has selected US Airways in the initial search and is not changing that at this time. In contrast, the user is offered choices in the form of a drop down menu with a listing of candidate airlines in the airline field 2025*b*. Besides the radio button indicating the selection of an airline, the drop down menu shown has buttons on the right hand side of each airline name that can be used to eliminate an airline from consideration in the search. When changing the values in any of the other fields, the user can get appropriate tools, in addition to or in lieu of a field in which a value can be typed. For example, when choosing dates, a calendar can be displayed to a user, or when selecting an origin or destination, a map can appear with airports or major cities available to be selected as a search value. These tools, drop-down menus, and the like, enable the user to view search results and change any search parameter from the same page, without navigating away from the search results page.

The method can include activating the search initiation button 2060 after the user has made his or her changes to the search parameters. The unified user interface 2000 will update the fields in the search results 2005 that were not changed by the user in real time, that is to say as instantaneously as possible. As in the example described previously, in the search for airfare round-trip from Austin to Madrid and back again, the user can choose to refine the search by changing one or more of the parameters in the search results 2005 and then view the revised results in the same page. The revised results can be reflected as an updated price 2050, 2065, a change in duration 2045, or a change in the arrival or departure times 2030, 2040 in the same page to maintain the context of the search. Maintaining the context refers to providing updated search results using the same or similar page, same or similar lay-out, or same or similar configuration as a page prior to the updated search. For example, another page may be generated with the updated results but to a user the other page would appear like the prior page save for an updated price or one or more revised search parameters 2020, 2022, 2024, 2025*a*, 2025*b*, 2030, 2035, 2040, 2045.

When a result is returned and displayed that the user wishes to use for future comparison, he or she can "hold" the pair of representative boarding passes 2010, 2015 by activating the hold check box 2055. When further changes are made to the fields in the representative boarding passes 2010, 2015, the pair of boarding passes that are on "hold" will appear as an option to view in the stack of returned pairs of representative boarding passes 2010, 2015 that are generated and displayed in the search results 2005 portion of the unified user interface 2005. The user can scroll through the stack of representative boarding pass pairs using the page turning buttons 2012 when more than one pair of representative boarding passes are generated or when there is a pair of boarding passes on "hold" and the modified search returns at least one pair of boarding passes.

Once the user has determined that a pair of boarding passes 2010, 2015 best fits his or her criteria and preferences, he or she can choose to purchase the corresponding air fare for the price displayed 2065. Alternatively, the user can choose to save those search parameters and run the search again at a later date to try to obtain a lower price for the airfare.

FIG. 21 is a schematic view of an exemplary system 2100 for searching for travel arrangements and tickets. In the system 2100, there are one or more user computing devices 2170, and each computing device 2170 can display, and allow a user to interact with, the unified user interface 100. The system also includes a network 2175, such as the Internet, one or more network connections 2180, a travel search engine 2185, and a unified page generator 2190.

Each user interacts with a user interface 100 using his or her computing device 2170. As discussed above, the user will select initial settings for search parameters that can include a basic set of requirements or a combination of basic requirements and user preferences. The information input by each user can be sent via network connections 2180 to the network 2175 and directed to the travel search engine 2185. The travel search engine 2185, conducts a search based upon the initial settings for the search parameters and returns search results with information corresponding to the fields on the boarding passes 110, 155 shown in FIG. 1. These search results are used to generate a unified results page search results display (105 in FIG. 1) by the unified page generator 2190. The unified user interface 100 then receives the unified results page and displays it for the user while maintaining the context of the search by for example using the same or substantially the same page as disclosed herein. As described with respect to FIG. 1, the user can then either choose a pair of representative boarding passes (110, 115 in FIG. 1) and purchase the corresponding fare, or the user can scroll through the pairs of representative boarding passes presented by the unified user interface 100, select one pair that will be the basis of modification, and then change the values of any or all of the fields shown on the representative boarding passes. The values of any or all of the fields shown can be changed one at a time, with more than one search parameter value changing at once, or such that all of the search parameters change simultaneously. The search parameters of this modified search may originate from a unified results page, such as page 105, and these modified search parameters are sent to the network 2175 and back to the travel search engine 2185. The modified search performed on the travel search engine 2185 generates results that are passed to the unified page generator 2190, and in turn, the unified results page, such as page 105, is sent to the requesting computing device 2170 for display on the appropriate user interface 100.

For example, as described above, a user can search for airfare for a round trip from Austin to Madrid on a computing device 2170 through a user interface 100. After the initial search, the user can try to get a lower price by changing the number of stops or by changing Madrid to Barcelona or Austin to Houston, Dallas, or New York. The revised search results can be generated by the travel search engine 2185, then, the results can be sent to the unified page generator 2190 to display the revised results on the appropriate user interface 100 on the corresponding computing device 2170. The unified page, such as page 105, may maintain the context of the user's search for air fares by appearing the same or substantially the same (as least with respect to some of the content, layout, and the like) to the user, with the values for parameters such as the price, duration, departure and arrival times, and the like updated. The user can interact with the user interface 100 to further modify the search or to complete the purchase of airfare represented by the selected boarding passes.

The computing device 2170 described herein can be a desk top computer, a lap top computer, a tablet device, a hand held mobile computing device, a mobile phone, a personal digital assistant, a dedicated device for viewing the unified user interface or the like. The user interface 100 can be generated and controlled on the computing device 2170 by a web browser, by a dedicated application located on the computing device 2170, by an application located on a remote server contacted via the network 2175, or any suitable combination thereof.

Though the unified page generator 2190 is shown as a part of the travel search engine 2185, the unified page generator 2190 can be located on any of the computing devices 2170 connected to the network 2175. Alternatively, the unified page generator 2190 can be located on a separate computing device connected to the network 2170, one that is not utilized by any users nor one where the travel search engine 2185 is located.

FIG. 22 is a flow chart illustrating an exemplary method for searching for travel arrangements and tickets. The method includes receiving modifications from an initial search results page to a travel search request 2205. As mentioned elsewhere herein, initial search results are generated based upon initial settings for search parameters that can include a basic set of requirements or a combination of basic requirements and user preferences. A user can review the initial search results and alter one or more of the search parameters either individually, in combination or in totality using the user interface (2000 in FIG. 20) to create a modified search request that is eventually received by a travel search engine (2185 in FIG. 21).

Once the search engine receives the modified search request, a search is initiated 2210. The search is based upon a modified travel search request. The request can be used to search data made available from any combination of web sites, airlines, travel agencies, and the like.

After the search based upon a modified travel search request is initiated on the search engine, the method includes receiving modified travel search results 2215. The modified travel search results can be received as data that is not yet formatted for viewing by the user. The modified travel search results are then used to generate a unified page 2220. As mentioned above, the unified page generator (2190 in FIG. 21) can be located with the travel search engine, on any user-computing device, or on any computing device connected to the network that is not where the travel search engine is located.

The user interface may then display the unified page with the search results from the modified search 2235. The unified page is one from which the search results (2005 in FIG. 20) can be seen and any of the search parameters (2020, 2022, 2050, 2025a, 2025b, 2040, 2045 in FIG. 20) can be changed. It may be the case that the user will not find a satisfactory combination of flights, and the user may further modify the search request. In these types of instances, the method resumes with the travel search engine receiving a subsequent modified search request, as in 2205. The unified page maintains the context of prior searches by using the same or substantially the same page to present search results including revised or updated search results.

As mentioned above, the unified search results page provides the ability for the user to see the effect changing one or more parameters has on the other variables in his or her travel while maintaining the context of the search. The page, from which the user sees the result of his or her previous search, can appear to be the same one, from which he or she can make changes to the search, such as when a user decides to change the departure time in the search page (2030 in FIG. 20) and changes in the duration (2045 in FIG. 20) and price (2050 in FIG. 20) are returned in representative boarding passes (2010, 2015 in FIG. 20) that appear to be the same with respect to position on the computing device's user interface.

Once the user has decided to select airfare corresponding to search results displayed via the user interface as a pair of representative boarding passes (2010, 2015 in FIG. 20), the method can further include presenting the user the option to save the search parameters to perform the search again at a later date, to perhaps attain a lower price. When the user decides to purchase the fare without delay, the method can also include allowing the user to purchase the selected fare and record the parameters used, including preferences with respect to certain search parameters, in a database. The preferences can be associated with the user's name or other identifying information.

It should be appreciated that while most of the description of the methods and systems described herein pertain to searching for travel tickets using an interface displayed on a website, these methods and systems can be used to search for other travel and non-travel products or services. Other products or services include perishable goods or services that have prices that may change over time.

One or more aspects or features of the subject matter described herein can be realized in digital electronic circuitry, integrated circuitry, specially designed application specific integrated circuits (ASICs), field programmable gate arrays (FPGAs) computer hardware, firmware, software, or combinations thereof. These various aspects or features can include implementation in one or more computer programs that are executable or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural or object-oriented programming language, or in assembly/machine language. As used herein, the term "machine-readable medium" refers to any computer program product, apparatus or device, such as for example magnetic discs, optical disks, memory, and Programmable Logic Devices (PLDs), used to provide machine instructions or data to a programmable processor, including a machine-readable medium that receives machine instructions as a machine-readable signal. The term "machine-readable signal" refers to any signal used to provide machine instructions or data to a programmable processor. The machine-readable medium can store such machine instructions, such as for example as would a solid-state memory or a magnetic hard drive or any equivalent storage medium or memory device.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, or articles depending on the desired configuration. The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features or variations can be provided in addition to those set forth herein. For example, the implementations described herein can be directed to various combinations and sub combinations of the disclosed features or combinations and sub combinations of several further features disclosed herein. In addition, the logic flows depicted in the accompanying figures or described herein do not necessarily require the particular order shown, or sequential order, to achieve desirable results. Other implementations may be within the scope of the following claims.

Methods for searching for inventory, particularly time-sensitive inventory such as travel, include presenting initial search results to a user; allowing the user to change the search parameters (for example, either individually, in combination, or in totality); and providing updated/revised results in the same search context. Related systems, methods, and articles of manufacture are also provided.

Figure 23:
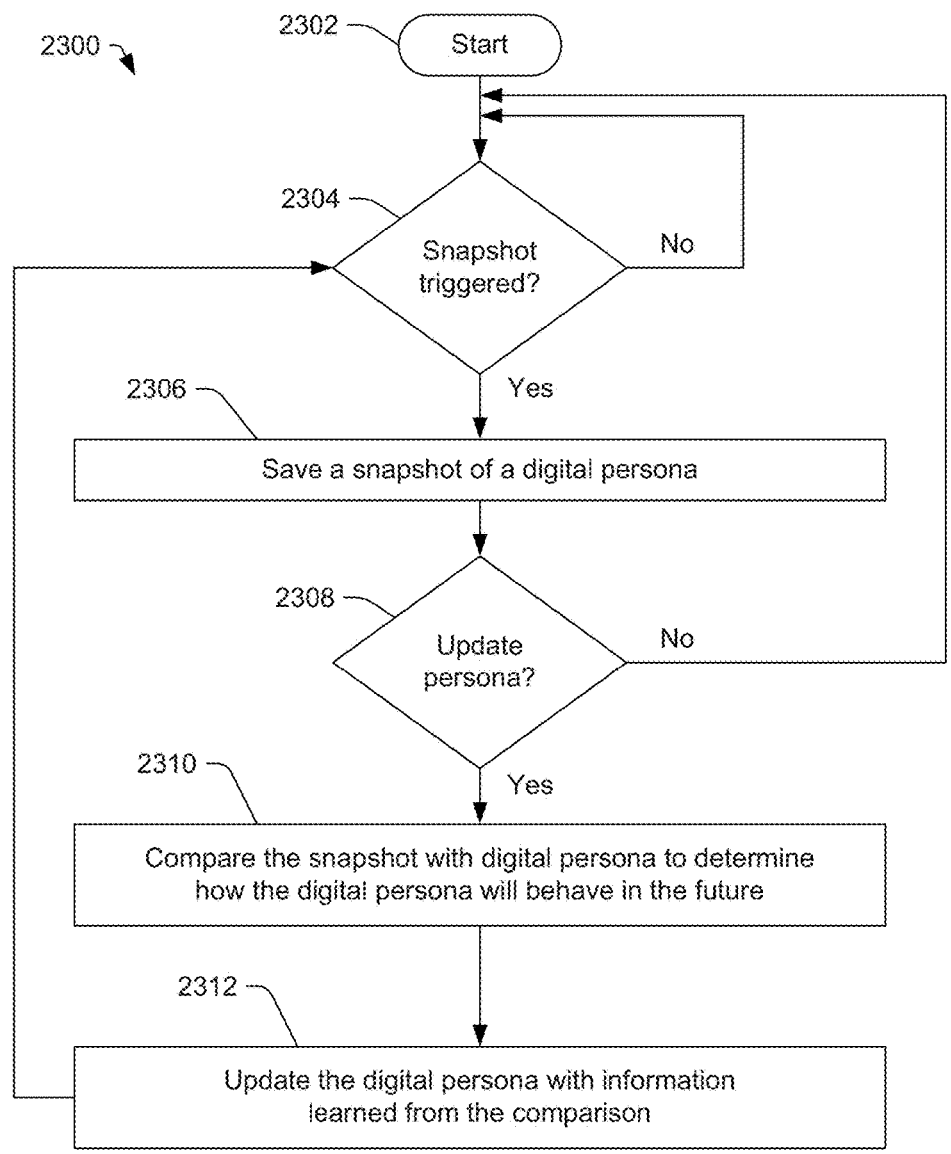
FIG. 23 is a flow diagram illustrating an example implementation of a process for implementing a digital snapshot of a persona in a computer system, in accordance with certain embodiments.

Referring to FIG. 23, a flowchart illustrating a process for implementing a digital snapshot of a persona in a computer system is shown and generally designated 2300. The process 2300 can record the preferences, decisions, and decision-making processes of a human being and can use that information to anticipate, predict, and suggest that person's future decisions.

Generally, a system (such as the system 300 of FIG. 3 or the system 400 of FIG. 4) can retain a static "snapshot" of a unique digital persona. In doing so, the system can track how past experiences of the digital persona impact future decisions, measure the efficacy of preferences identified in past experiences; and record the accuracy of those preferences in predicting future decisions.

While the "snapshot" of the digital persona can be retained as a specific unique entity, the system allows for the continuous enhancement of the digital persona by recording and integrating all new preferences and decisions. As the digital persona records and integrates more decisions, the system can continue to learn from the habits and behaviors of its digital persona, create an ever-more-accurate digital persona, and enable ever-more-accurate forecasting of future human behavior based on past experiences. Although a digital persona is applicable across a multitude of human activities, the description below uses relevant examples such as air travel and wine purchasing to illustrate the functionality of such a system.

A digital persona has preferences allowing it to prioritize decisions upon request. For example, when a digital persona wants to travel and has several flights to choose from, it can start with preferences such as: "I prefer morning flights"; "I prefer to fly on weekdays"; "I prefer the least expensive flights"; or "I wish to get bonus points for the flight." Each preference can be given a strength attribute, which may be a number representative of a priority. For example, when "I prefer the least expensive flights" is stronger that "I prefer to fly on weekdays," the system prefers an inexpensive weekend flight over a more expensive weekday morning flight. The strength attribute can be both numerical and Boolean, allowing a strongest attribute (e.g. highest value) to "veto" all other optional solutions, if requested.

When a system proposes a solution based on digital persona preferences and available solutions, the person the digital persona represents may make a decision. The person may accept or reject the offered solution. The system may also allow a person to rate the proposed solution. The system can learn from each decision, so each time the digital persona travels, the system integrates preferences such as "the digital persona prefers the least expensive flight, but it may agree to a more expensive flight if it generates bonus points" beyond an established threshold.

The system can also track and take into account other types of information that are not explicitly introduced by the digital persona. For example, when looking for a flight, the person may be visiting travel websites, and may spend various amounts of time reflecting on certain flights. The system can track, integrate, and learn from this behavior and can use this information to anticipate desired flights in the future.

Referring back to FIG. 23, once the decision-making system is running, at 2302, the process 2300 may be triggered to take a snapshot of a digital persona, at 2304. The snapshot represents available information about the persona and about the universe of options available to the persona at a point in time. The trigger event to take a snapshot may be based on action of the digital persona, actions of a person using the digital persona, independent features such as time, other trigger functions such as an event in the universe in which the digital persona interacts, or any combination thereof. The snapshot may include a digital representation of the universe of options available to the persona at a point in time and may also include user interactions with those options. The system can save a snapshot of the decision-making process, at 2306, and can determine how the digital persona will behave in the future. In certain embodiments, the evolutionary AI engine 426 may process the snapshot and feedback data about the user and may refine the persona based on the snapshot and the feedback data to determine information about the user associated with the persona. That information may include likes, dislikes, desires, time, date, location, role, and other information that may contribute to the user's decision-making process, which information may be processed to determine a difference between the expected selection given the state of the persona at time ($T_1$) and the actual user feedback at time ($T_2$), which feedback may be explicit or implicit and which may or may not involve a selection. The feedback data may be used to determine the delta and the delta may be processed to determine a change to the persona. In certain embodiments, the system may "reward" those items in which the user showed interest and may "punish" those items that the user ignored, thereby adjusting their relative impacts. The total experiences with the product offered are compared to the characteristics of the persona. If the system finds normal deviation, the persona may be tweaked (slightly adjusted), whereas if the system finds a larger deviation, a new persona may be created that shares at least some initial characteristics of the original persona (or of some other baseline persona). The characteristics of the new person may then be tweaked.

For every instance of decision-making (e.g., every time the digital persona is looking for a flight), a snapshot may be saved. Thus, even if the preferences were not updated by the user, the system can improve solutions it offers to the user, as it continuously tracks, integrates, and learns about the user. As discussed herein, the system may process the deviation between the expected user selection and the actual user feedback, process that against the user's persona, and either adjust the persona or generate a new persona with the adjusted characteristic to fit the most recent feedback. Thus, over time, the user's persona may triangulate to fit the user's preferences through incremental adjustments or the user's digital presence may expand through the addition of new personas with preferences that different from one another.

In some instances, the system may determine if it wants to use a snapshot to update the digital persona, at 2308. Some situations may arise that the system may determine a persona should not be updated, such as if a snapshot introduces data from an untrusted source, includes data outside of an acceptable range, varies too greatly from expected data for that digital persona, would have an unfavorable or detrimental effect on the digital persona, or for other reasons. If the snapshot is determined to be used to update the digital persona, the snapshot may be compared with the digital persona to determine how the digital persona will behave in the future, at 2310. The digital persona may then be updated with the information learned from the comparison, at 2312.

A digital persona may be involved in several scenarios that on first glance have nothing to do with each other. For example, a user may use a digital persona to book a flight, purchase wine online, and respond to email offerings. The preference "always look for the cheapest offering" or "look for bonus points" may be applied to multiple scenarios across different sectors. On the other hand, the preference "I prefer to fly on weekdays" may have little relevance to purchasing wine, unless the system notices a correlation, such as the persona's increased wine purchasing on certain weekends throughout the year.

The information a snapshot includes can relate to decisions (acts or omissions), including: a process of each decision; a progression, jumping, or back-stepping of each decision; time spent on certain positions, a request for more information; and results of each such experience. For example, a snapshot can be the sum of a person's interaction with a website where on each step the person is introduced to a tree of paths where the person can choose a path, and within each branch of this tree a person may decide to spend more time, interact with the website, and perform actions of sort like buying a product or downloading a software application.

Another example would be a system that has a copy of a city's road map and the information being fed to the system is the driving decisions made by a certain person transiting from point to point. That person's interactions with the route, businesses along the way, and traffic congestion can be tracked and integrated creating a snapshot of a subset or all of the entire experience including: scenario, human experience, results, and metadata. The information may be kept with preferences identifying the person or not. When a same entity interacts with the system, the digital persona may be adjusted or a parallel connected persona snapshot may be created. Thus, in some instances a snapshot of a digital persona may be used to create an alternate digital persona instead of updating a source digital person, or may create the alternate digital persona in addition to updating the source persona.

A system may have a large number of digital personas. For example, an online flight booking website, or a wine store, can be capable of tracking the activities of its customers, can assign each customer (or group of customers, for example based on demographics, geography, user selected groupings, or other criteria) a digital persona and learn from the way they make decisions toward the goods they purchase. Thus, if a system used by a wine store learns that many of its customers respond similarly to a certain offering, it may expand the availability of such offerings, resulting in increased revenue, increased customer satisfaction, and similar commercial benefits.

Given that a human's persona may always be changing and evolving, and given that people act differently given their personal circumstance (e.g., a person will act differently in private vs. when they are in public, when they are solo vs. accompanied by family, etc.), the system may retain a snapshot for each person in each scenario. The system can also create connections between snapshots, such as snapshots that were created by the same person in situations having similar characteristics.

Over time, each person may have several snapshots gathered into groups where each group represents that person's persona in a certain scenario and a certain "mood." For example, Mr. Smith has 1,000 recorded experiences of which there are 20 different scenarios (e.g., Mr. Smith driving, Mr. Smith buying a product, Mr. Smith watching a movie). Mr. Smith's 1,000 scenarios could also be divided into groups where the system identifies similar decision-making traits across different scenarios (e.g., Mr. Smith is alone; Mr. Smith is with family, etc.).

The system may or may not know the name of groups of traits, but the system can distinguish between traits and identify a trait (e.g., the system may not know that a certain group of traits are specifically active when Mr. Smith is alone, but it is able to identify that a new experience is of the same group as a certain trait within the same group).

The system can also create connections across different entities having the same or similar traits. For example, if person A makes certain decisions in scenario B and another person made similar decisions in the same scenario, a virtual connector can connect these two digital personas.

The system can also collate information on an unknown person in an unknown scenario. While information is being fed to the system the system can identify that the person has a digital persona that is similar to a certain group of other digital personas, and it is experiencing a scenario of a certain group of scenarios. The system then can identify and forecast the result of that person's experience. Additionally, the system can suggest different paths that may lead the user to a result that was configured and deemed better to the user.

Further examples and embodiments of the systems and methods described herein can include an intelligent purchasing assistant that may be continuously active. A method may include receiving at least one customer specification from at least one potential customer of an expression of an interest in a purchase, the expression of the interest in the purchase comprising at least an interest lifetime; receiving a customer geo-location; receiving at least one supplier specification from at least one supplier of an inventory item; creating a continuous, real-time distribution channel comprising at least one match of the at least one customer specification and the at least one supplier specification of the inventory item, wherein the real-time distribution channel is sustained during the interest lifetime; and conducting an exchange wherein the inventory item is made available to the at least one potential customer. Related apparatus, systems, methods, and articles are also described.

In some example embodiments, there is provided a method. The method may include receiving, at one or more processors, at least one customer specification from at least one potential customer of an expression of an interest in a purchase, the expression of the interest in the purchase comprising at least an interest lifetime; receiving, at the one or more processors, a customer geo-location; receiving, at the one or more processors, at least one supplier specification from at least one supplier of an inventory item; creating, at the one or more processors, a real-time distribution channel comprising at least one match of the at least one customer specification and the at least one supplier specification of the inventory item, wherein the real-time distribution channel is sustained during the interest lifetime; conducting, at the one or more processors, an exchange wherein the inventory item is made available to the at least one potential customer; collecting, at the one or more processors, historical purchase information and activity data from the at least one potential customer; and analyzing, at the one or more processors, the historical purchase information and the activity data to form a customer purchase profile.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features or variations may be provided in addition to those set forth herein. For example, the implementations described herein may be directed to various combinations and sub combinations of the disclosed features or combinations and sub combinations of several further features disclosed below in the detailed description.

Current systems of assisting in the purchase of an item typically take the form of a search performed by the potential customer that yields a snapshot of inventory offerings at that moment in time. Once that search snapshot is displayed, the potential customer is made aware of what is available at that moment in time, but the search is not ongoing and is not intelligent in that it does not keep track of an itinerary, current location, or secondary related purchases, and the search does not keep track of subsequent offers for similar items from suppliers.

The first category of goods or services that the virtual purchasing assistant disclosed herein relates to is an inventory that is distressed, time sensitive, or perishable. This is inventory that either has a finite shelf life or inventory that is overstocked. The glut can be caused by misreading of supply and demand, by some unforeseen event or the like. Regardless of the cause, the supplier is motivated to move the inventory to maximize profit or minimize his loss. Examples of inventory would be airline tickets, cruise line tickets, hotel rooms, villa rentals, restaurant seating, movie, and theatre tickets, and similar temporal events, as well as perishable inventory, such as groceries and pharmaceuticals.

The second category of goods or services that the virtual purchasing assistant disclosed herein relates to is upsells. An upsell could be an upgrade or ancillary offering from the supplier of the inventory offered for purchase. In the examples given herein, an upsell for an airline could be an upgrade of a ticket to first class, an exit row, priority boarding or admission to a private lounge. In the case of a cruise line or hotel, example upsells would consist of spa treatments, meals at a hotel restaurant or providing larger or more luxurious accommodations.

The third category of goods or services that the virtual purchasing assistant disclosed herein relates to cross-sells. A cross-sell is an offer from a different supplier for goods and services related to or potentially relevant to the original inventory purchase. Examples of a cross-sell for an airline would be a car rental at the arrival destination, a hotel room, opera tickets, dinner accommodations and the like. Examples of cross-sells for cruise lines, hotels, and villa rentals would also include items like flights, car hire, tours, entertainment venue tickets and the like.

The virtual purchasing assistant may create a private, personalized, and continuous communication bridge between an interested customer and a motivated supplier. The privacy of the communications is necessary to prevent price degradation of the core goods and services. The creation of this private communication bridge allows the formation of a real time distribution channel that offers visibility to an interested potential customer of inventory that is personalized, immediately actionable and not readily available to the public at large, although public inventory may be made available by the system disclosure herein as well. In this way, interested and purchase ready customers are brought into immediate contact with motivated suppliers.

The virtual purchasing assistant may keep track of the user both from a location and time standpoint. These time and location tracking points are correlated to the user's activity and his surroundings. The virtual purchasing assistant may look for both at the needs and wants specified by the customer and constantly (or nearly constantly) looking at his immediate environment for items to purchase that he needs at that time or place whether those items are expressed as needs by the customer or anticipated as needs by the assistant. For instance, suppose a user is at the airport, but is running late for his flight, the virtual purchasing assistant would look at his ticket purchased, notating a boarding time, look at his location, moving slowly through check in, and suggest a purchase of priority screening or a purchase of a VIP escort by airline staff to the boarding gate. If the user is at the airport well in advance of his flight, the system might suggest a low cost lounge pass. The virtual purchasing assistant would also be constantly looking at the number of available upgrade seats on the aircraft and would adjust pricing on or negotiate pricing of these seats or of exit row seats on the user's behalf as departure becomes imminent, using a dynamic pricing algorithm. Again, the suggestion of an upgrade or exit row may be a result of a specific request or may be a recommendation by the assistant as an item the assistant believes the customer needs to improve his trip, for example because the customer is at the back of the plane or in a middle seat. The virtual purchasing assistant will continuously learn the user's purchasing and activity habits by time, location or circumstance and will also learn from customer successes and failures, choices, actions and inactions.

Dynamic pricing on inventory available from the system moves pricing up and down to reflect supply and demand events. For example if twenty empty exit row seats are available a week before departure and those same seats are available one hour before boarding, the system will, subject to supplier consent, adjust the pricing down to reflect imminent departure and may adjust pricing down at other earlier intervals. This pricing may occur by the virtual assistant acting on behalf of the supplier as it monitors purchasing activity against time to departure or may be the result of a suggestion by the virtual assistant on behalf of the customer to the supplier that he is ready to buy at a lower price given the time sensitivity.

The awareness of the virtual purchasing assistant of the users' location, time, activity and itinerary also allows it to look for related purchases for the user, based on his needs or prior purchasing history. If, for example, the user was traveling to London, the system could review the historical purchase data and based on this look for discounted opera tickets, or a table at the user's favorite restaurant. On an initial trip, the virtual assistant offers what the consumer would need to make the trip complete, better or more comfortable, either based on what the consumer requests at any point during the trip or based on what the virtual assistant believes a consumer would like; over time, the virtual assistant learns the consumer's tastes. An example is a message sent to the User on arrival to Heathrow Airport stating: "Welcome to London, I notice you haven't booked a place to stay or a car, would you like to book the Marriott Park Lane at 50% off or a car from Hertz for £25 a day? If you have some spare time, you may want to take a trip on the world famous London Eye, I have tickets available at 30% off." The intelligence of the system allows a consumer to rely on it, as he would an assistant, such as a travel companion, a travel agent, and the like, tasked with looking after and planning his or her trip and travel related details, including items the user would have forgotten or not thought about at all. The best assistant is always ten steps ahead of his boss, knowing every little detail of his boss' interests, likes, and dislikes and even eccentricities. The assistant caters to his boss' every need, no matter how unreasonable, provides value to his boss by saving him money, caters to his boss changing his mind even at short notice, realizes how short of time his boss is and that he may forget items. The virtual assistant described herein has all these features. The system may continuously (e.g., in an ongoing manner) search for items in the best interest of the user, on a continuous basis, whether the consumer is awake or asleep, either to find an item needed, an item that while not needed may improve the user's experience, or a cheaper or better alternative until told to stop. As used herein, continuously refers to repeatedly searching in a continuous or near continuous manner. The system disclosed herein may include a continuous review of needed or wanted items intelligently pushed out to the user as they become available or as an improved or alternative item becomes available in real time.

The virtual purchasing assistant disclosed herein may also continuously search for items that are similar to items that cannot be located for purchase if allowed to by the user. This three-dimensional, time, location and want overlap that the system brings to bear is not seen in other systems. The system constraints are set by the user as options, including the degree to which he is open to the assistant's ideas, suggestions or product offerings. These constraints can be adjusted at any time and any adjustment takes effect immediately in real time. If an exact want is not available, the system will continue looking and offer similar items in the interim, based initially on what the assistant considers similar and subsequently on what the user considers similar, as the assistant learns customer preferences.

The virtual purchasing assistant may include two interaction gateways, which are referred to as portals, a user portal and a supplier portal. Each supplier may have their own supplier portal. The two portals can communicate with one another by way of the private communication bridge. Both portals are intelligent and the private communication bridge that connects them is intelligent, although some suppliers may not have a supplier portal and instead rely on aspects of system 2400 depicted at FIG. 24 to handle inventory.

The user portal of the virtual purchasing assistant will collect a user specification in which a set of expressed interests for purchase and a series of options are chosen. This expression of interest and options will form the basis of an ongoing, continuous search through available inventory on the supplier portals to locate matches. However, this ongoing search is only a part of the user portal input. In addition, a historical database of items including but not limited to detailed user features and persona, activity, prior expressions of interest, options, previous purchases and previous offer declines is kept. At least the location and time of each of these historical database items is logged and analyzed. The current itinerary and detailed activity of the user is kept to form an ever changing matrix for decision-making that a user suggestion engine will use in its analysis of the historical database. This user portal will also utilize the historical database to act as an offer filter, so that in addition to any items he specifically requests, the user is only provided with the most relevant, proximity based, timely offers that he is most likely to want, or the offers that are sent may be prioritized. The user will not be inundated with every offer within his immediate environment, only those he has expressed interest in currently, or has purchased in the past, or, if specified by the customer, which the assistant believes he will want based on actual, recent, relevant activity. The user portal provides a vast trove of constantly updated data and immediate, filtered feedback of offers it is searching on an ongoing basis that is customized to the user.

The supplier portal of the virtual purchasing assistant will collect a supplier specification which may include inventory, price, timing and location of inventory, inventory categories, classes or restrictions and segmentation parameters, meaning fields users must satisfy in order to see that specific type of inventory, such as living in a specific zip code or being of a specified frequent flier status. On the supplier portal side, historical information is collected with respect to each customer, what they want to purchase, where and at what price they are most likely to make a purchase or refuse an offer. The supplier portal is filtered, so that it is provided with only the information most needed to close a deal, confidentially and quickly. Upsell offers, cross sell offers, or any other offers may be made to the user from the supplier portal based on specific user requests or at least on the tracked location of the user, the time, the previous sales history, and activity of the user and recommendations by the assistant. Dynamic pricing driven by supply and demand is suggested to the supplier portal, and if agreed to, incorporated in upsell items pushed to the user as an offer.

The private communication bridge of the virtual purchasing assistant provides a bridge not only to the supplier of the original inventory purchase, but to other suppliers of related goods and services either generally or in the proximity of the user, based on his itinerary, activity and previous purchase history. Privacy of both the user's data and the supplier's data and consents is essential during communications for the real time exchange in order to protect the interests of both parties.

The private communication bridge user portal may work on any device with a processor, such as a tablet PC, desktop PC, cell phone, laptop and the like, whether GPS enabled or receiving locator signals based on nearest communications link.

The private communication bridge may also interface with supplier system interfaces, third party inventory management systems and the like, although the supplier may rely on system 2400 to send offers or inventory without the use of the supplier system The virtual purchasing assistant though it has been described as working with one user, can function for a group and keep the group together in flights, shuttles, hotels, or as each of the group specifies.

Inventory issues responded to may include, but are not limited to fixed inventory that is not selling close to the point it perishes, inventory that becomes un-saleable at a point in time, such as an upgrade once boarding has started, or misread demand, for example televisions ordered to meet an anticipated Christmas rush that don't sell well, changing customer behavior such as a last minute cancellation, unexpected negative customer reaction such as some tablet computers, obsolescence, or unexpected geopolitical or economic events such as the Japanese nuclear disaster, or any other type of inventory.

Upsell/cross-sell inventory issues responded to may include the suppliers' inability to create dynamic pricing, inability to make discreet, targeted, or intelligent offers to potential customers very late in the day such as immediately prior to departure, post arrival at a hotel or post arrival at a destination. Also responded to is the inability to offer timely, location specific, targeted upsells either generally or incorporating dynamic pricing. Dynamic pricing takes into account actual supply and demand and the future worth of that good or service. Some upsells have a future worth of zero, such as an unsold first class upgrade, or exit row seat once the boarding has concluded. The ability to offer timely, location-specific, targeted upsells both generally and with dynamic pricing is needed as these upsell sales result in significant additional revenue for suppliers. Upsells/cross-sells will be offered to the user based on his request, and those that the system recommends if that option is chosen, and the upsells/cross-sells may be offered continuously to a user, in real time, and intelligently. Real time as used herein refers to the offers, recommendations, and the like being sent substantially immediately or when available. And, intelligent as used herein refers to the offers/recommendations being based on pattern recognition or intelligent processing techniques that weight various factors in connection with the offers/recommendations.

A secondary issue also may arise when a potential customer who is offered a limited quantity, time sensitive, fixed price product or a heavily discounted product for bid is subsequently beaten to the purchase or outbid. In current systems, this potential customer and those in a similar position are left unsatisfied and their potential transactions are left unfilled. A way to be able to offer these non-winning users a follow-on second chance at the same product or some closely aligned product they would be interested in is needed and is offered by the assistant that pushes data back on their unsuccessful attempts, including pricing sensitivities, to the supplier.

Some of the issues that immediately present themselves are, discrepancies between forecast supply and actual demand, sudden changes in potential customer behavior, unforeseen events, difficulties in efficiently and discreetly communicating with potential customers about available items late in the day, knowing what a consumer wants to buy in real time and at different time periods and what their pricing, time and other sensitivities are, inability to communicate and efficiently form a distribution channel for targeted upsells, cross sells, and the like, whether priced conventionally or dynamically very late in the day and an inability to meet the needs of potential customers who may form a viable second tier market.

The subject matter disclosed herein may solve one or more of the described problems. The described method, system and computer readable medium allows suppliers to move distressed, time sensitive or perishable inventory at a point in time when the possibility of a sale is reduced. The inventory may be offered in real-time, confidentially and on a highly targeted and intelligent basis whereby potential customers are shown exactly what product they are looking for, when they are looking for it and meeting whatever precise preferences they specify in the user portal. The supplier may fully control what inventory is made available, at what price and may segment users to whom the product is offered the item and when. The user no longer has to search for the product he wants, is offered continuous results, and now has access to non-public and any other inventory at discounted prices and personalized to his exact specifications. The supplier may discreetly push out inventory that has a reduced possibility of sale to users looking for that exact product at that time at that place.

A virtual purchasing assistant, such as a computer processing system that can can help in that the virtual purchasing assistant, and in some examples may continuously update a real-time distribution channel between the user and the supplier in which both have real-time exchange information pushed to them to facilitate a matching of time sensitive inventory from a motivated seller to an interested buyer.

The subject matter disclosed herein is based on the insight that the price of an item that may be commanded from certain classes of assets will go to zero at a point in time. Assets that fit these criteria would include airline tickets upon their time of departure. The subject matter disclosed herein can use without limitation email, texting, application, and voice technologies to notify potential customers of real time non-public or public offers on items they have specifically requested or that are recommended to them by the assistant at a reduced price, if they want to purchase that inventory immediately. The system can also continuously push data from the user to the supplier and from the supplier to the user to facilitate repeated upsell or cross-sell offers. In this way the system can be dual push, pushing a product offer of a match of an expressed interest to a potential customer and pushing user data and requests back to the supplier for possible additional sales.

The subject matter disclosed herein may provide a private communication bridge between each individual potential customer and each individual supplier. This bridge may allow the supplier to personalize and improve the user's purchase for both those products in which the customer has expressed an interest and those that historical data or the intelligence of the assistant show would probably interest the customer.

Figure 24:
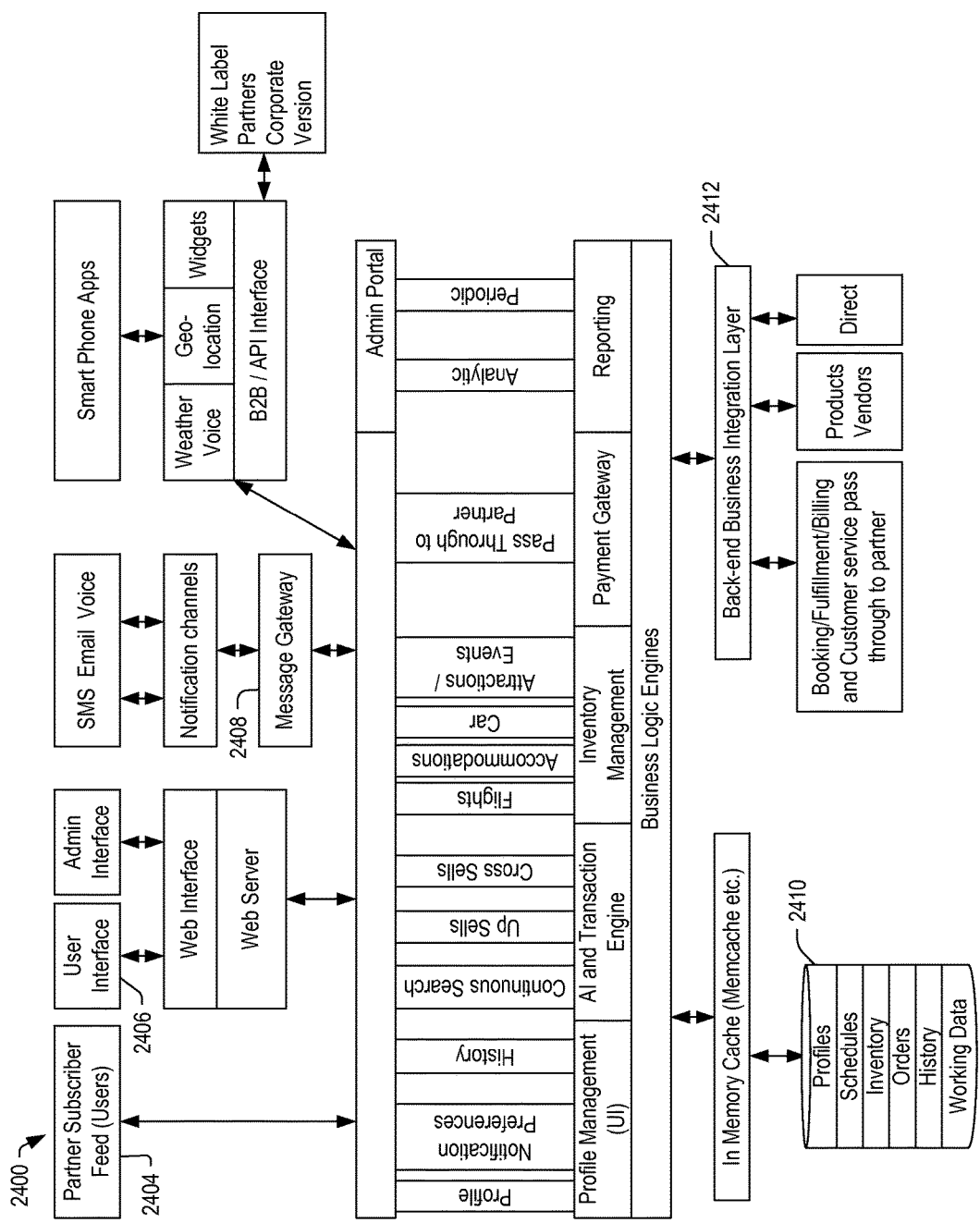
FIG. 24 depicts an example implementation of a persona-based decision system, implemented to allow providing dual push real-time exchange of time sensitive inventory, in accordance with certain embodiments.

FIG. 24 shows an example system overview 2400. A private communications bridge 2402 that comprises one or more processors is communicably coupled to a supplier portal 2404, a user portal 2406, a messaging gateway 2408 that is communicably coupled with a mobile device 2414, the World Wide Web 2408 or the like. On the back end the private communications bridge 2402 is coupled to a data server 2410 and a backend business integration portal 2412.

The real-time exchange portal may include four components, an enterprise database, a set of business logic engines, a reporting engine and a suggestion engine. The present system maintains a customer support function and self-serve website interface for subscribers, manages real-time exchanges of available inventory, and selects which subscriber obtains specific items at what price, manages subscriber interactions and originates the orders to be placed upon real-time exchange completion.

The enterprise database maintains subscriber account information, including contact information, travel preferences, frequent travel program information and payment details, trips and electronic ticket information, product purchasing history, available seat inventory to be used within real-time exchanges, and limitations on that inventory, such as a floor price, electronic commerce information, such as orders that have or will be placed with fulfillment partners, invoices for corporate clients and receipts from invoices, records of customer support calls and transient working data, such as that which would be necessary to support an active real-time exchange while still in process. The real-time exchange will finalize in a collection of orders, and subsequently, a collection of trips/electronic tickets or purchases.

The business logic engines decompose all of the application modules into building blocks that may be extended, but also may handle the same type of function in different ways for different markets, the logic engines are composed of persona management engines and transaction engines.

The persona management engine manages the subscribers contact information, trip schedule and travel or product preference information, creates views and allows updates and notices for bids or purchases in active real-time exchanges, and maintains a queue of active electronic tickets and purchases and a history of previous trips and purchasing activity.

The transaction engine may handle at least two types of real-time exchanges, the first being first n-bidders above a particular price threshold and the second being top n-bidders out of a set of m-bidders who submitted before a deadline. There will be other attractive real-time exchange types that may emerge in the future, and the subject matter disclosed herein will support other real-time exchange types as well including fixed price sales The inventory management engines are envisioned to interactively (or in bulk fashion) upload or search inventory (seats, rooms or other products), availability (schedules, open dates), deadlines by which the inventory must be placed before it reverts, limits (price floors, restrictions) and segmentation parameters, such as specifications required from a user to see the inventory, for example being in a certain zip code or of a certain frequent flier status. This is the base data that is matched against consumer preferences when creating a participant list for a real-time exchange. This is then updated continuously based on real-time exchange results.

The reporting engine will include records of all transactions, both to the suppliers and to its partners, as appropriate. An aggregate set of behavioral data will allow the suggestion engine to make more and more intelligent offers regarding the types of trips, inventory, products and upsells or cross-sells that someone may consider, whether these items are or are not mentioned directly in the customer and supplier specifications. The company believes that an advanced suggestion engine will be part of the analytic function, and will tie into the geo-location and time integration, creating even more value in the future. This engine also, incidentally, handles customer service related reporting and issue tracking.

The suggestion engine of the subject matter disclosed herein is intelligent. It learns from the choices, decisions and actions of the potential customer. This may range from advising the potential customer on other destinations similar to those he has chosen that he may wish to see offers on, monitoring his travel experience and offering things that may make it better or more efficient such as offering an extra legroom seat or exit row where the potential customer is stuck in a middle seat/offering priority security access when the potential customer is running late, to offering advice, such as suggesting an increase in bid to $X if a better chance of winning or try travelling on a Tuesday instead when historically there is more availability or better prices. It also learns from supplier behavior and decisions. For example, if a supplier provides ten seats at $100 and the seats sell in 5 minutes, the system may suggest that the supplier either increase the price or provide staggered pricing. Similarly if products don't sell, the system may advise to either lower the price, add fields of people to show the offer to, or to sell at a different time of day (for example there may be very low take-up in the evening but high take-up during the morning).

Additionally the present embodiment may include a web interface for interaction with the subscriber and a messaging gateway for sending instantaneous SMS, email, app or voice notifications, and allowing for bidding, purchasing and all elements of a transaction from a mobile phone using any of these notification mechanisms or others.

Figure 25:
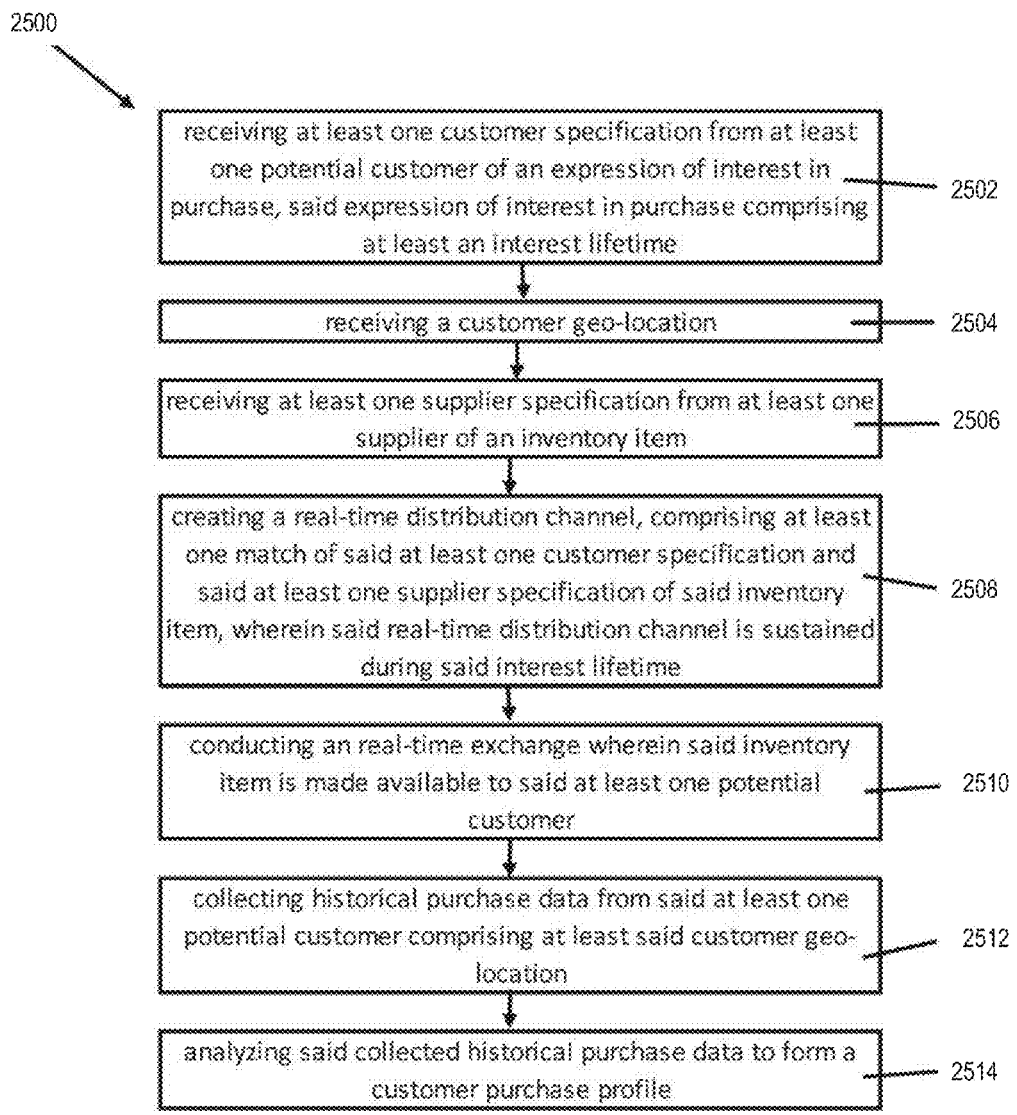
FIG. 25 depicts an example implementation of a method of a persona based decision system, implemented to allow providing dual push real-time exchange of time sensitive inventory, in accordance with certain embodiments.

FIG. 25 shows an example method diagram 2500. A method of providing a virtual purchasing assistant comprises the steps of, receiving 2502 a customer specification from a potential customer of an expression of interest in purchase, the expression of interest in purchase includes an interest lifetime. The interest lifetime is chosen by the user and can either be time based, a period of three weeks, a particular date, or always, for example, or event based, such as stopping the search for airfares the day the plane is due to depart. The method includes receiving 2504 a customer geo-location, receiving 2506 a supplier specification from a supplier of an inventory item, creating 2508 a real-time distribution channel that comprises a match of the customer specification and the supplier specification of the inventory item, where the real-time distribution channel is sustained during the interest lifetime. The method further includes conducting 2510 a real-time exchange where the inventory item is made available to the potential customer, collecting 2512 historical purchase and activity data from the potential customer, collecting customer geo-location and timeframe of purchase and analyzing 2514 the collected historical purchase and activity data to form a customer purchase persona. In this manner, it can be determined if a particular customer plans or is spontaneous for particular activities, or enjoys particular activities in specific locations (such as going to the theatre in London, but not in New York).

The method may further include analyzing the collected historical purchase and activity data and correlating a purchase type or a decline type to the customer geo-location and include notifying the potential customer of an offer acceptance in the form of an electronic mail message, a simple message service text message, an app message or a voice notification. The collected historical purchase and activity data may include a time of purchase and the customer purchase and activity data may be sent to the supplier with the potential customer's permission. The customer specification may include an itinerary; the supplier specification may include an inventory item location where the real-time distribution channel may include only inventory items located proximate to the potential customer taking into account his geo-location.

Figure 26:
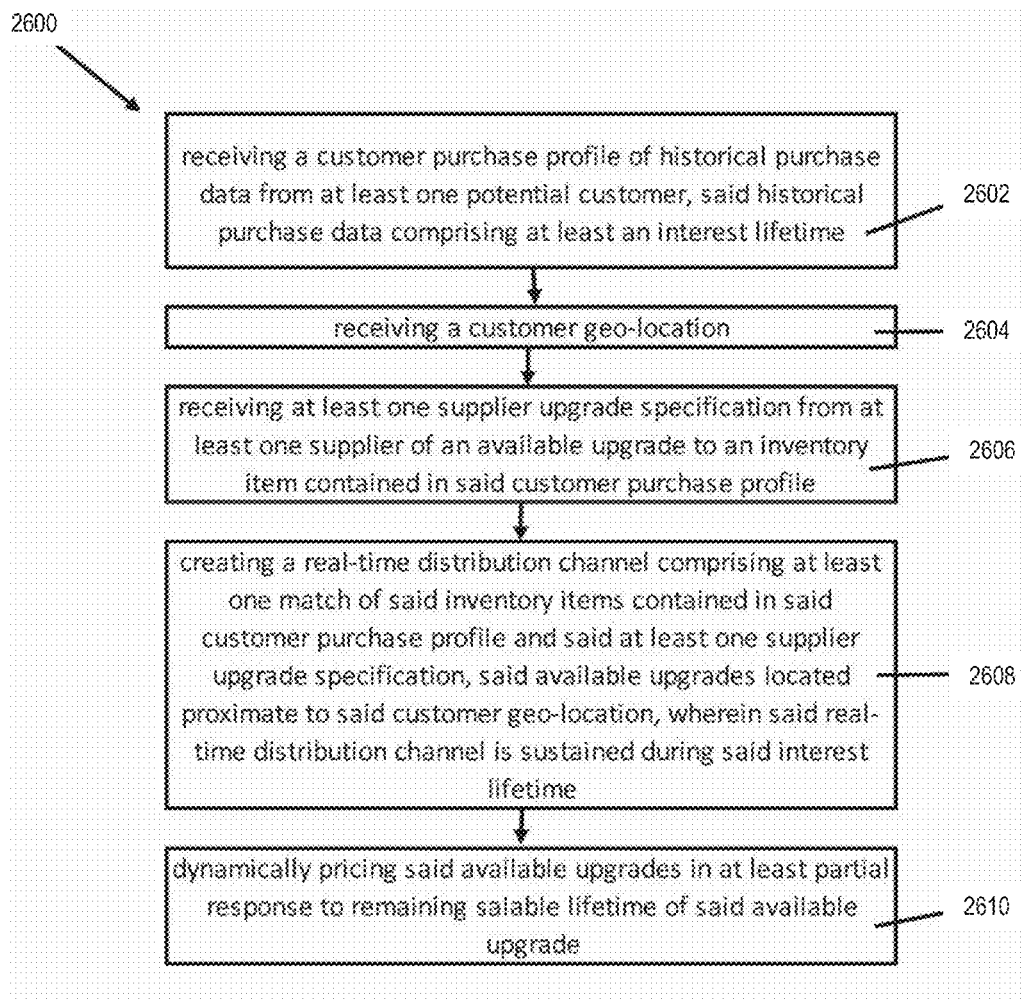
FIG. 26 depicts an example implementation of a method of a persona based decision system, implemented to allow providing dual push real-time exchange of time sensitive inventory, in accordance with certain embodiments.

FIG. 26 shows an example method diagram 2600. A method of providing a virtual purchasing assistant comprises the steps of receiving 2602 a customer purchase persona of historical purchase or activity data from a potential customer, which includes an interest lifetime. The method further includes receiving 2604 a customer geo-location, receiving 2606 a supplier upsell specification from a supplier of an available upsell to an inventory item contained in the customer purchase persona. The method includes creating 2608 a real-time distribution channel that comprises a match of the inventory items contained in the customer purchase persona and the supplier upsell specification, available upsells located proximate to the customer geo-location, where the real-time distribution channel is sustained during the interest lifetime or more generally and dynamically pricing 2610 available upsells in partial response to remaining salable lifetime of the available upsell.

The method may further include receiving a customer specification that comprises an upsell/cross-sell preference, receiving a time period and analyzing the itinerary associated with the customer purchase persona and historical purchase and activity data to infer possible additional upsell/cross-sell purchases the customer would be interested in. The customer specification may include or be connected to an itinerary of the potential customer. The method may also include receiving a time period of the customer and geo-location and suggesting an available upsell/cross-sell based upon any or all of the time period, the customer geo-location and the itinerary.

An example of an airline upsell is the selling of an upgraded seat to an exit row or business class seat or priority boarding. The virtual purchasing assistant can track where the user is and at what time with respect to the itinerary framework based upon geo-location and other programming. If, for example, there is little time to get to the gate, the virtual purchasing assistant can suggest purchasing priority security access or a VIP escort to the gate. This is only one example of suggestions the virtual purchasing assistant can make. The method can also suggest upgrades to seating on the aircraft subject to availability and price. Where a supplier allows, the sales price would be dynamic and fluctuates with supply and demand.

An example of a cruise line upsell would be the suggestion to upgrade a cabin, based on availability and price. Hotels could offer a spa treatment prior to check in or after check in based on the real time availability of open slots, for example offering a customer in his room the ability to get 20% off his spa treatment if he can take advantage of an empty slot in the next hour.

Figure 27:
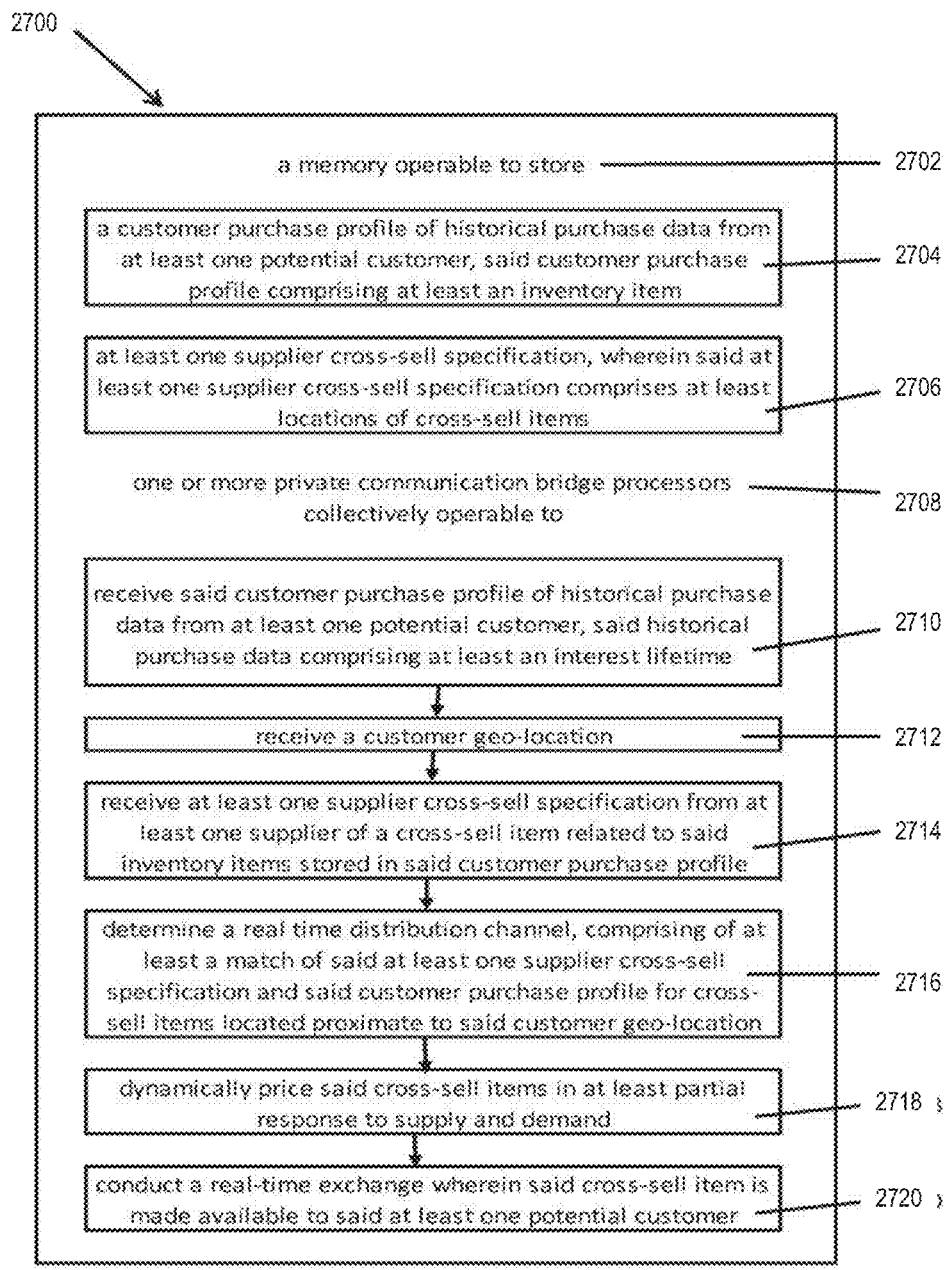
FIG. 27 depicts an example implementation of a persona based decision system, implemented to allow providing dual push real-time exchange of time sensitive inventory, in accordance with certain embodiments.

FIG. 27 shows an example system diagram 2700. A system for providing a virtual purchasing assistant comprises a memory 2702 that stores a customer purchase persona 2704 including historical purchase and activity data from a potential customer, the customer purchase persona that comprises an inventory item, and a supplier cross-sell specification 2706, where the supplier cross-sell specification comprises locations of cross-sell items. The system further includes one or more private communication bridge processors 2708 coupled to the memory which receive 2710 the customer purchase persona and historical purchase and activity data from the potential customer including an interest lifetime, receive 2712 a customer geo-location and receive 2714 a supplier cross-sell specification from a supplier of a cross-sell item related to the inventory items stored in the customer purchase persona. The private communication bridge processors determine 2716 a real time distribution channel that matches the supplier cross-sell specification and the customer purchase persona for cross-sell items located proximate to the customer geo-location, dynamically price 2718 the cross-sell items in at least partial response to supply and demand (where allowed by the supplier) and conducts 2720 a real-time exchange where the cross-sell or upsell item is made available to the potential customer.

The private communication bridge processors may further include instructions for receiving a customer specification that comprises an upsell/cross-sell preference and analyzing the customer purchase persona of historical purchase and activity data to infer possible additional upsell/cross-sell purchases. The customer purchase persona of historical purchase and activity data may include or be connected to an itinerary of the potential customer. The private communication bridge processors may further include instructions for receiving a time period of the customer and his geo-location and suggesting a cross-sell based on any of the time period, the customer geo-location and the itinerary.

An example of an airline cross-sell is the selling of a hotel room or a car. The system allows these sales at any point in time before travel or at the destination. In the case of cruise lines, a cross-sell would be the booking of a flight or a tour at a port of call. In the case of a hotel or villa a cross-sell would be booking flights, car hire, entertainment, a limo or a meal.

Figure 28:
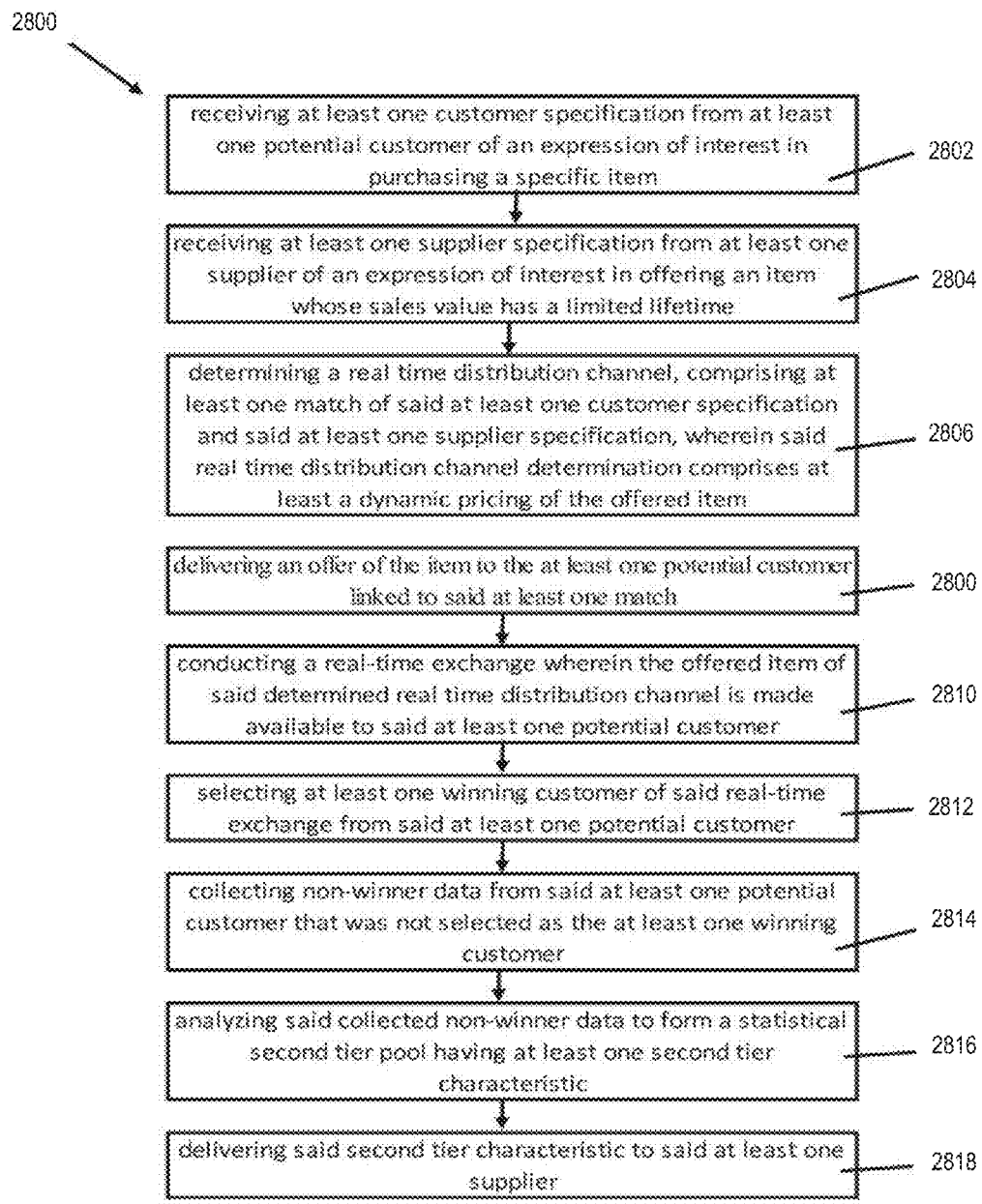
FIG. 28 depicts an example implementation of a persona based decision system, implemented to allow providing dual push real-time exchange of time sensitive inventory, in accordance with certain embodiments.

FIG. 28 shows an example computer readable medium diagram 2800. A computer readable medium comprises computer instructions for controlling one or more real-time exchange portal processors that provide a dual push real-time exchange of time sensitive inventory executing the steps of receiving 2802 a customer specification from a potential customer of an expression of interest in purchase and receiving 2804 a supplier specification from a supplier of offering an inventory item whose sales value has a limited lifetime. The steps further include determining 2806 a real time distribution channel that matches the customer specification to the supplier specification. The steps include delivering 2808 an offer of the inventory item to potential customers linked to the match, conducting 2810 a real-time exchange where the inventory item of the determined real time distribution channel is made available to the potential customers and selecting 2812 a winning customer/s of the real-time exchange from all the potential customers. Additional steps include collecting 2814 non-winner data from the potential customers that were not selected as the winning customer, analyzing 2816 the collected non-winner data to form a statistical second tier pool having a second tier characteristic, and delivering 2818 the second tier characteristic to the supplier.

The execution of steps may further include analyzing the customer specification against the collected non-winner data, suggesting a second tier real-time exchange based upon the non-winner data analysis, collecting historical bid/purchase data of the potential customer, analyzing the customer specification against the collected historical bid/purchase data, and suggesting an upsell or cross-sell based on the analysis. The execution of steps may also include delivering a winning notification message to the winning customer, and delivering a non-winner notification message to the potential customer that was not selected as the winning customer.

Methods and apparatus, including computer program products, are provided for continuous dual push sales. The method may include, inter alia, determining a continuous real time distribution channel, comprising at least one match of said at least one customer specification and said at least one supplier specification, wherein said real time distribution channel determination comprises at least a dynamic pricing of the set of the desired item, upsells and cross-sells; conducting a sale wherein the offered item of said determined real time distribution channel is made available to said at least one potential customer; collecting non-winner data from said at least one potential customer that was not selected as the at least one winning customer; and delivering the collected non-winner data to said at least one supplier. Related apparatus, systems, methods, and articles are also described.

In some example embodiments, there is provided a method. The method may include receiving at least one customer specification from at least one potential customer of an expression of interest in purchasing a specific item; receiving at least one supplier specification from at least one supplier of an expression of interest in offering an item whose sales value has a limited lifetime; determining a real time distribution channel, comprising at least one match of said at least one customer specification and said at least one supplier specification, wherein said real time distribution channel determination comprises at least a dynamic pricing of the set of the desired item, upsells and cross-sells; conducting a sale wherein the offered item of said determined real time distribution channel is made available to said at least one potential customer; selecting at least one winning customer of said sales from said at least one potential customer; collecting non-winner data from said at least one potential customer that was not selected as the at least one winning customer; and delivering the collected non-winner data to said at least one supplier.

Articles are also described that comprise a tangibly embodied computer-readable medium embodying instructions that, when performed, cause one or more machines (for example, computers, etc.) to result in operations described herein. Similarly, apparatus are also described that can include a processor and a memory coupled to the processor. The memory can include one or more programs that cause the processor to perform one or more of the operations described herein.

It is to be understood that both the foregoing general description and the following detailed description are exemplary and explanatory only and are not restrictive. Further features or variations may be provided in addition to those set forth herein. For example, the implementations described herein may be directed to various combinations and sub combinations of the disclosed features or combinations and sub combinations of several further features disclosed below in the detailed description.

The problem of how to sell distressed, time sensitive and perishable inventory has been a problem suppliers have been looking to solve for many years but existing solutions are unsatisfactory. Suppliers in many sectors want to maximize sales of inventory while also maximizing the price per unit sold while at the same time minimizing core price degradation. The fundamental problem is that suppliers from different industries have differing reasons why inventory has become distressed, time sensitive or perishable, which would indicate that a variety of solutions are needed. Current systems are inadequate at achieving this objective for distressed, time sensitive or perishable inventory.

Movie theaters will ordinarily have a significant number of unsold seats on a Tuesday or Wednesday evening, not because they have misread demand but because potential customer behavior results in this outcome. The movie theatre is built for maximum capacity but this is not often achieved, even for peak periods. The problem of how to sell unsold seats is particularly felt as the core profit center for the movie theatre is the concessions purchased by customers when they visit. Concession sales at a movie theater would be considered an upsell, as it is a secondary high margin sale that is directly related to the primary purchase, but that will not occur without the sale of the primary purchase.

Restaurants suffer from both the same problem as the movie theater and a secondary issue of potential customers cancelling reservations often very near in time to when the transaction was to take place. The problem of how to fill empty tables, particularly very late in the day is a significant one.

Grocery stores stock a very large number of a variety of items which have a finite shelf life. The grocery store does not sell every item prior to its shelf life expiry and as a result they have perishable inventory.

Pharmaceuticals are similar in that they have an expiry date, beyond which they are non-saleable. Similarly, pharmaceutical products that have been issued to a customer but not used are non-saleable as are products that are discontinued or have a production defect.

With respect to the travel and recreation industry, unsold inventory may arise due to an inability for a potential customer looking for late available inventory to find and book such inventory quickly and efficiently. This is a known problem for airline and cruise inventory, and also a particular problem for holiday villas and apartment space where there is no apparent real time distribution channel, no dynamic pricing, and no ability to simultaneously (or near simultaneously) negotiate pricing on near expiring inventory with a multiplicity of suppliers. Transactions may be hindered due in part to suppliers' inability to find potential customers looking for their product and potential customers' inability to locate the products that they are looking for and customers' inability to get real time data on availability or pricing of product.

Additionally, issues may arise due to unexpected, geopolitical, or economic events such as the Japanese nuclear disaster. In this instance, travel to Japan fell 25% and global travel fell nearly ten percent. The result was immediate, unanticipated unsold inventory in bulk that required discounting.

Further, sales of upsells may be limited due to suppliers' inability to create dynamic pricing for upsells that will have diminishing value and no current method to efficiently communicate with a potential customer very late in the day, for example at the point of departure or post arrival. Examples of upsells would include an airline that sells an exit row or upgrade to business class or priority boarding, an upgrade at a hotel or on a cruise ship or the previously mentioned concessions at a movie theater, and the like.

A closely aligned issue arises when a potential customer who is offered a limited quantity fixed price product or a heavily discounted product for bidding is subsequently beaten to the purchase or outbid. In current systems, this potential customer and those in a similar position are left unsatisfied except in the case of bidding where their bid is within a very close, fixed percentage of what the winning bid is. The result is nearly all their potential transactions are left unfilled.

Some of the issues that immediately present themselves are, discrepancies between forecast supply and actual demand, sudden changes in potential customer behavior, unforeseen events, difficulties in efficiently and discreetly communicating with potential customers about available items very late in the day, inability to communicate and efficiently form a distribution channel for upsells and cross-sells very late in the day and an inability to dynamically price the same and an inability to meet the needs of potential customers who may form a viable second tier market.

The subject matter disclosed herein may, in some implementations, solve each of the described problems. The described method, system and computer readable medium may allow suppliers to move distressed, time sensitive or perishable inventory at a point in time when the possibility of a sale is remote. The inventory is offered in real time, confidentially and on a highly targeted and intelligent basis whereby potential customers are shown exactly the product they are seeking, when they are looking for it and meeting whatever precise preferences they specify in the system and more specifically the customer portal. The supplier fully controls what product is made available, at what price and may segment who is offered the item and when. The potential customer no longer has to search for the product he wants and now has access to non-public inventory at discounted prices and personalized to his exact specifications. The supplier may discreetly push out product that has a very remote possibility of sale to potential customers looking for that exact product at that time.

A dual push sale of time sensitive inventory system is described that provides technological benefits, such as a distribution channel between the seller and the buyer in which both have detailed information pushed to them to facilitate a matching of time sensitive inventory from a motivated seller to an interested buyer.

The subject matter disclosed herein may provide a complete, private, personalized, intelligent, continuous, real time communications ecosystem between each individual potential customer and the supplier which offers the ability for the supplier to personalize and improve the potential customer's entire travel experience rather than focusing just on his purchase, focusing not only on those elements which the supplier thinks the potential customer wants but more importantly those elements the potential customer indicates that he wants, which may change at different points or locations during his journey.

In some embodiments, a method is provided for an intelligent, continuous, real time dual push sale of time sensitive inventory. Continuous as used herein refers to the dual push or the search for items for the push being repeated frequently in a continuous, such as for example, a near-continuous manner. Real time as used herein refers to the dual push being performed substantially immediately or when available for being pushed. And, intelligent as used herein refers to the dual push being based on pattern recognition or intelligent processing techniques that weight various factors in connection with the dual push. The method may include receiving a customer specification from a potential customer that has expressed an interest in purchasing an item, and receiving a supplier specification from a supplier that has expressed an interest in offering a matching item whose sales value has a limited lifetime. The method may also include determining a real-time distribution channel that matches the customer specification to the supplier specification and has the potential for dynamic pricing of the offered upsell and cross-sale items. The method may further include conducting a sale where the offered item of the determined real-time distribution channel is made available to matching potential customers, selecting a winning customer of the sale, collecting non-winner data from the potential customers that were not selected and delivers the collected non-winner data to the supplier.

Figure 29:
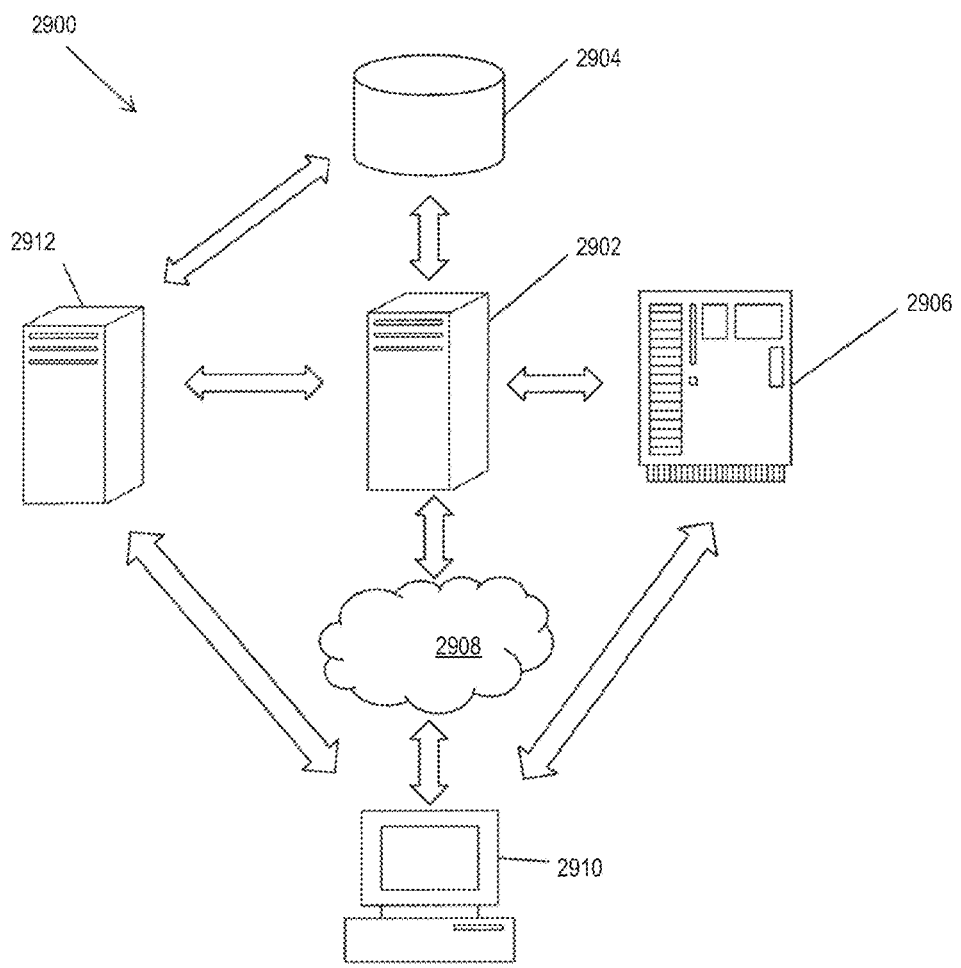
FIG. 29 depicts an example implementation of a persona based decision system, implemented to allow providing dual push sales of time sensitive inventory.

FIG. 29 shows an example system overview 2900. A sales portal 2902 that comprises one or more sales portal processors is communicably coupled to a vendor inventory database server 2904, an electronic mail and simple message service server 2906, the World Wide Web 2908 and an order fulfillment server 2922. The potential customer 2910 is communicably coupled to the web 2908, the order fulfillment server 2912 and the electronic mail and simple message service server 2906. Lastly, the order fulfillment server 2912 is communicably coupled to the sales portal 2902, the vendor inventory database server 2904, and the potential customer 2910. Although the previous example describes using message texts, such as short message service texts, other forms of communications may be used as well including cellular phone apps, e-mail, voice, or any other delivery mechanism.

The sales portal will include four components, an enterprise database, a set of business logic engines, a reporting engine and a suggestion engine. The present system maintains a customer support function and self-serve website interface for subscribers, manages auctions and sales of available inventory, and selects which subscriber obtains specific offered items at what price, manages subscriber interactions, and originates the orders to be placed upon completion of sales. Although the terms subscriber and customer are used herein, these may also comprise a user as well.

The enterprise database maintains subscriber account information, including contact information, travel preferences, frequent travel program information and payment details, trips and electronic ticket information, available seat or product inventory to be used within sales, and limitations on that inventory, such as a floor price, electronic commerce information, such as orders that have or will be placed with fulfillment partners, invoices for corporate clients and receipts from invoices, records of customer support calls and transient working data, such as that which would be necessary to support an active sale while still in process. The sale will finalize in a collection of orders, and subsequently, a collection of trips/electronic tickets/receipts/purchase confirmations.

The business logic engines decompose all of the application modules into building blocks that may be extended, but also may handle the same type of function in different ways for different markets. The logic engines are composed of persona management engines and transaction engines.

The persona management engine manages the subscriber's contact information, trip schedule and purchasing history and travel/product preference information, creates views and allows updates and notices for bids/activity in active sales/auctions, and maintains a queue of active electronic tickets and a history of previous trips/purchases.

The transaction engine may handle two or more types of sales, whether of fixed price or auctioned inventory, including the first n-purchasers above a particular price threshold and the second being top n-bidders out of a set of m-bidders who submitted before a deadline. There will be other attractive sales types that may emerge in the future, and the subject matter disclosed herein will support other sales types and a variety of pricing mechanisms.

The inventory management engines are envisioned to interactively (or in bulk fashion) upload inventory (seats, rooms, or products), availability (schedules, open dates), deadlines by which the inventory must be placed before it reverts, and limits (price floors, restrictions, segmentation parameters). This is the base data that is matched against subscriber preferences when creating a participant list for a sale. This is then updated continuously based on sales results.

The reporting engine will include records of all transactions, both to the subscribers and to its partners, as appropriate. An aggregate set of continuous, real time behavioral data will allow the suggestion engine to make more and more intelligent offers regarding the types of trips or products that someone may consider, regardless of whether such trips or products are or are not mentioned directly in the customer or supplier specifications. The company believes that an advanced suggestion engine will grow out of the analytic function creating even more value in the future. This engine also, incidentally, handles customer service related reporting and issue tracking.

The suggestion engine disclosed herein is intelligent acting like a virtual assistant or companion for the customer. It learns from the choices, decisions, and actions of the potential customer. This may range from advising the potential customer on other destinations similar to those he has chosen that he may wish to see offers on, constantly monitoring his travel experience and offering things that may make it better or more efficient such as offering an extra legroom seat or business class upgrade where the potential customer is stuck in a middle seat/offering priority security access when the potential customer is running late, to offering advice, such as suggesting an increase in bid to $X if he wants a better chance of winning or try travelling on a Tuesday instead when historically there is more availability or better pricing. It also learns from supplier behavior, geo-location, temporal windows and decisions, so for example if a supplier provides ten seats at $100 and they sell in 5 minutes, suggesting that the supplier either increase the price or provide staggered pricing. Similarly if products don't sell, the system may advise to either lower the price, add fields of people to show the offer to, or to sell at a different time of day (for example there may be very low take-up in the evening but high take-up during the morning).

Additionally the present embodiment may include a web interface for interaction with the subscriber and a messaging gateway for sending instantaneous SMS, email, application, or voice notifications, and allowing for bidding/purchasing and carrying out an entire transaction and managing the entire experience including specifying and updating preferences from a mobile phone.

Figure 30:
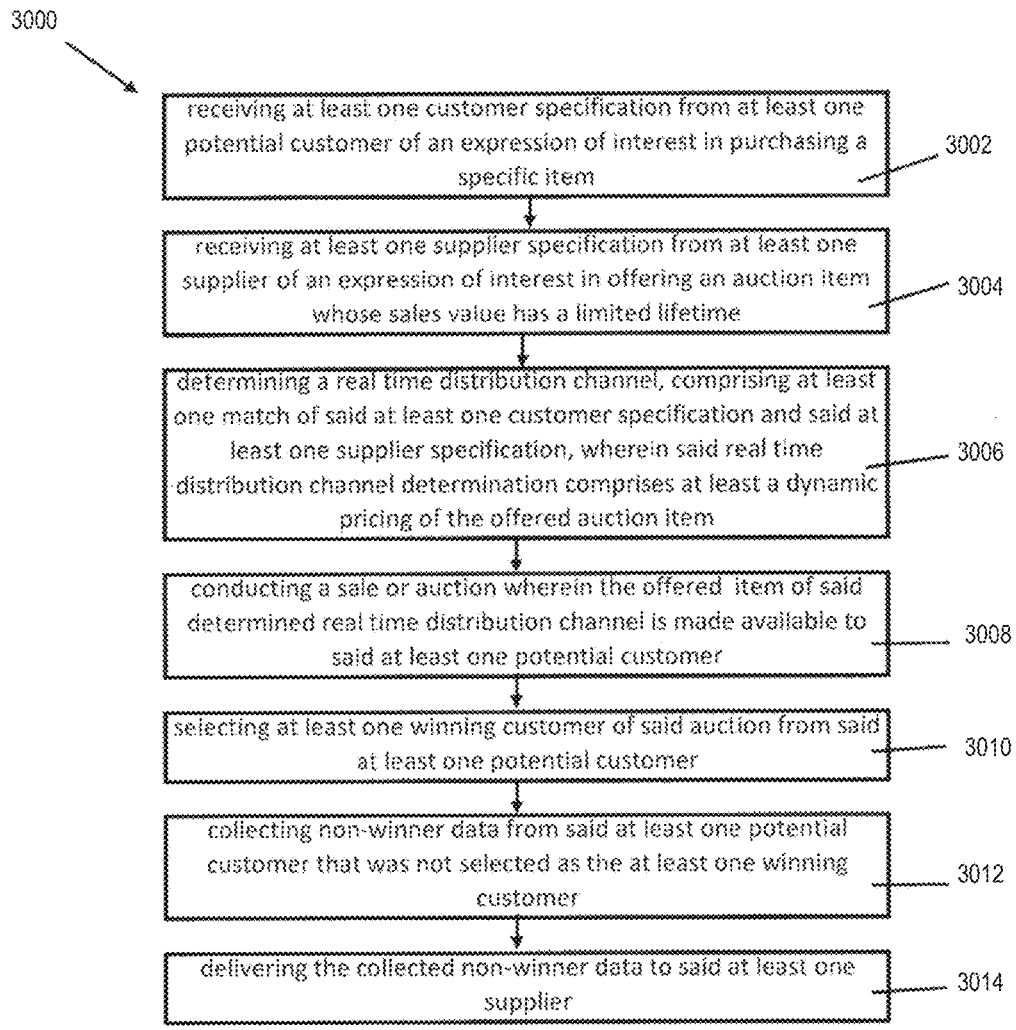
FIG. 30 depicts an example implementation of a method of a persona based decision system, implemented to allow providing dual push sales of time sensitive inventory.

FIG. 30 shows an example method diagram 3000. A method of providing a dual push sale of time sensitive inventory that has receiving 3002 at least one customer specification from at least one potential customer that has expressed interest in purchasing a specific item and receiving 3004 at least one supplier specification from at least one supplier that has expressed an interest in offering a matching item whose sales value has a limited lifetime. The method also includes determining 3006 a real time distribution channel, that is comprised of at least one match of the at least one customer specification and the at least one supplier specification, where the real time distribution channel determination has at least a dynamic pricing of the offered upsell and cross-sell items. The method further has conducting 3008 a sale where the offered item of the determined real time distribution channel is made available to the at least one potential customer, selecting 3010 at least one winning customer of the item from the at least one potential customer, collecting 3012 non-winner data from the at least one potential customer that was not selected as the at least one winning customer and delivering 3014 the collected non-winner data to the at least one supplier.

The subject matter disclosed herein is push based meaning that a potential customer inputs his individualized customer specification of what he is interested in, and other parameters and preferences—what he is interested in is sent to him in real time as soon as and as often as it becomes available from the supplier whenever it becomes available even if long after the specification is submitted.

The subject matter disclosed herein pushes inventory to people who want to see it when they want to see it as communicated by them. This may vary from a potential customer who wants a ticket to London to a potential customer who wants a ticket to London tomorrow, to a potential customer who wants a ticket to London tomorrow leaving before noon to a potential customer who wants all of this on United Airlines and potentially only if its available at a fixed price less than $500. Other examples include a potential customer who wants to go to an undefined location at a specified time but is open to travel options based on price and the like. The push functionality is customized by each potential customer, each and every time a customer uses the system, to create truly individualized offerings The potential customer inputs preferences in his customer specification in the customer portal. Nothing that he inputs is an offer to purchase or a bid, whether conditional or otherwise, it is an expression of interest. Similarly, rules and conditions are determined by the supplier prior to inventory entering the system through the supplier portal so that when it does enter the system and reaches each qualifying recipient, that inventory takes the form of either an unconditional sales offer, in the case of a fixed price item, or a no floor bid, or a conditional sales offer in the case of a reserve bid item. The potential customer decides whether and how to respond to each and every item offered. There is limited ability for the supplier to refuse to sell the item if the price parameters have been met.

The subject matter disclosed herein gathers detailed data on non-winning purchasers and bidders and subject to their consent pushes this data back to the supplier for review and action. The subject matter disclosed herein collates all non-winning bidding and buying activity, sorts it by price and other fields such as number of tickets requested and location of customer and sends that data to the supplier for them to determine if they want to make an alternative inventory offer to those non-winning potential customers. This data creates an entire new transaction source for the supplier. For example if the supplier is selling five seats from Houston to London at the highest bid and there are 100 bids with the highest bid being $500 and the lowest bid being $50, the supplier knows based on this data that there are 95 additional people willing to travel on that route on that day for a price ranging from $50 to $499. While some of the potential customers who placed the lowest bids may not be of interest, many of those bidders who bid close to the winning bid are of significant interest as the supplier may either offer additional inventory to them on the same route and day either at the winning bid or a premium, offer alternative inventory to them for the winning bid, at a premium, or at a different price, or store their details to use for future distressed inventory. The real time, personalized nature of the system disclosed herein may allow a multiplicity of different offers to be made discreetly in a highly targeted manner.

The subject matter disclosed herein allows for multiple drops of inventory into the system with alternative pricing mechanisms so that the supplier may be conservative with the initial inventory it releases and then release additional inventory to reflect actual demand and allows for flexibility on pricing, distribution and other criteria. The subject matter disclosed herein relies on notifications from the system continuously and immediately being pushed out to the potential customer as soon as product is available matching their exact preferences and the information of the non-sales is pushed back to the supplier. If multiple items match the preference either at the time the preference is submitted or later, each match will be prioritized by the system's intelligence and the time received and by the system disclosed herein, and then pushed to the customer in accordance with the prioritization.

Figure 31:
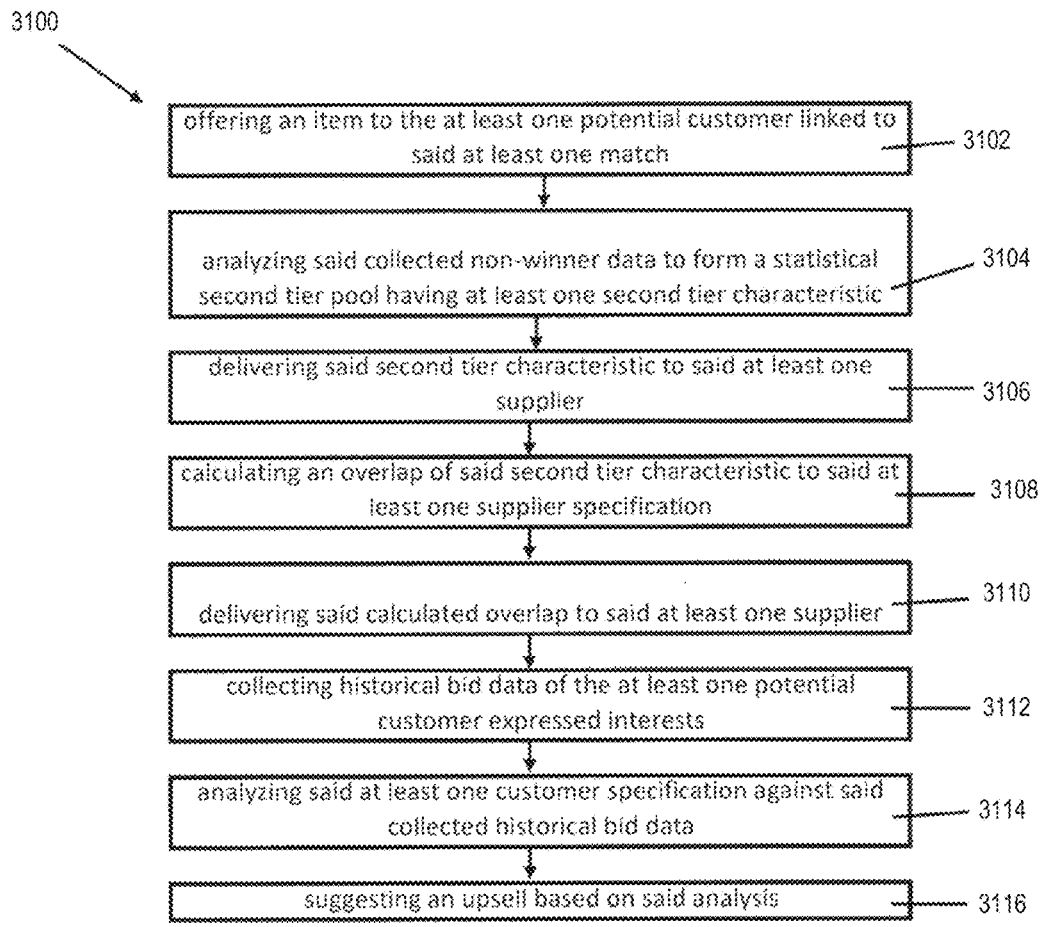
FIG. 31 depicts an example implementation of a persona based decision system, implemented with a customer specification.

FIG. 31 shows a second example method diagram 3100. The method may also have offering 3102 the available item to the at least one potential customer linked to the at least one match, analyzing 3104 the collected non-winner data to form a statistical second tier pool having at least one second tier characteristic and delivering 3106 the second tier characteristic to the at least one supplier. The method may additionally have calculating 3108 an overlap of the second tier characteristic to the at least one supplier specification, delivering 3110 the calculated overlap to the at least one supplier, collecting 3112 historical bid/purchasing data of the at least one potential customer expressed interests, analyzing 3114 the at least one customer specification against the collected historical bid/purchasing data, and suggesting 3116 an upsell or cross-sell based on the analysis.

Figure 32:
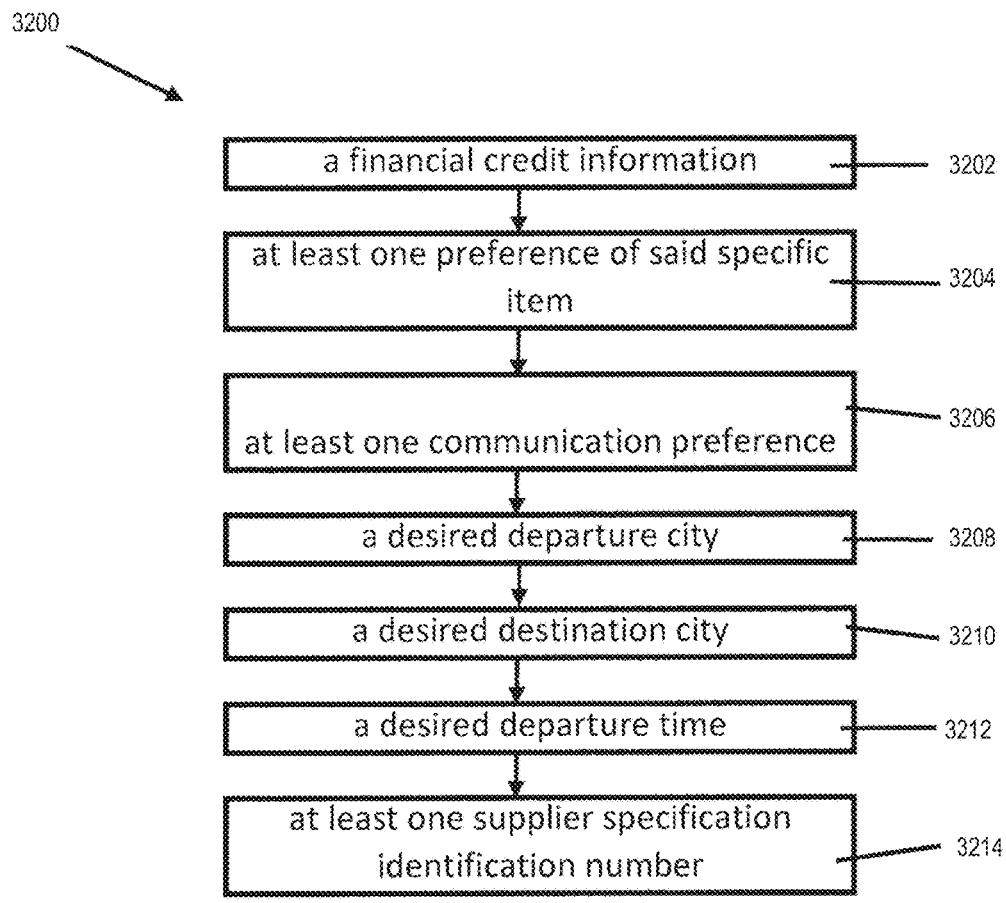
FIG. 32 depicts example implementation of a method of a persona based decision system, implemented to allow providing dual push sales of time sensitive inventory.

FIG. 32 shows the customer specification 3200. The customer specification may also have at least one of a financial credit information 3202, at least one preference of the specific item 3204, at least one communication preference 3206, a desired departure city 3208, a desired destination city 3210, a desired departure time 3212 and at least one supplier specification identification number 3214.

Figure 33:
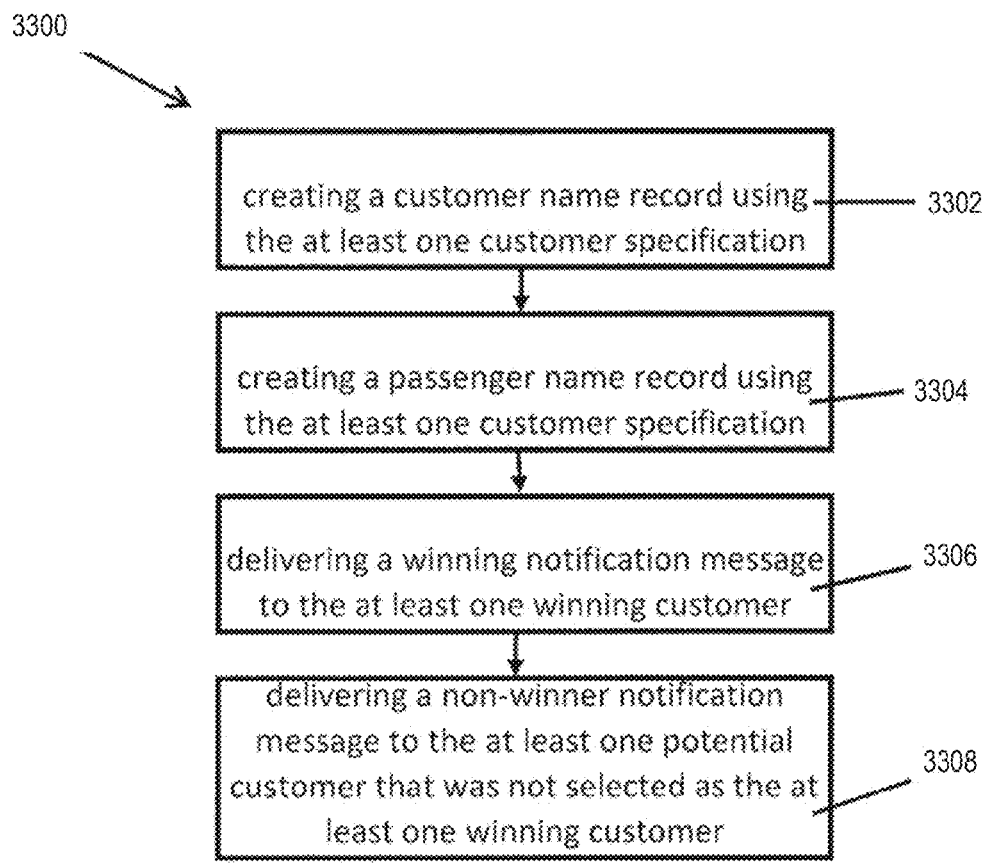
FIG. 33 depicts an example implementation of a persona based decision system, implemented to allow providing dual push sales of time sensitive inventory.

FIG. 33 shows a third example method diagram 3300. The method may additionally comprise creating 3302 a customer name record using the at least one customer specification and creating 3304 a passenger name record using the at least one customer specification, delivering 3306 a winning notification message to the at least one winning customer and delivering 3308 a non-winner notification message to the at least one potential customer that was not selected as the at least one winning customer. Dynamic pricing has at least a regression analysis to determine highest prices for the offered item.

Figure 34:
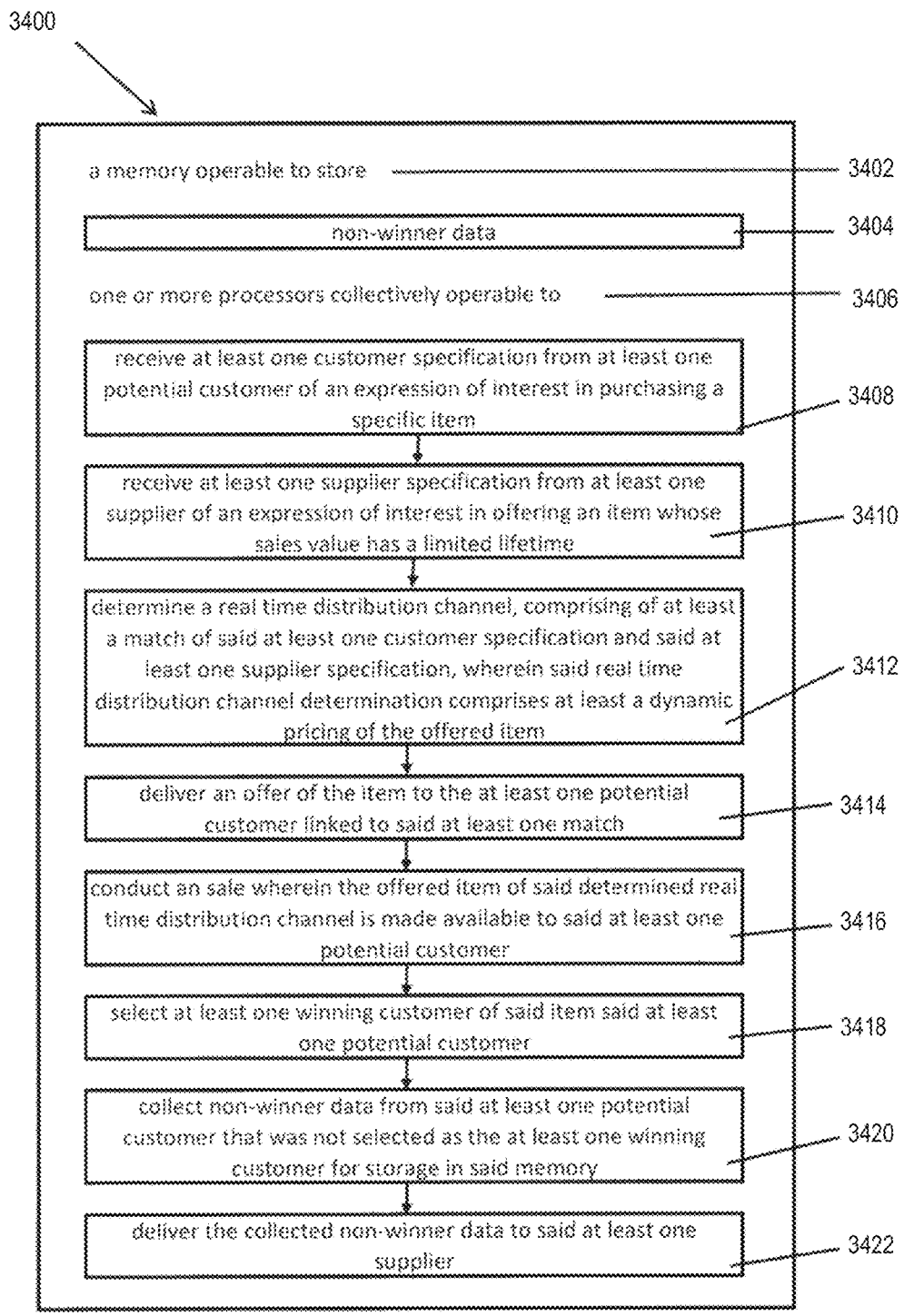
FIG. 34 depicts an example implementation of a persona based decision system, implemented to allow providing dual push sales of time sensitive inventory.

FIG. 34 shows an example system diagram 3400. A system for providing a dual push sale of time sensitive inventory, the system has a memory 3402 operable to store non-winner data 3404 and one or more sales portal processors 3406 coupled to the memory and collectively operable to receive 3408 at least one customer specification from at least one potential customer of an expression of interest in purchasing a specific item and receive 3410 at least one supplier specification from at least one supplier of an expression of interest in offering an item whose sales value has a limited lifetime. The one or more sales portal processors also determine 3412 a real time distribution channel, having at least a match of the at least one customer specification and the at least one supplier specification where the real time distribution channel determination has at least a dynamic pricing of the offered upsell or cross-sell item. The one or more sales portal processors additionally deliver 3414 an offer of the offered item to the at least one potential customer linked to the at least one match, conduct 3416 a sale where the offered item of the determined real time distribution channel is made available to the at least one potential customer, select 3418 at least one winning customer of the item from the at least one potential customer, collect 3420 non-winner data from the at least one potential customer that was not selected as the at least one winning customer for storage in the memory and deliver 3422 the collected non-winner data to the at least one supplier.

Figure 35:
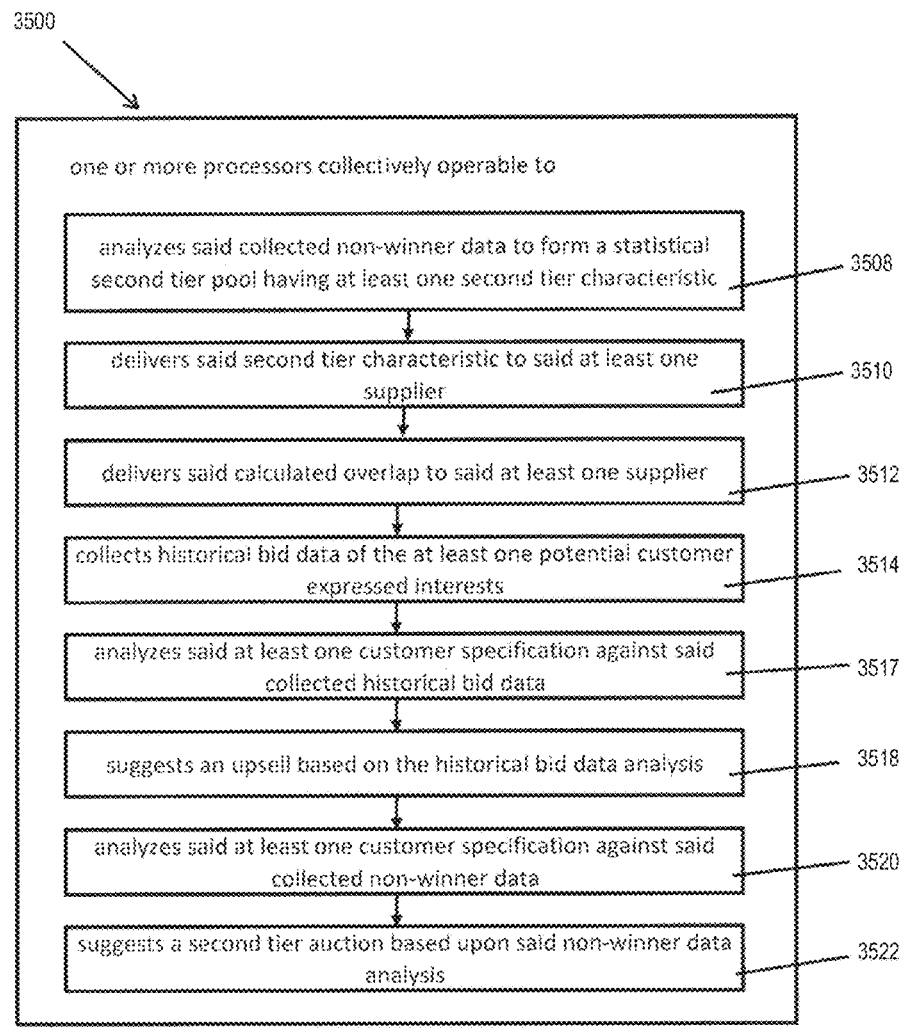
FIG. 35 depicts an example implementation of a persona based decision system, implemented to allow providing dual push sales of time sensitive inventory.

FIG. 35 shows a second example system diagram 3500. The system may also have one or more sales portal processors which analyze 3502 the collected non-winner data to form a statistical second tier pool having at least one second tier characteristic, deliver 3504 the second tier characteristic to the at least one supplier, calculate 3506 an overlap of the second tier characteristic to the at least one supplier specification, deliver 3508 the calculated overlap to the at least one supplier. The one or more sales portal processors may also collect 3510 historical bid/purchasing data of the at least one potential customer expressed interests, analyze 3512 the at least one customer specification against the collected historical bid/purchasing data, suggest 3514 an upsell or cross-sell based on the historical bid/purchasing data analysis, analyze 3516 the at least one customer specification against the collected non-winner data and suggest 3518 a second tier sale based upon the non-winner data analysis.

Figure 36:
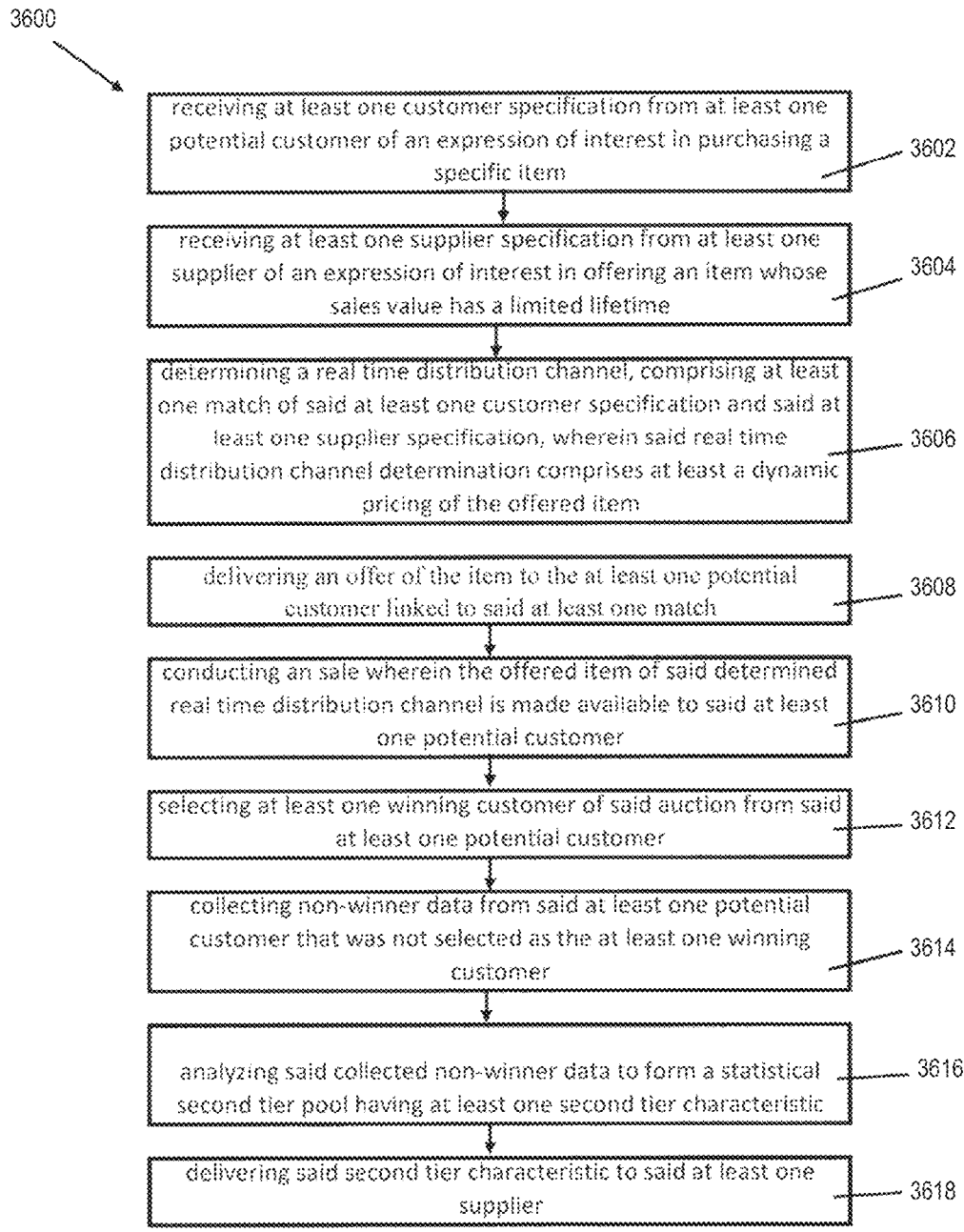
FIG. 36 depicts an example implementation of a persona based decision system, implemented to allow providing dual push sales of time sensitive inventory.

FIG. 36 shows an example computer readable medium diagram 3600. A computer readable medium having computer instructions for controlling one or more sales portal processors that provides a dual push sale of time sensitive inventory, executing the steps of receiving 3602 at least one customer specification from at least one potential customer of an expression of interest in purchasing a specific item, receiving 3604 at least one supplier specification from at least one supplier of an expression of interest in offering an item whose sales value has a limited lifetime and determining 3606 a real time distribution channel, having at least a match of the at least one customer specification and the at least one supplier specification, where the real time distribution channel determination has at least a dynamic pricing of the offered upsells and cross-sells. The computer instructions also include delivering 3608 an offer of the item to the at least one potential customer linked to the at least one match, conducting 3610 a sale where the offered item of the determined real time distribution channel is made available to the at least one potential customer and selecting 3612 at least one winning customer of the sale from the at least one potential customer. The computer instructions also include collecting 3614 non-winner data from the at least one potential customer that was not selected as the at least one winning customer, analyzing 3616 the collected non-winner data to form a statistical second tier pool having at least one second tier characteristic and delivering 3618 the second tier characteristic to the at least one supplier.

Figure 37:
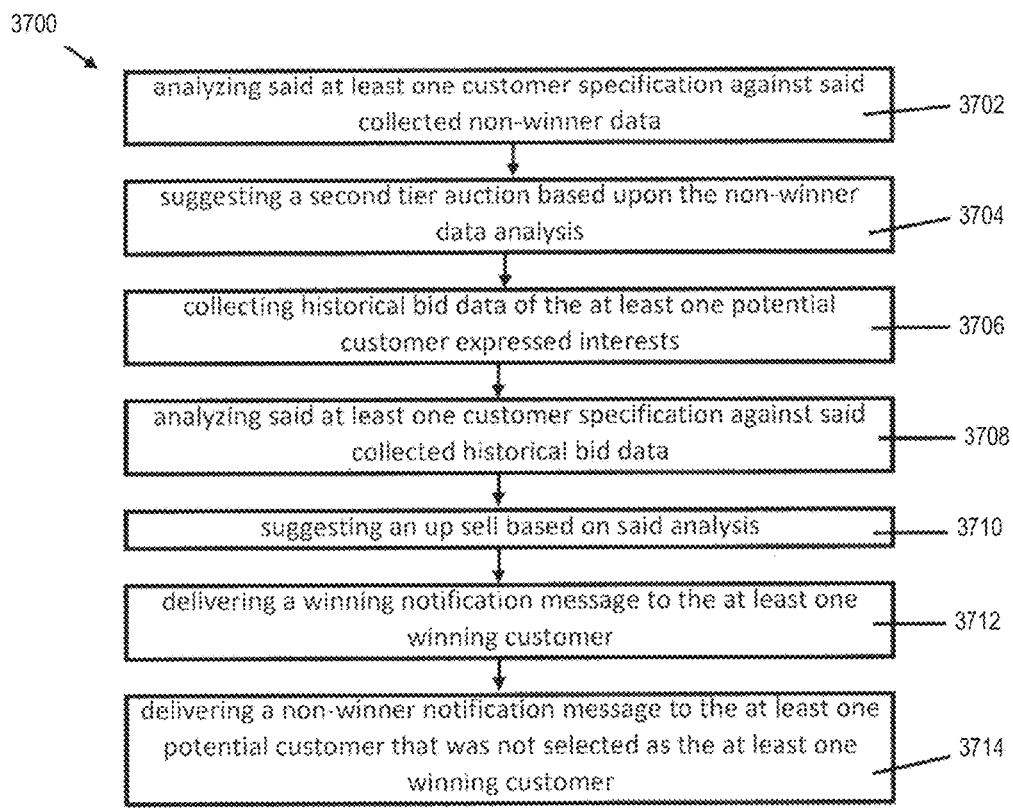
FIG. 37 depicts example implementation of a persona based decision system, implemented to allow providing dual push sales of time sensitive inventory.

FIG. 37 shows a second example computer readable medium diagram 3700. The computer readable medium may also have instructions for analyzing 3702 the at least one customer specification against the collected non-winner data, suggesting 3704 a second tier sale based upon the non-winner data analysis, collecting 3706 historical bid/purchasing data of the at least one potential customer expressed interests and analyzing 3708 the at least one customer specification against the collected historical bid/purchasing data. The computer readable medium may also comprise instructions for suggesting 3710 an up-sell or cross-sell based on the analysis, delivering 3712 a winning notification message to the at least one winning customer and delivering 3714 a non-winner notification message to the at least one potential customer that was the non-winner may receive repeated additional offerings as well.

Figure 38:
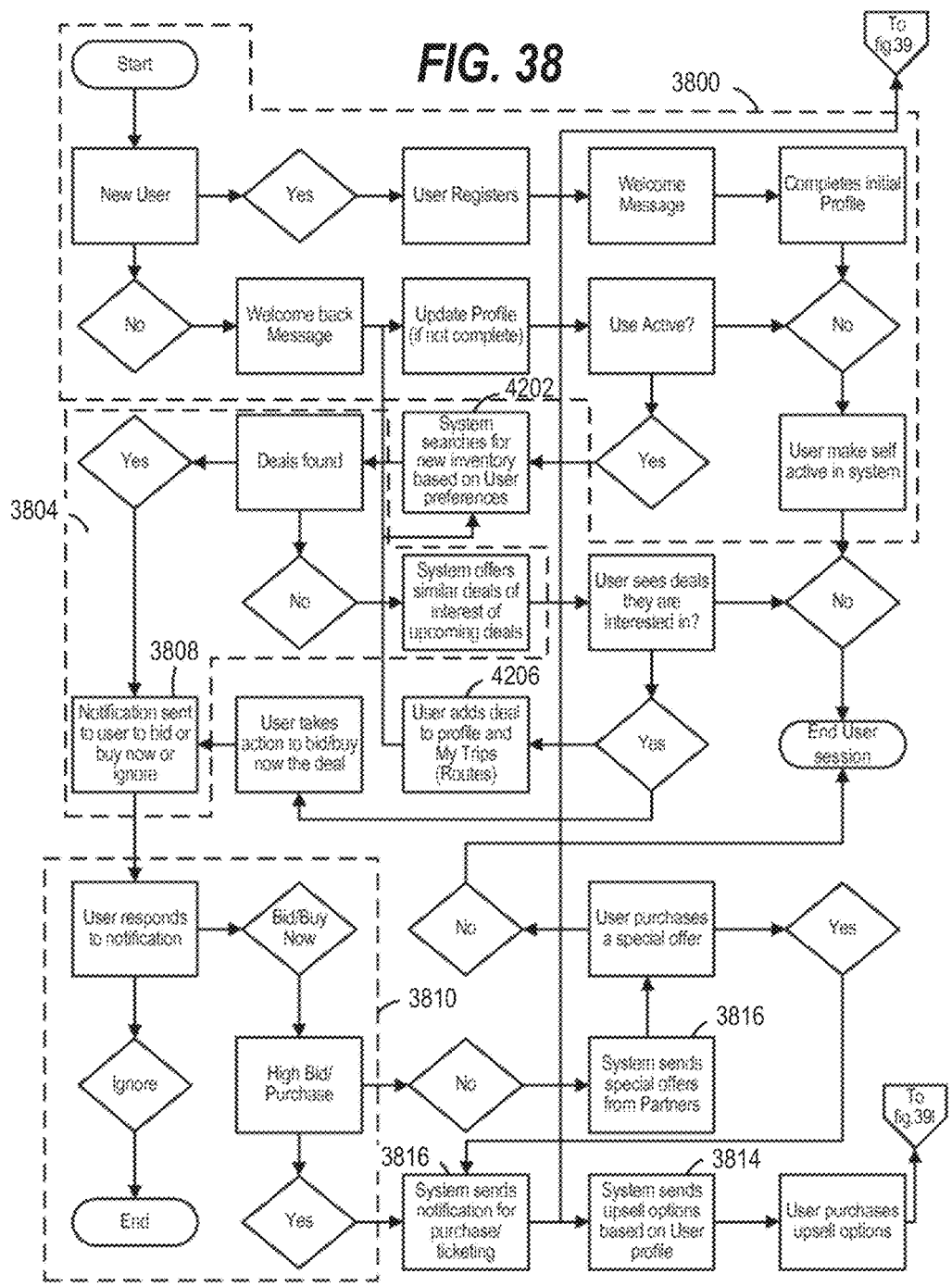
FIG. 38 depicts an example implementation of a flowchart of a persona based decision system, implemented to allow user interactions, in accordance with certain embodiments.

FIG. 38 depicts an example of a flowchart, in accordance with some example implementations. In the example depicted at FIG. 38, the system initially determines if the user is new to the system or an existing customer, and either prompts the user to register or welcomes back the customer. The system then receives specifications of interest from the customer, such as departure cities, destinations, desired times, and preferred communication channels, and continuously searches for inventory in accordance with customer preferences 3802 and presents the customer with deals that meet the customer preferences or, if requested by the customer, that are similar 3804. Once a customer expresses interest in a particular deal, the deal is added to the customer persona 3806. This information is used to set additional customer preferences and present the customer with additional deals 3804, offering the item by sending notifications of particular deals to the customer 3808. A customer can ignore a deal, or take action in accordance with its terms, which may be to purchase the item or participate in an auction for the inventory of the item 3810. If the customer purchases or wins an auction for an item, the system completes the purchase and delivers a notification of the purchase to the customer 3812 and adds a record of the deal to the user profile 3814, using the information to offer upsells and cross-sells to the customer. If the customer participates in an auction for a deal but does not submit a successful bid, the system will present additional offers and second-tier auctions 3816 based upon the analysis of the customer interest in the auctioned inventory.

Figure 39:
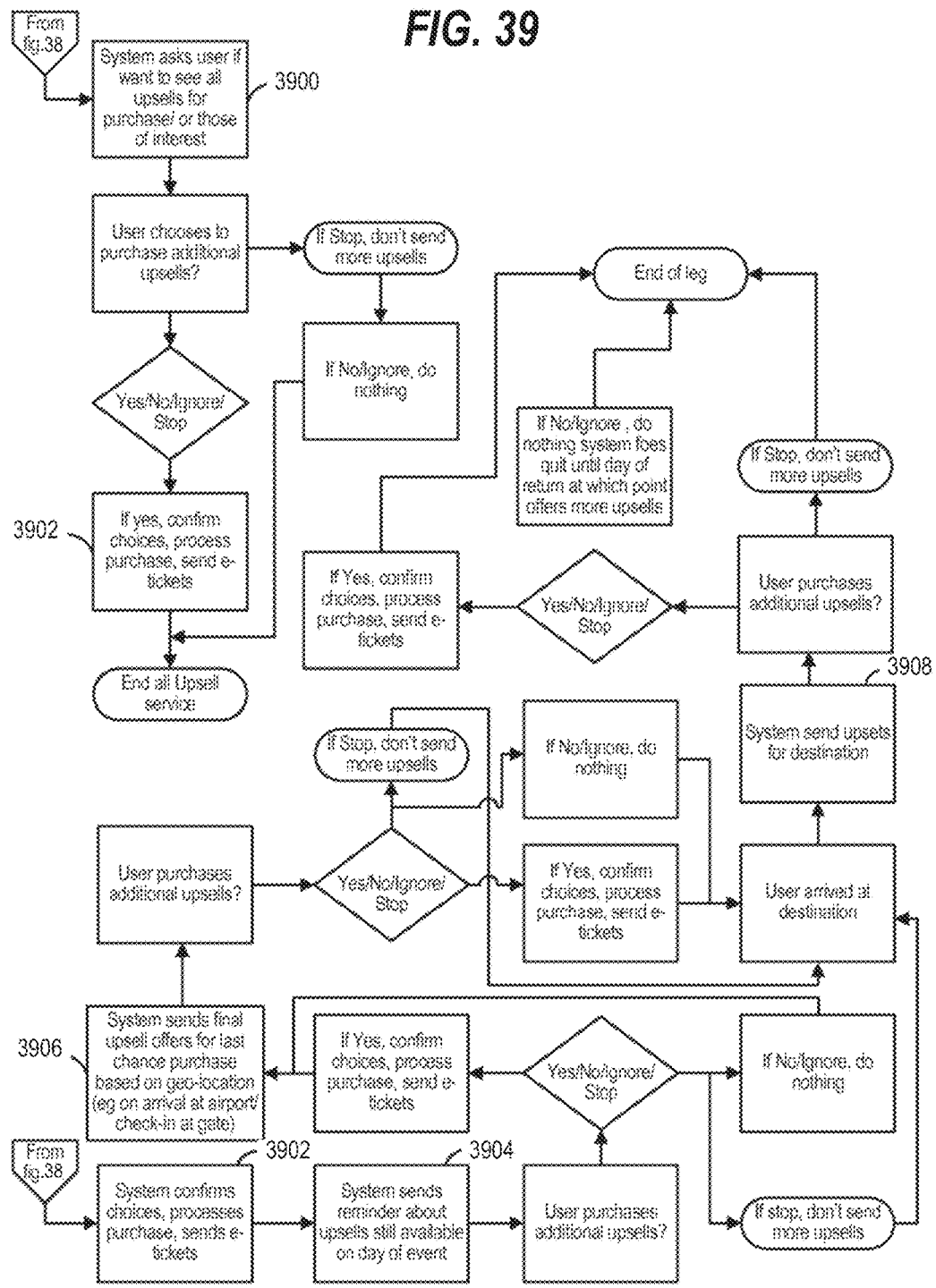
FIG. 39 depicts an example implementation of a flowchart of a persona based decision system, implemented to allow user interactions, in accordance with certain embodiments.

FIG. 39 depicts an additional flowchart of the user experience. In this flowchart, the process for presenting additional upsells and cross-sells is shown. On the flowchart, the items are generally referred to as upsells; however, while the item can present a true upsell, such as an upgraded airline class, it can also be a cross-sell, such as a restaurant or hotel deal at the destination. In FIG. 39, the system requests the customer opt-in for further recommended deals en route and at the destination. Upsells at the time of purchase of the primary item are processed and confirmations of the purchases are sent to the customer 3902. The system uses the purchase history and activity data stored in the customer profile to offer additional upsells on the day of particular events, such as airline departure 3904, and will also employ geo-location to offer additional upsells 3906, such as when the customer is at the airport of departure. Additional upsells are offered based upon the geo-location of the customer when the destination is reached 3908.

Reviewing FIGS. 38 and 39, it can be appreciated that in addition to the method of sale already detailed by the prior figures, the cross-sell and upsell process interacts with the customer in different ways at numerous times during the purchase process and product experience. Instead of offering supplier recommended upsells at the time of sale, the subject matter disclosed herein may offer user requested and intelligently recommended upsells or cross-sells throughout the experience until the consumer returns home and uses geo-location and analysis of intended position at intended time versus current position at current time to offer the customer opportunities for a more robust experience. For example, the system not only provides upsells while a customer is at an airport, but can use the information on whether the customer has arrived early or late, and whether a flight is delayed, to determine if a customer would be more responsive to expedited check-in or lounge access and tailor offerings accordingly. The system also recognizes the perishable nature of such offerings, and, in connection with parameters set by suppliers, adjusts prices dynamically.

The processes, machines, and manufactures (and improvements thereof) described herein are particularly useful improvements for computers using artificial intelligence based decision systems. Further, the embodiments and examples herein provide improvements in the technology of artificial intelligence based decision systems. In addition, embodiments and examples herein provide improvements to the functioning of a computer by providing enhanced results and dynamic intelligent decisions, thereby creating a specific purpose computer by adding such technology. Thus, the improvements herein provide for technical advantages, such as providing a system in which a user's interaction with a computer system and complex results or decisions are made easier. For example, the systems and processes described herein can be particularly useful to any systems in which a user may want to buy, lease, rent, search, exchange, bid, or barter for goods or services. Further, the improvements herein provide additional technical advantages, such as providing a system in which the personas can operate continuously, apply experiential learning to perform tasks, solve problems, make recommendations, and assist the user by helping manage the user's life experiences to make the user's life easier in terms of dealing with problems, anticipating and solving problems (sometimes before the user is even aware that a problem may exist), managing tasks, and ensuring that all aspects of the user's life receive due attention. While technical fields, descriptions, improvements, and advantages are discussed herein, these are not exhaustive and the embodiments and examples provided herein can apply to other technical fields, can provide further technical advantages, can provide for improvements to other technologies, and can provide other benefits to technology. Further, each of the embodiments and examples may include any one or more improvements, benefits and advantages presented herein.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments, blocks may be removed or combined without departing from the scope of the disclosure. Further, structural and functional elements within the diagram may be combined, in certain embodiments, without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A method comprising:
   normalizing search results corresponding to a query at a normalizer of a digital persona decision system by extracting data from the search results, transforming the extracted data into a format suitable for a table, loading the data into the table, and processing the data in the table to produce a set of multiple possible solutions;
   configuring an artificial intelligence engine using one or more personas of a plurality of personas, the one or more personas corresponding to digital representations of different decision-making characteristics of an entity that initiated the query, the entity including at least one of a user communicating with the digital persona system through a network via a computing device and a computing device operating under control of a computer program;
   processing the set to weigh and score each of the multiple possible solutions using the artificial intelligence engine configured according to the one or more personas of a plurality of personas;
   determining a selected solution from the multiple possible solutions using the artificial intelligence engine configured according to the one or more personas and based on the scores; and
   sending the selected solution within a graphical interface to one of the computing device associated with the user and the computing device operating under the control of the computer program.

2. The method of claim 1, wherein processing the multiple possible solutions comprises:
   selecting a persona of the one or more personas;
   configuring the artificial intelligence engine with the selected persona;
   determining a score for each parameter of a plurality of parameters for each of the multiple possible solutions based on the selected persona; and
   repeating the selecting, the configuring, and the determining for each of the one or more personas.

3. The method of claim 1, wherein determining the selected solution comprises:
   determining a score for each parameter of each solution of the multiple possible solutions based on each of the one or more personas;
   determining an average of all of the scores for each parameter;
   summing the scores for each solution of the multiple possible solutions; and
   determining the selected solution based on the sum.

4. The method of claim 3, further comprising:
   determining a veto reference value associated with a selected digital persona of the one or more digital personas, the veto reference value corresponding to a parameter of the multiple possible solutions; and
   when a veto reference value is present for the parameter, selecting a solution of the multiple possible solutions for the selected digital persona based on the score for the parameter.

5. The method of claim 3, wherein determining the score comprises:
   determining a relative power differentiation of each of the one or more digital personas and for each parameter; and
   selectively amending the score for each parameter for each of the one or more digital personas based on the relative power differentiation.

6. A computing system comprising:
   an interface configured to communicate with one or more devices through a communications network;

a processor coupled to the interface; and
a memory accessible to the processor and configured to store instructions that, when executed, cause the processor to:
  select one or more personas of a plurality of personas, the one or more selected personas representing at least one of a user of a first device or a program executing on a second device that sent a query to the interface, each of the one or more personas corresponding to a digital representations of a plurality of decision-making characteristics that is different in at least one of the plurality of decision-making characteristics from others of the selected one or more personas;
  configure a persona artificial intelligence (AI) engine using the one or more selected personas of a plurality of personas, the persona AI engine configured by the one or more selected personas to receive multiple possible solutions, weigh and score the multiple possible solutions based on each of the one or more selected personas to provide multiple scored solutions;
  select a subset of the multiple scored solutions using at least one of the one or more selected personas; and
  provide a graphical interface including at least one result from the subset to one of the first device and the second device.

7. The computing system of claim 6, wherein the memory further includes instructions that, when executed, cause the processor to:
  process information pertaining to one or more personas to produce a persona adjustment; and
  selectively modify at least one persona based on the persona adjustment;
  wherein the selectively modified at least one persona can subsequently be selected and applied to the AI engine to cause decision-making by the AI engine to evolve over time based on the selectively modified at least one personal.

8. The computing system of claim 7, wherein the information comprises a plurality of snapshots associated with one or more personas.

9. The computing system of claim 7, wherein the evolutionary AI engine selectively modifies the at least one persona in response to a triggering event.

10. A system comprising:
  an interface configured to communicate with one or more data sources through a network;
  a processor coupled to the interface;
  a memory coupled to the processor and configured to store a plurality of digital personas and to store instructions that, when executed, cause the processor to:
    select one or more digital personas from the plurality of digital personas in the memory to represent a user of a computing device that sent a query to the interface, each of the one or more personas corresponding to a digital representation of a plurality of decision-making characteristics that is different in at least one of the plurality of decision-making characteristics from others of the selected one or more personas;
    configure an artificial intelligence (AI) engine with the selected one or more digital personas to interact with the one or more data sources to determine a list of potential solutions to a problem, the AI engine configured to weigh and score each of the potential solutions based on each of the selected one or more personas to provide multiple scored solutions; and
    execute a selector module to select one of the multiple scored solutions as an output based on the digital persona; and
    provide a graphical interface including the output to the computing device through the network.

11. The system of claim 10, further comprising a query normalizer module executable by the processor to:
  normalize a query into data formatted for a particular search;
  cause the query to be performed;
  receive results based on the query; and
  provide the results to the artificial intelligence engine.

12. The system of claim 10, wherein the artificial intelligence engine further comprises:
  a persona artificial intelligence engine configured to apply the persona to search results; and
  an evolutionary artificial intelligence engine configured to initiate changes in the persona.

13. The system of claim 12, wherein the evolutionary artificial intelligence engine is further configured to initiate changes in the persona based on user interactions with the search results.

14. The system of claim 12, wherein the evolutionary artificial intelligence engine is further configured to initiate changes in the persona based on information derived from an other persona.

15. The system of claim 12, wherein the evolutionary artificial intelligence engine is further configured to initiate changes in the persona based on information derived from a universe in which the persona interacts.

16. The system of claim 10, further comprising a persona manager module executable by the processor to select the persona from multiple available personas.

17. The system of claim 10, further comprising:
  an input/output (I/O) normalizer module executable by the processor to translates received data into a format suitable for processing by the artificial intelligence engine; and
an application programming interface (API) configured to:
coordinate interactions between the system and external components; and
receive data from a network communicatively coupled to the API; and
provide the data to the I/O normalizer.

18. The system of claim 17, further comprising:
  a persona manager module executable by the processor to:
  receive data from the I/O normalizer; and
  selectively execute one of a persona artificial intelligence engine, which applies selected personas to data to analyze the potential solutions, and an evolutionary artificial intelligence engine, which may initiate changes in selected personas.

19. The system of claim 10, wherein at least one of the selected one or more personas includes an expert persona representing decision-making characteristics of an individual previously determined to be an expert.

20. The system of claim 10, wherein at least one of the selected one or more personas includes a trusted persona representing decision-making characteristics of an individual previously determined by the user to be a trusted individual.

* * * * *